(12) United States Patent
Holster

(10) Patent No.: US 7,979,449 B2
(45) Date of Patent: Jul. 12, 2011

(54) SYSTEM AND METHOD FOR REPRESENTING, ORGANIZING, STORING AND RETRIEVING INFORMATION

(75) Inventor: Andrew Thomas Holster, Wellington (NZ)

(73) Assignee: Atasa Ltd., Lower Hutt, Wellington (NZ)

( * ) Notice: Subject to any disclaimer, the term of this patent is extended or adjusted under 35 U.S.C. 154(b) by 478 days.

(21) Appl. No.: 12/185,483

(22) Filed: Aug. 4, 2008

(65) Prior Publication Data

US 2009/0043790 A1    Feb. 12, 2009

Related U.S. Application Data

(60) Provisional application No. 61/080,600, filed on Jul. 14, 2008.

(30) Foreign Application Priority Data

Aug. 7, 2007    (NZ) .......................................... 560372

(51) Int. Cl.
*G06F 7/00*     (2006.01)
*G06F 17/30*    (2006.01)

(52) U.S. Cl. .......................... 707/755; 707/793; 707/803

(58) Field of Classification Search .................... None
See application file for complete search history.

(56) References Cited

U.S. PATENT DOCUMENTS

| | | | |
|---|---|---|---|
| 2006/0062471 A1* | 3/2006 | Xu et al. | 382/186 |
| 2006/0168082 A1* | 7/2006 | Yang et al. | 709/207 |

* cited by examiner

*Primary Examiner* — Charles Rones
*Assistant Examiner* — Harold A Hotelling
(74) *Attorney, Agent, or Firm* — Fenwick & West LLP

(57) ABSTRACT

A data structure for representing information as a binary directional graph comprising a set of points connected by three distinct types of directed edges. Each point must have a unique left (parenting) edge and a unique right (parenting) edge with end points, and an identity edge that can be null (i.e. have no end point). All connected paths of edges upwards eventually converge at a maximal point in the structure. The points are uniformly assigned a fixed set of data as their content. Rules are defined to construct the structure and allow representation of information, with methods described for translating conventional forms of representation, such as tables, properties, classes, relations, and functions. The structure can be represented as a single relation (i.e. a single table with a fixed structure) and can be implemented using a conventional relational database.

1 Claim, 48 Drawing Sheets

| Field Name: | Type (Format): | Interpretation: |
|---|---|---|
| BID | Long Integer | Record Identity (Primary Keyed field) |
| BID1 | Long Integer | Left Parent Record |
| BID2 | Long Integer | Right Parent Record |
| BID3 | Long Integer | Identity Parent Record |
| Title | Text (string) | Object Name |
| Order | Integer (long) | Token Order |
| Value | Number (double) | Quantity |
| Date1 | Date-time (double) | Moment (start time) |
| Date2 | Date-time (double) | Moment (end time) |
| Prob | Number (single) | Probability |
| Hfunction | Number (single) | Function Parameter |
| Hf1 | Yes/No (binary) | Function Parameter |
| Hf2 | Yes/No (binary) | Function Parameter |
| Hf3 | Yes/No (binary) | Function Parameter |

Record Identifier

Edge Relation

Content 1

Content 2

Content 3

FIG. 2

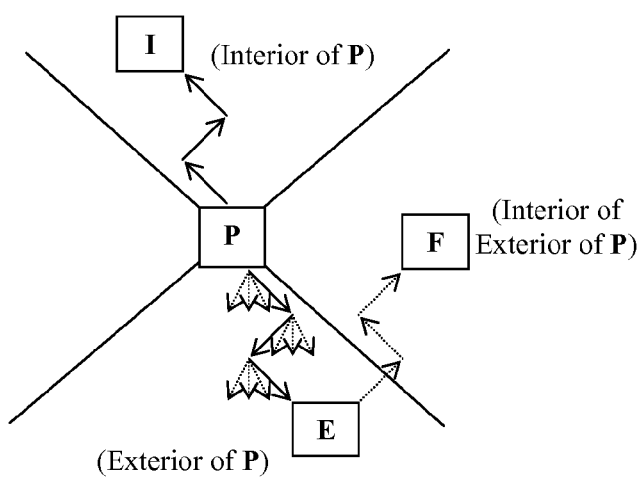

FIG. 3

Job Charges Table.

| Jobs | Client | Date | Time (hrs) | Charge Rate ($/hr) | Total Charge ($) |
|---|---|---|---|---|---|
| Job 1 | Mr. A | 1/2/08 | 3 | 50 | 150 |
| Job 2 | Mrs. B | 3/4/08 | 5 | 80 | 400 |
| Job 3 | Mrs. B | 4/4/08 | 7 | 40 | |
| Job 4 | Ms. C | 6/5/08 | 8 | | |
| ... | ... | ... | ... | ... | ... |

Clients Table.

| Client | First Name | Hair Color | Account Balance |
|---|---|---|---|
| Mr. A | Anthony | Blue | 150 |
| Mrs. B | Barbara | Blue | 400 |
| Ms. C | Claire | Green | |
| Dr. D | Deb | Yellow | |

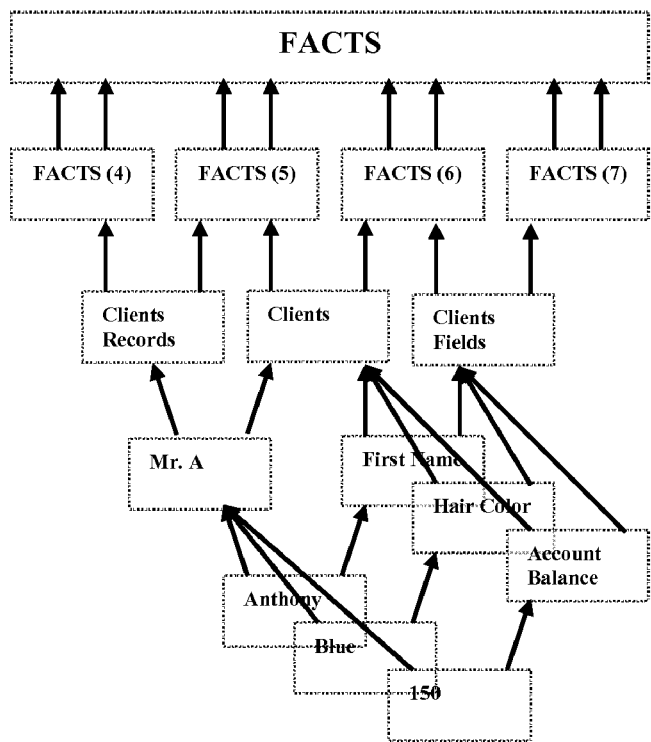
FIG. 35
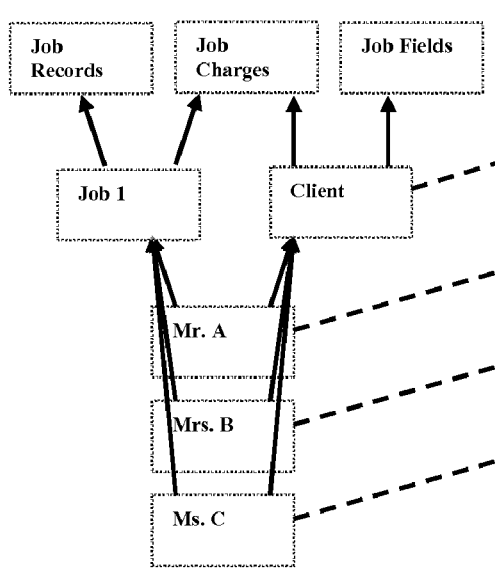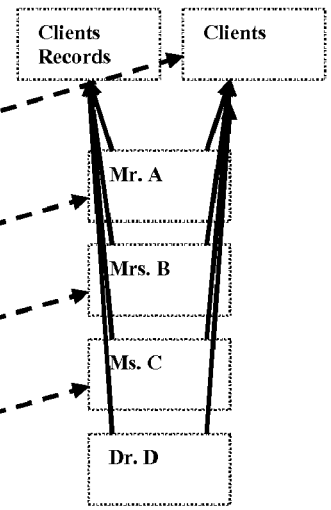
FIG. 36

| Field Name | Data Type | |
|---|---|---|
| BID | Number | Primary ID |
| BID1 | Number | Left Parent |
| BID2 | Number | Right Parent |
| BID3 | Number | Identity Parent |
| Order | Number | List Order |
| Title | Text | Qualitative content |
| Value | Number | Quantitative content |
| Date1 | Date/Time | Initial date/time content |
| Date2 | Date/Time | Final date/time content |
| Hfunction | Number | Hierarchical function type |
| Hf1 | Yes/No | Left function flag |
| Hf2 | Yes/No | Right function flag |
| Hf3 | Yes/No | Link function flag |
| Prob | Number | Probability |
| BID4 | Number | Special Mappings |

FIG. 48

| BID | BID1 | BID2 | BID3 | Order | Title | Value | Date1 | Date2 | Hfunction | Hf1 | Hf2 | Hf3 | Prob | BID4 |
|---|---|---|---|---|---|---|---|---|---|---|---|---|---|---|
| -2 | -2 | -2 | 0 | | | | | | 0 | ☐ | ☐ | ☐ | 1 | |
| 0 | -2 | -2 | 0 | | CAT3 | | 22/02/2007 12:11:04 p.m. | | 0 | ☐ | ☐ | ☐ | 1 | |
| 1 | 0 | 0 | 0 | 1 | IDS | | 22/02/2007 12:11:04 p.m. | | 0 | ☐ | ☐ | ☐ | 1 | |
| 2 | 0 | 0 | 0 | 2 | FACTS | | 22/02/2007 12:11:04 p.m. | | 13 | ☐ | ☐ | ☐ | 1 | |
| 3 | 0 | 0 | 0 | 3 | FUNCTIONS | | 22/02/2007 12:12:03 p.m. | | 0 | ☐ | ☐ | ☐ | 1 | |
| 4 | 0 | 0 | 0 | 4 | CONSTRUCTIONS | | 22/02/2007 12:12:11 p.m. | | 0 | ☐ | ☐ | ☐ | 1 | |
| 5 | 0 | 0 | 0 | 5 | PROPOSITIONS | | 22/02/2007 12:12:13 p.m. | | 0 | ☐ | ☐ | ☐ | 1 | |
| 6 | 0 | 0 | 0 | 6 | DATASOURCES | | 22/02/2007 12:12:15 p.m. | | 0 | ☐ | ☐ | ☐ | 1 | |
| 7 | 0 | 0 | 0 | 7 | WORLDS | | 22/02/2007 12:12:18 p.m. | | 0 | ☐ | ☐ | ☐ | 1 | |
| 8 | 0 | 0 | 0 | 8 | ACTIONS | | 22/02/2007 12:12:20 p.m. | | 0 | ☐ | ☐ | ☐ | 1 | |
| 9 | 0 | 0 | 0 | 9 | TRACKS | | 22/02/2007 12:12:21 p.m. | | 0 | ☐ | ☐ | ☐ | 1 | |

FIG. 49

| BID | BID1 | BID2 | BID3 | Order | Title | Value | Date1 | Date2 |
|---|---|---|---|---|---|---|---|---|
| -2 | -2 | -2 | 0 | | | | | |
| 0 | -2 | -2 | 0 | | CAT3 | | 22/02/2007 12:11:04 p.m. | |
| 1 | 0 | 0 | 0 | 1 | 1. IDS | | 22/02/2007 12:11:16 p.m. | |
| 2 | 0 | 0 | 0 | 2 | 2. FACTS | | 22/02/2007 12:12:01 p.m. | |
| 3 | 0 | 0 | 0 | 3 | 3. FUNCTIONS | | 22/02/2007 12:12:03 p.m. | |
| 4 | 0 | 0 | 0 | 4 | 4. CONSTRUCTIONS | | 22/02/2007 12:12:11 p.m. | |
| 5 | 0 | 0 | 0 | 5 | 5. PROPOSITIONS | | 22/02/2007 12:12:13 p.m. | |
| 6 | 0 | 0 | 0 | 6 | 6. DATASOURCES | | 22/02/2007 12:12:15 p.m. | |
| 7 | 0 | 0 | 0 | 7 | 7. WORLDS | | 22/02/2007 12:12:18 p.m. | |
| 8 | 0 | 0 | 0 | 8 | 8. ACTIONS | | 22/02/2007 12:12:20 p.m. | |
| 9 | 0 | 0 | 0 | 9 | 9. Tracks | 0 | 22/02/2007 12:12:21 p.m. | |
| 20 | 2 | 2 | 0 | 0 | 20. FACTS X | | 22/02/2007 12:13:20 p.m. | |
| 21 | 2 | 2 | 0 | 1 | 21. FACTS Details | | 22/02/2007 12:13:21 p.m. | |
| 22 | 2 | 2 | 0 | 2 | 22. FACTS Items | | 22/02/2007 12:13:24 p.m. | |
| 23 | 2 | 2 | 0 | 3 | 23. FACTS Records | | 22/02/2007 12:13:25 p.m. | |
| 24 | 2 | 2 | 0 | 4 | 24. FACTS Memberships | | 22/02/2007 12:13:25 p.m. | |
| 25 | 2 | 2 | 0 | 5 | 25. FACTS Collections | 1 | 22/02/2007 12:13:25 p.m. | |
| 26 | 2 | 2 | 0 | 6 | 26. FACTS Domains | | 22/02/2007 12:13:25 p.m. | |

Zero-point: → (row 1)

CAT3 point: → (row 2)

FIG. 51 qryCAT3Lattice SQL.
SELECT Briefs_0.BID, Briefs_41.BID, Briefs_31.BID, Briefs_82.BID, Briefs_84.BID, Briefs_60.BID, Briefs_62.BID, Briefs_123.BID, Briefs_125.BID, Briefs_113.BID, Briefs_89.BID, Briefs_127.BID, Briefs_103.BID, Briefs_91.BID, Briefs_93.BID, Briefs_164.BID, Briefs_166.BID, Briefs_154.BID, Briefs_142.BID, Briefs_118.BID, Briefs_170.BID, Briefs_146.BID, Briefs_134.BID, Briefs_122.BID, Briefs_124.BID, Briefs_168.BID, Briefs_144L.BID, Briefs_132.BID, Briefs_156.BID, Briefs_144R.BID, Briefs_120.BID, Briefs_0.Title, Briefs_41.Title, Briefs_31.Title, Briefs_82.Title, Briefs_84.Title, Briefs_60.Title, Briefs_62.Title, Briefs_123.Title, Briefs_125.Title, Briefs_113.Title, Briefs_89.Title, Briefs_127.Title, Briefs_103.Title, Briefs_91.Title, Briefs_93.Title, Briefs_164.Title, Briefs_166.Title, Briefs_154.Title, Briefs_142.Title, Briefs_118.Title, Briefs_170.Title, Briefs_146.Title, Briefs_134.Title, Briefs_122.Title, Briefs_124.Title, Briefs_168.Title, Briefs_144L.Title, Briefs_132.Title, Briefs_156.Title, Briefs_144R.Title, Briefs_120.Title, Briefs_31.BID1, Briefs_31.BID2, Briefs_0.BID1, Briefs_0.BID2, Briefs_41.BID1, Briefs_41.BID2
FROM ((Briefs AS Briefs_144R RIGHT JOIN ((((Briefs AS Briefs_60 LEFT JOIN Briefs AS Briefs_103 ON Briefs_60.BID2 = Briefs_103.BID) LEFT JOIN Briefs AS Briefs_89 ON Briefs_60.BID1 = Briefs_89.BID) LEFT JOIN Briefs AS Briefs_118 ON Briefs_89.BID1 = Briefs_118.BID) LEFT JOIN Briefs AS Briefs_132 ON Briefs_89.BID2 = Briefs_132.BID) ON Briefs_144R.BID = Briefs_103.BID1) LEFT JOIN Briefs AS Briefs_146 ON Briefs_103.BID2 = Briefs_146.BID) RIGHT JOIN (Briefs AS Briefs_122 RIGHT JOIN ((Briefs AS Briefs_124 RIGHT JOIN Briefs AS Briefs_93 ON Briefs_124.BID = Briefs_93.BID2) RIGHT JOIN (Briefs AS Briefs_134 RIGHT JOIN (Briefs AS Briefs_170 RIGHT JOIN (Briefs AS Briefs_120 RIGHT JOIN ((((((((((((((Briefs AS Briefs_0 LEFT JOIN Briefs AS Briefs_41 ON Briefs_0.BID1 = Briefs_41.BID) LEFT JOIN Briefs AS Briefs_31 ON Briefs_0.BID2 = Briefs_31.BID) LEFT JOIN Briefs AS Briefs_62 ON Briefs_31.BID2 = Briefs_62.BID) LEFT JOIN Briefs AS Briefs_84 ON Briefs_41.BID2 = Briefs_84.BID) LEFT JOIN Briefs AS Briefs_91 ON Briefs_62.BID1 = Briefs_91.BID) LEFT JOIN Briefs AS Briefs_82 ON Briefs_41.BID1 = Briefs_82.BID) LEFT JOIN Briefs AS Briefs_125 ON Briefs_82.BID2 = Briefs_125.BID) LEFT JOIN Briefs AS Briefs_113 ON Briefs_84.BID1 = Briefs_113.BID) LEFT JOIN Briefs AS Briefs_123 ON Briefs_82.BID1 = Briefs_123.BID) LEFT JOIN Briefs AS Briefs_127 ON Briefs_84.BID2 = Briefs_127.BID) LEFT JOIN Briefs AS Briefs_164 ON Briefs_123.BID1 = Briefs_164.BID) LEFT JOIN Briefs AS Briefs_166 ON Briefs_123.BID2 = Briefs_166.BID) LEFT JOIN Briefs AS Briefs_154 ON Briefs_125.BID1 = Briefs_154.BID) LEFT JOIN Briefs AS Briefs_142 ON Briefs_113.BID1 = Briefs_142.BID) LEFT JOIN Briefs AS Briefs_168 ON Briefs_125.BID2 = Briefs_168.BID) LEFT JOIN Briefs AS Briefs_144L ON Briefs_113.BID2 = Briefs_144L.BID) LEFT JOIN Briefs AS Briefs_156 ON Briefs_127.BID1 = Briefs_156.BID) ON Briefs_120.BID = Briefs_91.BID1) ON Briefs_170.BID = Briefs_127.BID2) ON Briefs_134.BID = Briefs_91.BID2) ON Briefs_93.BID = Briefs_62.BID2) ON Briefs_122.BID = Briefs_93.BID1) ON Briefs_60.BID = Briefs_31.BID1
WHERE (((Briefs_0.BID)=[Forms]![CAT3Lattice]![ChooseBID0])) OR (((Briefs_41.BID)=[Forms]![CAT3Lattice]![ChooseBID0])) OR (((Briefs_84.BID)=[Forms]![CAT3Lattice]![ChooseBID0]));

FIG. 54 qryFlatlandCenter SQL.

SELECT Briefs_12.Order, Briefs_6.Order, Briefs_13.Order, Briefs_8.Order, Briefs_0.BID, Briefs_0.BID1, Briefs_0.BID2, Briefs_0.Title, Briefs_1.BID, Briefs_1.BID1, Briefs_1.BID2, Briefs_1.Title, Briefs_2.BID, Briefs_2.BID1, Briefs_2.BID2, Briefs_2.Title, Briefs_3.BID, Briefs_3.BID1, Briefs_3.BID2, Briefs_3.Title, Briefs_4.BID, Briefs_4.BID1, Briefs_4.BID2, Briefs_4.Title, Briefs_5.BID, Briefs_5.BID1, Briefs_5.BID2, Briefs_5.Title, Briefs_6.BID, Briefs_6.BID1, Briefs_6.BID2, Briefs_6.Title, Briefs_7.BID, Briefs_7.BID1, Briefs_7.BID2, Briefs_7.Title, Briefs_8.BID, Briefs_8.BID1, Briefs_8.BID2, Briefs_8.Title, Briefs_9.BID, Briefs_9.BID1, Briefs_9.BID2, Briefs_9.Title, Briefs_10.BID, Briefs_10.BID1, Briefs_10.BID2, Briefs_10.Title, Briefs_11.BID, Briefs_11.BID1, Briefs_11.BID2, Briefs_11.Title, Briefs_12.BID, Briefs_12.BID1, Briefs_12.BID2, Briefs_12.Title, Briefs_13.BID, Briefs_13.BID1, Briefs_13.BID2, Briefs_13.Title, Briefs_14.BID, Briefs_14.BID1, Briefs_14.BID2, Briefs_14.Title, Briefs_15.BID, Briefs_15.BID1, Briefs_15.BID2, Briefs_15.Title, Briefs_16.BID, Briefs_16.BID1, Briefs_16.BID2, Briefs_16.Title, Briefs_17.BID, Briefs_17.BID1, Briefs_17.BID2, Briefs_17.Title, Briefs_18.BID, Briefs_18.BID1, Briefs_18.BID2, Briefs_18.Title, Briefs_19.BID, Briefs_19.BID1, Briefs_19.BID2, Briefs_19.Title, Briefs_20.BID, Briefs_20.BID1, Briefs_20.BID2, Briefs_20.Title, Briefs_0.BID3, Briefs_1.BID3, Briefs_2.BID3, Briefs_3.BID3, Briefs_4.BID3, Briefs_5.BID3, Briefs_6.BID3, Briefs_7.BID3, Briefs_8.BID3, Briefs_9.BID3, Briefs_10.BID3, Briefs_11.BID3, Briefs_12.BID3, Briefs_13.BID3, Briefs_14.BID3, Briefs_15.BID3, Briefs_16.BID3, Briefs_17.BID3, Briefs_18.BID3, Briefs_19.BID3, Briefs_20.BID3, Briefs_12.Value, Briefs_6.Value, Briefs_13.Value, Briefs_8.Value, Briefs_8.Date1, Briefs_8.Date2, Briefs_12.Date1, Briefs_12.Date2, Briefs_6.Date1, Briefs_6.Date2, Briefs_13.Date1, Briefs_13.Date2
FROM (((((((Briefs AS Briefs_8 RIGHT JOIN Briefs AS Briefs_6 ON Briefs_8.BID1 = Briefs_6.BID) RIGHT JOIN ((Briefs AS Briefs_12 LEFT JOIN Briefs AS Briefs_15 ON Briefs_12.BID2 = Briefs_15.BID) LEFT JOIN Briefs AS Briefs_11 ON Briefs_12.BID1 = Briefs_11.BID) ON Briefs_6.BID2 = Briefs_12.BID) LEFT JOIN Briefs AS Briefs_13 ON Briefs_8.BID2 = Briefs_13.BID) LEFT JOIN Briefs AS Briefs_4 ON Briefs_6.BID1 = Briefs_4.BID) LEFT JOIN Briefs AS Briefs_16 ON Briefs_13.BID2 = Briefs_16.BID) LEFT JOIN Briefs AS Briefs_2 ON Briefs_4.BID1 = Briefs_2.BID) LEFT JOIN Briefs AS Briefs_18 ON Briefs_16.BID2 = Briefs_18.BID) LEFT JOIN ((((Briefs AS Briefs_7 RIGHT JOIN Briefs AS Briefs_9 ON Briefs_7.BID = Briefs_9.BID1) LEFT JOIN Briefs AS Briefs_5 ON Briefs_7.BID1 = Briefs_5.BID) LEFT JOIN (Briefs AS Briefs_3 LEFT JOIN (Briefs AS Briefs_1 LEFT JOIN Briefs AS Briefs_0 ON Briefs_1.BID1 = Briefs_0.BID) ON Briefs_3.BID1 = Briefs_1.BID) ON Briefs_5.BID1 = Briefs_3.BID) RIGHT JOIN ((((Briefs AS Briefs_10 LEFT JOIN Briefs AS Briefs_14 ON Briefs_10.BID2 = Briefs_14.BID) LEFT JOIN Briefs AS Briefs_17 ON Briefs_14.BID2 = Briefs_17.BID) LEFT JOIN Briefs AS Briefs_19 ON Briefs_17.BID2 = Briefs_19.BID) LEFT JOIN Briefs AS Briefs_20 ON Briefs_19.BID2 = Briefs_20.BID) ON Briefs_9.BID2 = Briefs_10.BID) ON Briefs_8.BID = Briefs_10.BID1
WHERE (((Briefs_12.BID)=[Forms]![FlatLand]![ChooseBID]))
ORDER BY Briefs_6.Order, Briefs_13.Order;

FIG. 57 qryFlatlandLinkForm SQL.

SELECT Briefs.BID, Briefs.Title, Briefs.Value, Briefs_1.Title, Briefs_2.Title, Briefs.BID3, Briefs_3.Title, Briefs.BID1, Briefs.BID2
FROM ((Briefs INNER JOIN Briefs AS Briefs_1 ON Briefs.BID1 = Briefs_1.BID) INNER JOIN Briefs AS Briefs_2 ON Briefs.BID2 = Briefs_2.BID) LEFT JOIN Briefs AS Briefs_3 ON Briefs.BID3 = Briefs_3.BID
ORDER BY Briefs.Title;

| Table Name | Record Tree | Record SNum | Group Order | Record Order | Record | Hair Color | Charge Rate $/hr | Managers for Clients Jobs | Nick Name 1 | Nick Name 2 | Personality Traits | GST Rate |
|---|---|---|---|---|---|---|---|---|---|---|---|---|
| Clients | 24. FACTS Mer Records | | | 0 | Beany | | | | beanpole | <<new>> | | |
| Clients | 24. FACTS Mer Records | | | 1 | Beany | | | | | | | |
| Clients | 24. FACTS Mer Records | | | 2 | Beany | | | | | | | |
| Clients | 24. FACTS Mer Records | | 0 | 0 | Brian Pollock | Brown | | | pirate | | | 125 |
| Clients | 24. FACTS Mer Records | | 0 | 1 | Brian Pollock | | | | | | | |
| Clients | 24. FACTS Mer Records | | 0 | 0 | Client Rates | | 100 | | | | | |
| Clients | 24. FACTS Mer Records | | 0 | 1 | Client Rates | | 90 | | | | | |
| Clients | 24. FACTS Mer Records | | 0 | 2 | Client Rates | | 40 | | | | | |
| Clients | 24. FACTS Mer Records | | 0 | 3 | Client Rates | | | | | | | |
| Clients | 24. FACTS Mer Records | | 0 | 0 | Keiko Hoister | black | | | Keiko | Nice | | |
| Clients | 24. FACTS Mer Records | | 0 | 1 | Keiko Hoister | Brown | | | | | | |
| Clients | 24. FACTS Mer Records | | 0 | 0 | Madam Hari | Red | | | | | jpsky | |
| Clients | 24. FACTS Mer Records | | 0 | 2 | Madam Hari | | | | | | <<new>> | |
| Clients | 24. FACTS Mer Records | | 0 | 3 | Madam Hari | yellow | | | | | <<new>> | |
| Clients | 24. FACTS Mer Records | | 0 | 4 | Madam Hari | <<new>> | | | | | rushe1 | |
| Clients | 24. FACTS Mer Records | | 0 | 6 | Madam Hari | | | | | | <<new>> | |
| Clients | 24. FACTS Mer Records | | 0 | 0 | Sir Peter Billious | | | | | | | |
| Clients | 24. FACTS Mer Records | | 0 | 1 | Sir Peter Billious | | | | | | | |
| Clients | 24. FACTS Mer Records | | 0 | 0 | Torry Ward | Brown | | | Torry | | | |
| Clients | 24. FACTS Mer Records | | 0 | 0 | Trotsky | black | | | Pigsy | | obsessive | |
| Clients | 24. FACTS Mer Records | | 1 | 0 | Barry Manilow | <<new>> | | | | <<new>> | <<new>> | |
| Clients | 24. FACTS Mer Records | | 1 | 0 | Mrs. Beta | | | | | Beta weeta | Confused | |
| Clients | 24. FACTS Mer Records | | 1 | 1 | Mrs. Beta | | | | | | | |
| Clients | 24. FACTS Mer Records | | 2 | 0 | Mumbo Marcho | <<new>> | | | | Manchy | Hepoillee | |
| Clients | 24. FACTS Mer Records | | 2 | 1 | Mumbo Marcho | | | | | | | |
| Clients | 24. FACTS Mer Records | | 2 | 2 | Mumbo Marcho | | | | | | | |
| Clients | 24. FACTS Mer Records | | 2 | 3 | Mumbo Marcho | Red | | | | | | |
| Clients | 24. FACTS Mer Records | | 3 | 0 | max Smart | <<new>> | | | <<new>> | Smarty | fashicnable | |
| Clients | 24. FACTS Mer Records | | 4 | 0 | Miss Blotch | brunette | | | Blotchy | Blot | tumotous | |
| Clients | 24. FACTS Mer Records | | 5 | 0 | Mr. Adams | | | Managers | Adamant | | | |
| Clients | 24. FACTS Mer Records | | 5 | 1 | Mr. Adams | Orange | | | | | | |
| Clients | 24. FACTS Mer Records | | 5 | 4 | Mr. Adams | | | | | Atom Adam | | |
| Clients | 24. FACTS Mer Records | | 5 | 5 | Mr. Adams | | | | | | | |
| Clients | 24. FACTS Mer Records | | 5 | 6 | Mr. Adams | | | | | | | |
| Clients | 24. FACTS Mer Records | | 5 | 7 | Mr. Adams | | | | | | | |
| Clients | 24. FACTS Mer Records | | 7 | 0 | Ms. Cart | Red | | | | | | |
| Clients | 24. FACTS Mer Records | | 7 | 0 | Ms. Cart | black | | | | | | |
| Clients | 24. FACTS Mer Records | | 7 | 0 | Ms. Cart | | | | | | | |
| Clients | 24. FACTS Mer Records | | 10 | 0 | Baa Baa Black Sheep | Brown | | | | baa baa | rude | |
| Clients | 24. FACTS Mer Records | | 10 | 1 | Baa Baa Black Sheep | | | | | | sheepish | |

FIG. 61

QryCrossTabProperties SQL.
TRANSFORM Last(Briefs.Title) AS LastOfTitle SELECT Briefs_3.Title AS [Table Name], Briefs_5.Title AS [Record Tree], Briefs_4.Title AS [Record Stem], Briefs_1.Order AS [Group Order], Briefs_1.Title AS Record, Briefs.Order AS [Record Order]
FROM ((FlatLandChooseBID INNER JOIN (Briefs AS Briefs_2 INNER JOIN ((Briefs INNER JOIN Briefs AS Briefs_1 ON Briefs.BID1 = Briefs_1.BID) INNER JOIN Briefs AS Briefs_3 ON Briefs_1.BID2 = Briefs_3.BID) ON Briefs_2.BID1 = Briefs_3.BID) ON FlatLandChooseBID.BID = Briefs_3.BID) INNER JOIN Briefs AS Briefs_4 ON Briefs_1.BID1 = Briefs_4.BID) INNER JOIN Briefs AS Briefs_5 ON Briefs_4.BID1 = Briefs_5.BID
WHERE (((FlatLandChooseBID.ID)=DLast("[id]","flatlandchoosebid")) AND ((Briefs.BID2)=[Briefs_2].[bid]))
GROUP BY Briefs_3.Title, Briefs_5.Title, Briefs_4.Title, Briefs_1.Order, Briefs_1.Title, Briefs.Order
ORDER BY Briefs_3.Title, Briefs_5.Title, Briefs_4.Title, Briefs_1.Order, Briefs_1.Title, Briefs.Order, Briefs_1.Order PIVOT Briefs_2.Title;

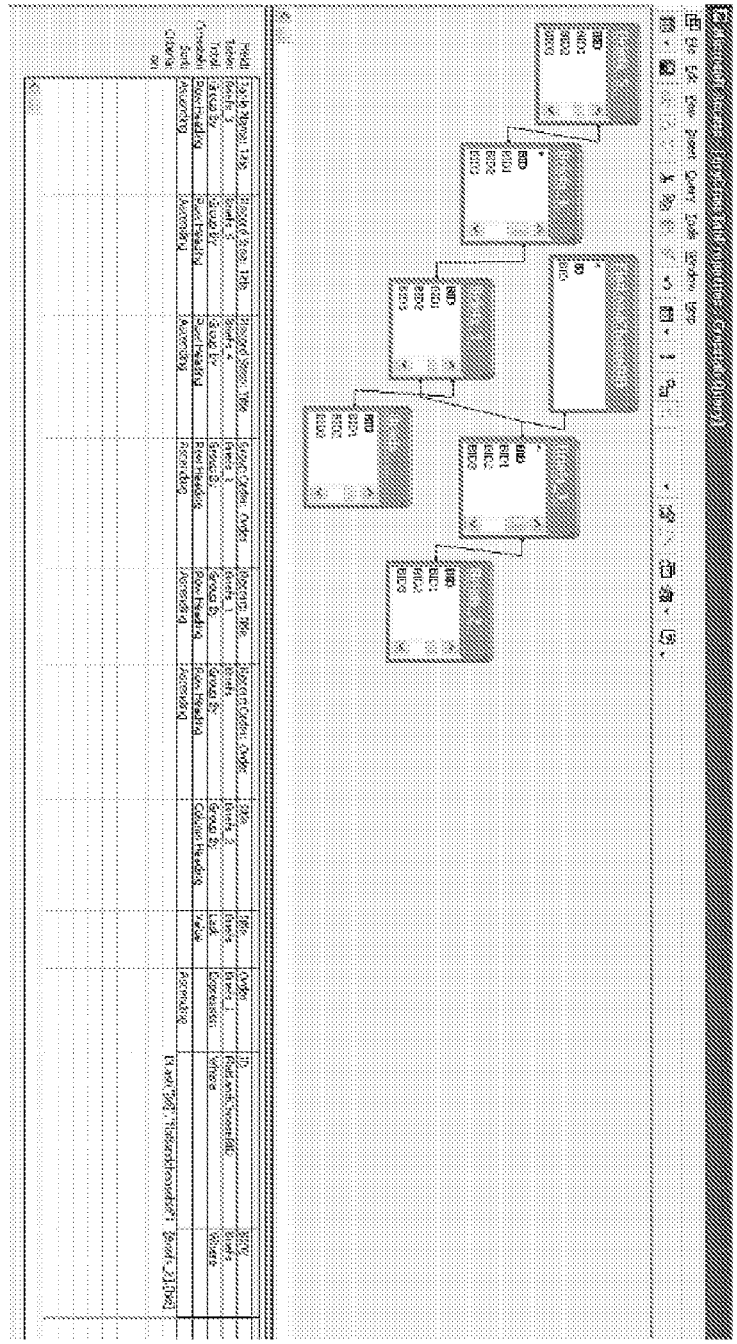

FIG. 62

FIG. 63 qryFlatlandDataEntry SQL.
SELECT Briefs_2.Order, Briefs.Order, Briefs.BID1, Briefs_2.BID2, Briefs_2.BID3, Briefs.BID2, Briefs_2.Title, Briefs_2.BID, Briefs.Title, Briefs.BID, Briefs.Value, Briefs.Date1, Briefs.Date2, Briefs.BID3  FROM Briefs INNER JOIN Briefs AS Briefs_2 ON Briefs.BID2 = Briefs_2.BID WHERE (((Briefs.BID1)=[Forms]![FlatLandDataEntry]![ChooseRecordBID]) AND ((Briefs_2.BID2)=[Forms]![FlatlandDataEntry]![FieldBID2])) ORDER BY Briefs_2.Order, Briefs.Order, Briefs_2.Title, Briefs_2.BID, Briefs.Title, Briefs.BID, Briefs.Date1 DESC;

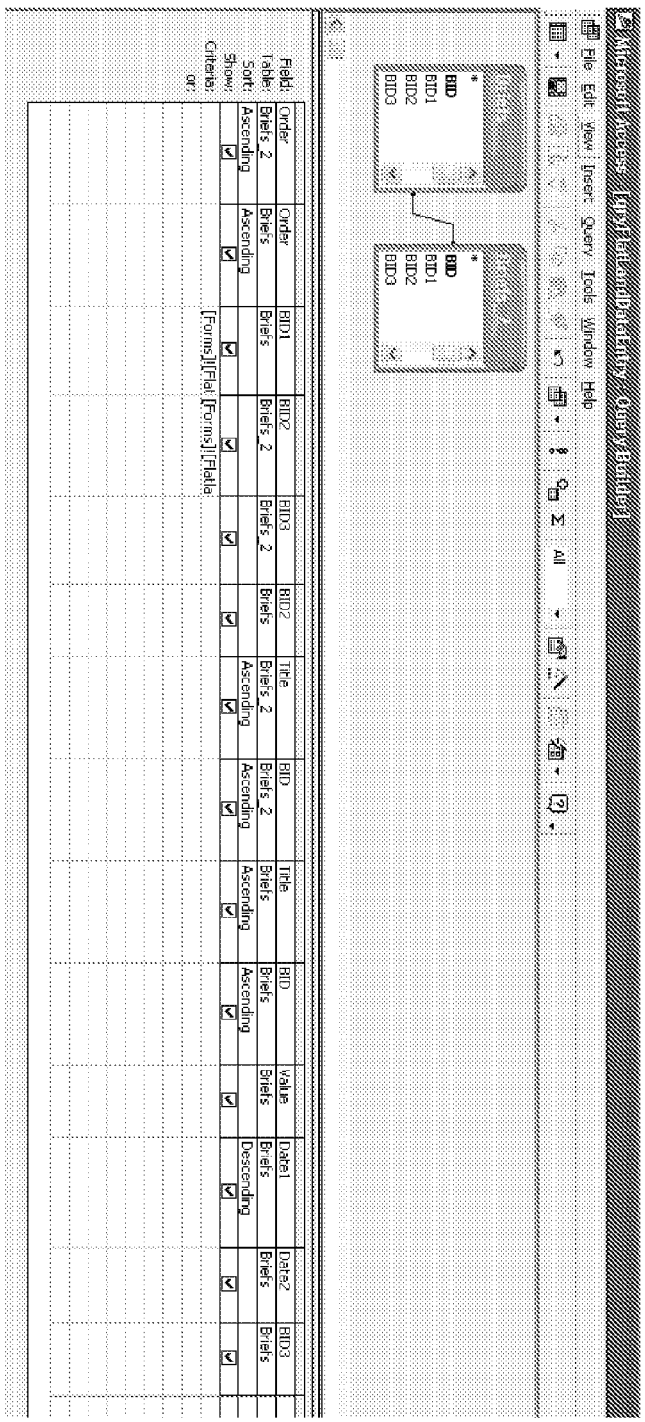

FIG. 64

CAT3 Structures: general class of structures

CAT3 Networks Structures: conform to Network axioms $a_{ZeroLeft}$   $a_{ZeroRight}$ $a_{CAT3}$   $a_{null}$ $P_1$   $P_2$   $P_3$   ...

$Q_1$   $Q_2$ $R_i$

CAT3 Graph Structures: the CAT3 Network

FIG. 68

SYSTEM AND METHOD FOR REPRESENTING, ORGANIZING, STORING AND RETRIEVING INFORMATION

RELATED APPLICATIONS

This application claims priority to New Zealand patent application 560,372 filed on Aug. 6, 2007 and U.S. provisional application 61/080,600 filed on Jul. 14, 2008 which are all incorporated by reference herein in their entirety.

FIELD OF THE INVENTION

This invention relates to systems and methods used for representing, organizing, storing and retrieving information in databases.

BACKGROUND

Relational databases and other representations require fixed structures (tables, queries, spreadsheets, etc) which must be built by programmers to store information. Associated structures such as interfaces and programmed modules must be built to allow the user to access and manipulate information. These require a great deal of programming time and effort to build and maintain. The resulting structures are only capable of representing particular content, organized in particular forms. When the content of a conventional database needs to be extended, new tables, fields, queries and associated objects have to be programmed. Design of the table structures and programmed objects is also ad hoc in the sense that two independent programmers will generally devise distinct structures to represent the same domain of information. This means that transfer of information from one database to another is difficult, involving dedicated programming tasks to 'translate' or map information from one application to another. Integration of diverse information stored in a variety of different structures (e.g., databases, spreadsheets) is difficult: a new database needs to be designed and programmed to import and combine various elements of information, taking into account the ad hoc rules of the original systems. Considerable effort is required to learn the programming methods used in each system as there is little standardization across systems devised by different programmers.

Conventional representations of information split information into two types: conceptual information and empirical information. Conceptual information is programmed or 'hard-wired' into the system design—in the construction of tables, queries, and programmed functions. Empirical information is 'soft-coded' as data, entered through user interfaces. Only the latter—essentially content of tables—appears transparently as information. Conceptual information underlying the system design—including implementation of calculation functions, correspondences of various fields in different tables, inter-table relations, etc—is only visible by viewing construction of objects, and it is difficult to find any methods to systematically navigate, extract, represent or manipulate this information.

SUMMARY

The CAT3 representation provides solutions to many problems encountered in conventional databases. A CAT3 database stores a variety of information, from diverse domains, in a single form. CAT3 interfaces designed to view or manipulate information can be used universally for any information stored in the system. The CAT3 representation of conventional 'tables' is flexible and can be extended by users without programming knowledge. New conceptual structures corresponding to new tables, queries, functions, etc, are inserted by the user as 'soft data', i.e., by a data entry process following semantic rules. New structures are represented symbolically; new objects do not need to be programmed to extend the database representation. Information in one CAT3 database can be quickly imported into another, and integrated into an alternative conceptual organization by the user, without doing any programming work. Information from diverse conventional applications (databases, spreadsheets, etc) can be imported into a CAT3 database and integrated into a coherent system by the user without programming tasks. A small number of interfaces and reports can be used over and over again, for different domains of information, without needing duplication. At the system programming level there is a single programming design to be learned, with a highly methodical structure, dramatically simplifying the problems for application developers.

The CAT3 representation is fundamentally different from conventional means of representation of information in databases: conceptual information is represented through the same general methods as empirical information. For example, the constructions of all calculated functions inserted in the database are transparently available as ordinary information. All referential identities—e.g., inter-table identities between intended references of fields, records or data—are transparently available as ordinary information. All conceptual relations—e.g., hierarchical relations between categories, properties, classes, etc—are transparently available. It is possible to search, group, and manipulate this information like any other information. For example, one can store information defining programmed objects used by the CAT3 Database system as information. The contents of list boxes that appear on various screens of an application, for example, is stored as information in the CAT3 Database, rather than being hard-coded or stored in a multiplicity of separate tables. Properties of all controls used in Forms can be stored as information, and manipulated by editing the data if desired. Even the underlying code defining the system can be stored as information.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

BRIEF DESCRIPTION OF THE DRAWINGS

FIG. 2 shows the various fields in a CAT3 table in accordance with an embodiment of the present invention.

FIG. 3 illustrates the interior of a point, the exterior of a point and the interior of the exterior of the point in accordance with an embodiment of the present invention.

FIG. 35 illustrates how to join between two tables using identity edges in accordance with an embodiment of the present invention.

FIG. 36 shows an example of join between two tables using identity edges in accordance with an embodiment of the present invention.

FIG. 48 shows the various fields of the CAT3 table in accordance with an embodiment of the present invention.

FIG. 49 shows the first few records of the CAT3 table in accordance with an embodiment of the present invention.

FIG. 51 shows examples of records in the Briefs table in accordance with an embodiment of the present invention.

FIG. 54 shows the SQL used in the CAT3 Lattice form in accordance with an embodiment of the present invention.

FIG. 57 shows the SQL query used by Flatland form in accordance with an embodiment of the present invention.

FIG. 61 shows the datasheet view of the tables used in the CAT3 implementation in accordance with an embodiment of the present invention.

FIG. 62 shows the SQL query used in the datasheet view and its query builder view in accordance with an embodiment of the present invention.

FIG. 63 shows the Flatland data entry form in accordance with an embodiment of the present invention.

FIG. 64 shows the SQL query used in the Flatland data entry form and its query builder view in accordance with an embodiment of the present invention.

FIG. 68 shows points included as part of CAT3 network and point outside the network in accordance with an embodiment of the present invention.

Figure 1:
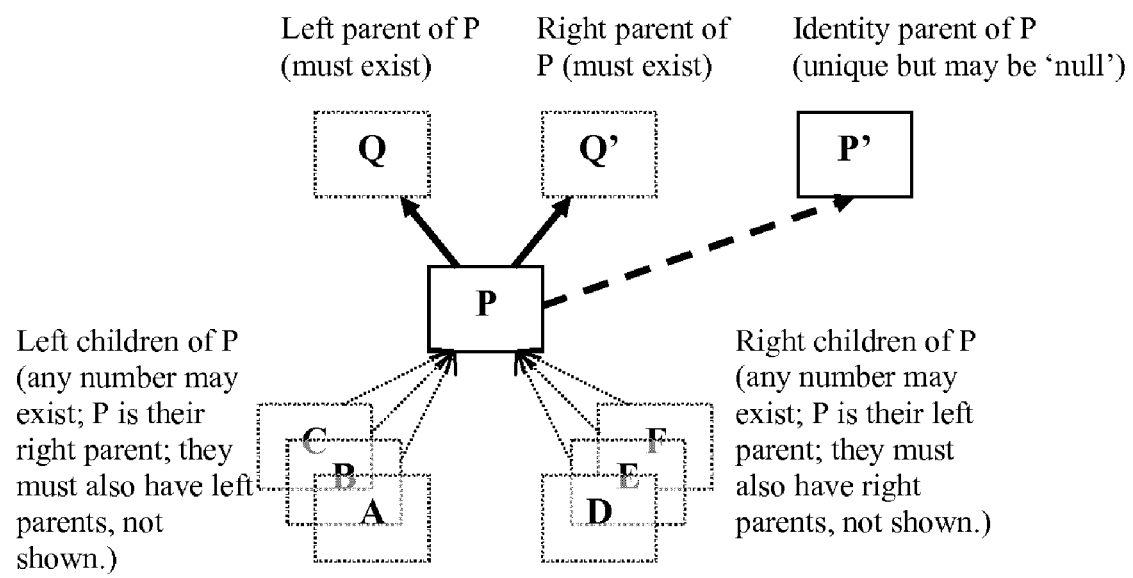
FIG. 1 illustrating a CAT3 point with edges in accordance with an embodiment of the present invention.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

A preferred embodiment of the present invention is now described with reference to the figures. Reference in the specification to "one embodiment" or to "an embodiment" means that a particular feature, structure, or characteristic described in connection with the embodiments is included in at least one embodiment of the invention. The appearances of the phrase "in one embodiment" or "an embodiment" in various places in the specification are not necessarily all referring to the same embodiment.

Some portions of the detailed description that follows are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by a variety of operating systems.

The present invention also relates to an apparatus for performing the operations herein. This apparatus may be specially constructed for the purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

In addition, the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

CAT3 Definition

A CAT3 Database is a computerized database system designed to implement a CAT3 Network as a structure for representing information. A CAT3 Network is defined as a specific type of finite binary directional graph, represented by a structure of points and edges, as defined below. Information is represented via an interpretation, which specifies the intended semantics for CAT3 Network elements and structures, and methods for translating between conventional representations of information and equivalent CAT3 representations. When equipped with an interpretation the CAT3 Network is a representational space, which may be implemented as a computerized database to form a CAT3 Database. A CAT3 Database is defined by: (1) A representation of the CAT3 Network as a relation. (2) Programmed functions designed to manipulate the content of the CAT3 Network. It also includes: (3) methods and programmed interfaces for building complex relationships between data items in the CAT3 Network to represent complex semantic relationships or information; (4) programmed tools for importing data from conventional representations into the CAT3 Network; and (5) programmed tools for outputting information in various formats, rendered as reports, graphs, tables, etc.

Some benefits of the various embodiments include: (i) To provide a system suitable for computerized representation of information that has significant advantages over current methods, in terms of completeness of representation, simplicity of programming construction, generality of functions, flexibility and control for the ordinary user, and comparative ease of use compared to current methods used for equivalent purposes. (ii) To provide a system for constructing practical information systems that can be used to represent a wide variety of complex information, from a wide range of alternative formats, in a single integrated network, with a simple and accessible semantics. (iii) To provide a superior system for duplicating conventional database designs with very complex structures, e.g., involving large numbers of tables and fields with many conceptual or ontological categories, or requiring flexible expansion or reorganization of information by the user. (iv) To provide a system of representation that facilitates exchange of information between diverse users, by establishing a representing a wide variety of information through a single, universal formal structure. (v) To provide a method of representing objectual information that removes the distinction (regarded here as arbitrary) between 'conceptual' information, traditionally fixed by hard-coded structures (such as table constructions, structured query language (SQL) functions, and programmed calculations designed to represent conceptual categories and analytically defined relations), and soft-coded data (table records and data used to populate tables to record empirical information). The current method aims to render all information with soft-coded data. (vi) To provide a system for representation of information enabling a compositional theory of meaning, reflected in representation of all information through a single Table (Relation), making possible a unified semantic interpretation for all symbolic representations. (vii) To provide a simple, practical programming system for constructing applications through a systematic method, with a minimal need for ad hoc construction of special programmed objects. (viii) To provide a representational space with a fixed range of symbolic constructions, in such a way that the key operational functions can be programmed by general recursive functions that refer only to types of structural relations between records, rather than being specific to record content. (ix) To provide a system of representation with greater flexibility and representational power than the traditional methods of relational database construction. (x) To provide a system of representation suitable for representing hierarchical structures, but with greater flexibility and representational power than traditional hierarchical databases. (xi) To provide a system of representation with clearer structure and conceptual transparency than traditional spreadsheet constructions. (xii) To provide a system of representation with the potential to duplicate key features of natural language semantics.

The following sections provide details of the following topics: (a) An abstract mathematical definition of the CAT3 Network, and special structures or sub-graphs of special interest. (b) Interpretation of various conventional representations of information as CAT3 Network representations. (c) Methods for implementing various types of mathematical or logical functions or calculations via standard semantic elements in the network. (d) A system for programming a representation of the CAT3 Network in a conventional relational database, using a single relation (table) with a fixed structure for the fundamental representation. Also included as part of a practical implementation, are details of programming methods such as: (a) A system of conventional SQL functions to manipulate the content of the CAT3 Network through a relational database platform. (b) A system of user interfaces (forms, reports, tools) with functionality designed for viewing and operating on the CAT3 Network, and conventions for rendering and reading information on screens or pages.

The CAT3 Network: Definition of a Mathematical Structure

A CAT3 Network is defined as a (finite, discrete) three dimensional binary directional graph (3-D bigraph), comprising a set of points connected (or joined) by edges, with edges in three distinct dimensions. The term points is used here rather than vertices as is more usual in graph theory. The points are assigned specific kinds of data as their content. Topology axioms for the network which define the structure of edges, are distinguished from content axioms for the network which define the types of data associated with individual points. The key axioms of the network topology specify that there are three types of edges, representing three distinct dimensions (with six directions) and that there is a unique maximal point, called CAT3. Edges are directional, and each edge may be described as going 'upwards' from a 'child point' to a 'parent' point, or alternatively, as going 'downwards' from a 'parent point' to 'child point'. Edges are considered going upwards from a point as belonging to that point. The edges upwards from a point are also called the parenting edges of the point. Edges going downwards from a point belong to the child points. The three types of edges are called left edges, right edges, and identity edges (sometimes called links or function edges). Every point has exactly 3 parenting edges, one of each type, but the identity edge may be null, whereas the left and right edges cannot be null. That is, each point must have a unique left (parenting) edge and a unique right (parenting) edge. These respectively define a unique left parent (point) and right parent (point), also called category parents. Each point may also have a unique identity edge to an identity parent; but this parent may be null. If the identity edge of a point is null the point is said to be an atomic point, otherwise the point is said to be linked (or functionally dependant on the identity parent).

Note that points lacking identity parents are considered as having null identity edges rather than as having no identity edge. A null edge may be defined as an edge with the upper parent missing or null. This 'parentless 'edge' can be understood by regarding edges as partial functions; see the note below. In a preferred interpretation null identity edges are assigned a special point in the network as parent to represent the null value, i.e., specifically representing that the point is atomic. All connected paths of edges upwards eventually converge at a maximal point in the CAT3 Network, called the CAT3 point. Note that the CAT3 point itself has parenting edges to a point outside the CAT3 Network, called the Zero point. The Zero point may provide its own parents, but it is not in the CAT3 Network. Only the CAT3 point parents directly to the Zero point. Edges for all other points have parents in the CAT3 Network, or are null. A point may have any finite number of child edges, connecting it downwards to dependant points (also called child points). The CAT3 Network is defined entirely by its sets of points (including their content, see below) and their edges. A CAT3 Network can be regarded as a graphical mosaic, with points and their edges forming standard 'tiles' of the mosaic.

Note that by distinguishing edges as being of three distinct types, the network structure can be defined as a three dimensional binary directional graph. An alternative formulation is to treat the three edges from each point as forming a single 4-place relation (or 3-place function). This is more accurate in a certain sense, and directly reflects the table representation. In the table representation, the edges from each point are directly represented by a set of ordered quadruples: (BID, BID1, BID2, BID3), where the BID's are integers used as record identifiers referring uniquely to points. This represents a (partial) function from each BID to an ordered triplet, (BID 1, BID2, BID3). This is a partial function, with null values allowed for BID3, representing the notion of a null identity edge. It is convenient to treat this partial function as a combination of three directed binary relations for most purposes.

A CAT3 Network may be embedded as a sub-graph of a larger graph structure. Such a sub-graph is a CAT3 Network as long as there is a structural isomorphism from the sub-graph to a complete CAT3 Network. In a preferred implementation (below) a CAT3 Network is represented as embedded in a larger network which contains at least one extra point (the Zero point), and which may also embody additional sub-graphs that strictly contradict the CAT3 properties.

FIG. 1 illustrates the basic 'mosaic' element for the CAT3 Network construction as a point, P, with three types of parenting edges. A point P may be inserted into an existing CAT3 Network by being connected to any point Q in the up-left direction, and any point Q' in the up-right direction. It may be also connected to any point P' by an identity edge. Q and Q' are called the left and right parents of P, respectively and are considered immediately above P. P is called a right child of Q, and a left child of Q' and is considered immediately below Q and Q'. Note that Q and Q' need not be distinct. The third relation (dashed line) between P and P' is called an identity link (or function.) P is considered linked to P', or P is an image of P', or that P' is a function for P. As shown in FIG. 1, there may be several points with the same parents. Some child points of P (i.e., A, B, C, . . . , on the left, and D, E, F, . . . on the right) are also shown; any number of these may be inserted.

CAT3 Network Axioms

Axiom 1. Each point P in the network has exactly three distinct types of binary, directed edges going upwards, a left edge, a right edge (also called parenting edges), and an identity edge (also called a link, or a function edge). The edge relations are asymmetric, non-reflexive and non-transitive.

A relation is asymmetric means that if there exists an edge of type E from a point P to point Q, (represented as E(P,Q)), there cannot exist an edge of type E from Q to P (represented as not-E(Q,P), i.e., if E(P,Q), then not-E(Q,P). A relation is non-reflexive if for any point P, there cannot exist an edge from the Point P to itself, i.e., for any P, not-E(P,P). A relation is non-transitive if there exists an edge of type E from point P to point Q and also there exists an edge of type E from point Q to point R, then there cannot exist an edge of type E from point P to R, i.e., if E(P,Q) and E(Q,R) then not- E(P,R).

Every point P is the start-point for each of its own 3 edges; the 'higher' point the edge maps to is called the end-point. Edges are considered to go 'up' from start-points to end-points. End-points are 'above' the start-points, as parents are above children in a family tree.

Axiom 2. Every point P in the network, with the exception of a unique maximal point called the CAT3 point, has left and right edges with end-point in the CAT3 Network. Left and right edges of a point may have the same end-points.

Axiom 3. For every point P in the network, its identity edge may have an end-point in the network, or may be null. A special point in the network may be defined as an identity parent to represent null identity edges. An identity edge referring to a point in a larger structure outside the CAT Network is null. Note that a null identity edge by definition does not form part of any path in the CAT3 Network. The CAT3 point is conventionally defined as the special point in the CAT3 Network and represents the null identity parent for identity edges.

Axiom 4. Any point P in the network may in general be the left, right or identity parent (end-point) for an unlimited number of other points. If the identity edge of a point P has no end-point in the network (is null) then P is an atomic point. Otherwise it is not an atomic point.

Axiom 5. There exists a unique maximal point in the network, here called CAT3, to which every other point P in the network is connected by every possible maximally extended path of edges going upwards from P.

Axiom 6. The maximal CAT3 point does not have parents in the network, and there is no path (or extension of any paths) upwards from CAT3 to any point within the network.

The set of all network points in all paths upwards from P, including P, is called the interior of P. The set of all network points that have P in their interior is called the exterior of P. Note P is in its own interior and exterior, and CAT3 is the only point in every interior). A (finite) path upwards [downwards] is a (finite) sequence of points: $P_1, P_2, \ldots P_n$, such that there is an edge (not including any null identity edges) upwards [downwards] joining each adjacent pair in the sequence: ($P_i$, $P_{i+1}$). Axiom 5, and the fact the network is finite, means that if starting from a point P and following edges upwards, choosing left or right parents at each point, it is always possible to eventually reach the CAT3 point in a finite number of steps. Although different paths may have different lengths, there is no further extension upwards of any paths from the CAT3 point. This implies that: there are no cyclic paths (loops) in the upward direction and there are no cyclic paths in the downward direction.

There are no cyclic paths (loops) in the upward direction. This can be proved as follows. Assume there is a cyclic path upwards, i.e., a connected path upwards from point P that returns to point P. Repeating this cycle indefinitely represents an infinitely long path upwards in the network. This is a possible maximal extension of the path. But Axiom 5 states that every such path connects to CAT3. Then either: (i) CAT3 is in this path—which is a contradiction, since then there could be no extension of the path back to P, by Axiom 6; or (ii) CAT3 is not in the path—which contradicts Axiom 5. Hence, there are no cyclic paths (loops) in the upward direction. There are no cyclic paths in the downward direction. The reversed sequence of points of a cyclic path downwards defines a cyclic path upwards. There can be no such paths by the previous proof.

So moving exclusively up or exclusively down, it is never possible to return to the starting point. However there may be cycles in network paths if direction is ignored. For Axiom 6 to hold, one must choose either that the CAT3 point has no parents at all or define the CAT3 point as a unique point having end-points outside the network. The preferred embodiment chooses the latter:

Axiom 7. There are one or more points, which are not in the CAT3 Network, called Zero points, which provide the left and right parents of the CAT3 point. There may be just one additional point which is not in the CAT3 Network, called the Zero point, which provides the left and right parents of the CAT3 point, and is also its own left and right parent.

This means there is at least one additional point in a larger relational structure, which is used to implement the CAT3 Network. This Zero point does not connect upwards to the CAT3 point, and is intuitively not a part of the 'CAT3 representation'. It does not provide any information in the CAT3 representational space. This may be considered as a purely practical choice: the Zero point is introduced outside the network of CAT3 points because this is the simplest way to maintain a universal rule that every point in the network has a left and right parent, but no point in the network is its own parent. This is convenient for implementing a table representation of the edge relation in a conventional relational database.

Intrinsic Properties of Points and Edges.

Axiom 8. The only intrinsic (or defining) properties of an edge are its type (left, right or identity edge), and its start-point and end-point. For example, if an edge E connects from a point P to Q in the up-left direction, then this is all the information used to define E. Therefore edges are represented by ordered pairs of points: E=(P, Q). Note that left and right edges must have both a start point and end point, but identity edges can have only a start point, with null end point.

Axiom 9. Points have an intrinsic property, called content, which is a function associating each point with a fixed set of symbolic types or data. Each point is considered a 'data token', interpreted as representing a 'fact'. The symbolic format defined next for content has been chosen as a fundamental way of representing empirical, temporal facts. In this scheme, content is represented directly by 5 symbolic elements that are needed for interpretation of the structure as an information space.

Interpretation 1: Each point is represented with five primary elements of content, equivalent to five symbolic fields associated with each point. These have names and formats:

| Number | Field | Symbol format | Ontology (epistemic base) |
|---|---|---|---|
| (i) | Title | (alphanumeric string) | Object Names |
| (ii) | Order | (integer - ordinal) | Order for Sets |
| (iii) | Value | (decimal - real) | Quantitative Values |
| (iv) | Date1 | (date-time) | Moments of Time |
| (v) | Date2 | (date-time) | Moments of Time |

This is the minimal content associated with each point on the intended semantic interpretation of points, which takes each point to represent an atomic fact. However because of the possibility of extending content and potentially reducing content for pragmatic purposes, this is characterized as an interpretation rather than a fixed axiomatic requirement. The first five fields specified in this interpretation gives a structure of data that is ideal for specifying empirical information in the CAT3 space. This interpretation of point content can be extended, but it is already quite general in principle.

Interpretation 2: A programmed CAT3 Database system can introduce additional content fields, without altering the functionality or method of the system, or its existing interpretations. For example, an additional field called Prob is introduced, to represent probabilities of truth (or existence), allowing convenient generalization of classical logic, allowing non-deterministic probability laws, or insertion of Bayesian probability models.

| Number | Field | Symbol format | Ontology (epistemic base) |
|---|---|---|---|
| (i) | Prob | (decimal) | Probability |

Such extensions may be avoided in principle by methods described later, but extending the intrinsic content may provide the most pragmatically convenient way of solving some programming problems.

Interpretation 3: The minimal content is extended with a set of four additional elements, called Hfunction, $Hf1$, $Hf2$, $Hf3$. These act as parameters allowing us to conveniently program a class of hierarchical functions.

| Number | Field | Symbol format | Ontology (epistemic base) |
|---|---|---|---|
| (i) | Hfunction | (integer) | Index specifying function type |
| (ii) | Hf1 | (Yes/No) | Include in Left Parent calculations |
| (iii) | Hf2 | (Yes/No) | Include in Right Parent calculations |
| (iv) | Hf3 | (Yes/No) | Include in Identity Parent calculations |

FIG. 2 shows the various fields of the CAT3 network as implemented in a relational table. Again, this extension of point content can be avoided in principle, by adding equivalent information via empirical records associated with the exterior of points as discussed below. However the Hfunction incorporated here is so integral to the intended application of the system that extending the content fields is pragmatically sensible.

CAT3 Network as a Relation.

The definition of a CAT3 Network can be characterized as a relation (in the language of model theory and relational database theory). It is defined over the set of network points, regarded as fundamental objects. Each point is associated with: (i) its three parenting edges, and (ii) its content elements (symbolic strings). These are called the CAT3 Edge Relation and the CAT3 Content Relation, respectively.

A CAT3 Edge Relation represents edges originating from a point P i.e., P→(Q, Q', P'), where Q is the left parent of P, Q' is the right parent of P and P' is the identity parent of P (may be null). A CAT3 Content Relation represents the content associated with a point P, i.e., P→(Title, Order, Value, Date1, Date2), where Title is an alphanumeric string, Order is an integer symbol, Value is a decimal number symbol, Date1 is a date-time symbol and Date2 is a date-time symbol. The extended content relations (Interpretations 2 and 3 above) are represented by CAT3 Content Relation 2, i.e., P→(Prob) where Prob is decimal number symbol and CAT3 Content Relation 3, i.e., P→(Hfunction, $Hf1$, $Hf2$, $Hf3$) where Hfunction is an integer symbol, $Hf1$ is a binary value symbol (0,1), $Hf2$ is a binary value symbol (0,1) and $Hf3$ is a binary value symbol (0,1).

The mapping function is equivalent to a table in a relational database representation called the CAT3 Table. Table records represent CAT3 Network points and are referenced by a primary keyed field called BID (long integer). The edge relation is defined by an ordered triple of fields called: BID1, BID2, BID3, with values referencing the primary BID field. The primary content relation 1 is defined by fields called: Title, Order, Value, Date1, and Date2. The extended content relation 2 is defined by a field called Prob and the extended content relation 2 is defined by fields called Hfunction, $Hf1$, $Hf2$, and $Hf3$.

Graph Topology: Interiors, Exteriors, Interiors of Exteriors, Connected Points.

Some basic mathematical concepts used to specify properties of CAT3 Networks are defined below.

INTERIORS. The Interior of P in a CAT3 Network is the sub-graph consisting of all the points and edges in the Network that are connected by edge paths upwards from P (including P and its edges). This includes the left, right, and identity edges and parents of P, similarly the parents of the parents of P, and so on, up to the CAT3 point. The Interior of a set of points is the sub-graph comprising the union of Interiors of each point in the set. The Category Interior of P is the sub-graph consisting all the points and their edges in the Network that are connected by Category edge paths (paths formed from left and right edges, not identity edges) upwards from P (including P and its Category edges). This includes the left and right and parents of P, similarly the Category parents of the Category parents of P, and so on, up to the CAT3 point. The Category Interior of a set of points is the sub-graph comprising the union of Category Interiors of each point in the set. The Identity Interior of P is the sub-graph comprising all the points and their edges in the Network that are connected by Identity edge paths upwards from P (including P and its identity edge).

Properties of the Interior of a point P are as follows: (1) The Interior of P in a CAT3 Network is a CAT3 Network. (2) The Interior of any set of points in a CAT3 Network is a CAT3 Network. (3) The Interior of any point in the Interior of P is a sub-graph of Interior of P (or embedded in the Interior of P). (4) The Category Interior of P in a CAT3 Network is a CAT3 Network. (5) The Category Interior of any set of points in a CAT3 Network is a CAT3 Network. (6) Identity Interiors do not form CAT3 Networks. (7) Reflexive: P is always in the interior of P. (8) Non-Symmetric: If P is in the interior of Q then Q is not in the interior of P unless P=Q. (9) Transitive: If P is in the interior of Q and Q is in the interior of R then P is in the interior of R.

Exteriors. The Exterior of P in a CAT3 Network is the sub-graph comprising all the points in the Network that have P in their Interior, and all the common edges of these points. The Exterior of a set of points is the sub-graph comprising the union of Exteriors of each point in the set. The Category Exterior of P in a CAT3 Network is the sub-graph comprising all the points in the Network that have P in their Category Interior, and all the common Category edges of these points. The Category Exterior of a set of points is the sub-graph comprising the union of Category Exteriors of each point in the set. The Identity Exterior of P in a CAT3 Network is the sub-graph comprising all the points in the Network that have P in their Identity Interior, and all the common edges of these points.

Properties of the Exterior of a point P are as follows: (1) The Exterior of the CAT3 point is the entire CAT3 Network. (2) The Exterior of a set of points containing the CAT3 point is the entire CAT3 Network. (3) The Exterior of any point in the Exterior of P is a sub-graph of Exterior of P (or embedded in the Exterior of P). (4) The Category Exterior of the CAT3 point is the entire CAT3 Category Network. (5) The Category Exterior of a set of points containing the CAT3 point is the entire CAT3 Category Network. (6) The Exterior of P in a CAT3 Network is never a CAT3 Network unless P is the CAT3 point. (7) The Exterior of a set of points in a CAT3 Network is never a CAT3 Network unless the set contains the CAT3 point. (8) The Category Exterior of P in a CAT3 Network is never a CAT3 Category Network unless P is the CAT3 point. (9) The Category Exterior of a set of points in a CAT3 Network is never a CAT3 Category Network unless the set contains the CAT3 point. (10) The Identity Exterior of a point P is a Tree (not a CAT3 Network). (11) The Identity Exterior of a set of points is a set of Trees (not a CAT3 Network). (12) Reflexive: P is in the exterior of P. (13) Non-Symmetric: If P is in the exterior of Q then Q is not in the exterior of P unless P=Q. (14) Transitive: If P is in the exterior of Q and Q is in the exterior of R then P is in the exterior of R.

Interiors of Exteriors. The Interior of the Exterior of P in a CAT3 Network is the Interior of all the points in the Exterior of P. The Interior of the Exterior of a set of points is the Interior of all the points in the Exterior of the set. Category Interiors of Exteriors of points and sets are defined in the obvious way. Note that the Exterior of the Interior of any point is trivially the CAT3 Network.

Properties of the Interior of the Exterior of a point P are as follows: (1) The Interior of the Exterior of a point P is always a CAT3 Network. (2) The Interior of the Exterior of a set of points is always a CAT3 Network. (3) Symmetric: P is in the Interior of the Exterior of Q just in the case when Q is in the Interior of the Exterior of P. (4) Reflexive: P is in the Interior of the Exterior of P. (5) Non-Transitive: If P in the Interior of the Exterior of Q and Q in the Interior of the Exterior of R it does not follow that P in the Interior of the Exterior of R.

Connections Between Points. P is directly connected to Q just in the case when P is in the Interior of Q or the Exterior of Q. P is Directly Connected Upwards to Q just in the case when Q is in the Interior P. P is Directly Connected Downwards to Q just in the case when P is in the Interior Q. Direct connections between points are equivalent to the existence of Upwards or Downwards paths connecting the points. Every point is directly connected Upwards to the CAT3 point.

P is Indirectly Connected (Externally connected) to Q just in the case when P is in the Interior of the Exterior of Q but not in the Interior or Exterior of Q. P is Directly Connected Upwards to Q just in the case when Q is in the Interior P. P is Directly Connected Downwards to Q just in the case when P is in the Interior Q. Direct connections between points are equivalent to the existence of Upwards or Downwards paths connecting the points. Every point is directly connected Upwards to the CAT3 point.

P is Indirectly Connected (Exterior Connection) to Q just in the case when P is not directly connected to Q and P is in the Interior of the Exterior of Q. P←R→Q is an Exterior Connection (between P and Q) just in the case when P and Q are both in the Interior of R. P is Indirectly Connected to Q just in the case when P is not directly connected to Q and there is a point R such that P-R-Q is an exterior connection. P→R←Q is an Interior Connection just in the case when P and Q are both in the Interior of R. P→CAT3←Q is an Interior connection for any points P,Q.

The Closure of P is the minimal sub-graph of the CAT3 Network containing P and every point in the Interior of the Exterior of P and such that for every point Q in the sub-graph except the CAT3 point, if R is in the Interior of the Exterior of Q then R is in the sub-graph. The Closure of P is a CAT3 Network. Q is in the Closure of P is an equivalence relation. The Closure of any point P minimally contains the Interior of the Exterior of any CAT3 Partition in the Interior of P. If the Closure of two points P and Q are mutually disjoint, except for the CAT3 point, then there are no connections between P and Q except the interior connection: P→CAT3←Q.

The Interior Surface of P is the sub-graph comprising (i) P and its left and right edges, (ii) points on mono-directional paths left upwards from P with their left edges, and (iii) points on mono-directional paths right upwards from P with their right edges. The Exterior Surface of P is the sub-graph comprising (i) P and: (ii) points on mono-directional paths left downwards from P and their right edges, and (iii) points on mono-directional paths right downwards from P and their left edges.

FIG. 3 illustrates a point I in the interior of P, and a point E in the exterior of P. P connects above to I, by some parenting-edge path. P connects below to E, by some parenting-edge path. P, I, and E are all directly connected to each other. The interior of the exterior of P is all the interior points of all the exterior points of P. F is in the interior of the exterior of P. P and F are indirectly connected through E.

Recursive Definitions of Int(P) and Ext(P): The Interior and Exterior can be defined recursively. Following is a notation which uses the (un-bolded) term: 'P' for the atomic graph comprising the point P and its parenting edges. The terms: $P^1$, $P^2$ and $P^3$ denote the left, right and identity parents, respectively, of P. The terms: $P^1$, $P^2$ and $P^3$ denote the atomic graphs for those parents in turn. Int(P) is defined as the Interior of P. A recursive definition can then be formulated as:

$$Int(P) = P + Int(P^1) + Int(P^2) + Int(P^3)$$

Where '+' represents network (sub-graph) unions. Expanding this:

The interior of a point P (i.e., Int(P)) can be defined recursively as follows.

$$Int(P) = P + Int(P^1) + Int(P^2) + Int(P^3)$$
$$= P + (P^1 + Int(P^{11}) + Int(P^{12}) + Int(P^{13})) +$$
$$(P^2 + Int(P^{21}) + Int(P^{22}) + Int(P^{23})) +$$
$$(P^3 + Int(P^{31}) + Int(P^{32}) + Int(P^{33}))$$
$$= \ldots$$

The axiom of a maximal point means that this is always finite, i.e., Int(P) is finite, and for any P, there is always a finite unquantified function defining Int(P):

$$Int(P) = P + P^1 + P^2 + P^3 + P^{11} + P^{12} + P^{13} + P^{21} +$$
$$P^{22} + P^{23} + P^{31} + P^{32} + P^{33} + P^{111} + P^{112} + P^{113} + \ldots$$

The minimal number of terms equals the number of points in Int(P). But it is not determined analytically from P alone what this minimal number of terms are.

A recursive definition of the Exterior of P (i.e., Ext(P)) can be similarly given as follows:

$$Ext(P) = P + \{\text{For all } R \text{ such that } P = R^1 \text{ or } P = R^2 \text{ or } P = R^3 \colon Ext(R)\}$$

But this is not such a simple inductive function as that for Int(P), because it requires an embedded quantification. This is unavoidable because the range of child points below P is empirical, not determined analytically, and it can only be referred to in general by a quantified expression. This leads to an indefinite series of embedded quantifications when Ext(P) is expanded. For this reason Ext(P) is a more complicated object to define than Int(P).

Special Structures, Tiling Procedures and Sub-Graphs for Representations.

A CAT3 Representational Space uses only CAT3 Network graphs to represent information. However not all possible types of CAT3 Network graphs are intended to be used as representational structures. Only a sub-set of special types of patterns or sub-graphs are intended to be used. Since this class may be extended by the user it is not strictly defined, but key examples of intended structures are given below.

A CAT3 Network (or part of a CAT3 Network) consisting of these intended graphs is called a CAT3 Space graph. Some types of structures may be excluded as CAT3 Space structures—see the following example. However these are not excluded from being formed via the CAT3 Network. It may be necessary to modify a given CAT3 Space structure (transforming an existing representation), and certain unintended structures may need to be temporarily formed in the transformation process.

Figure 4:
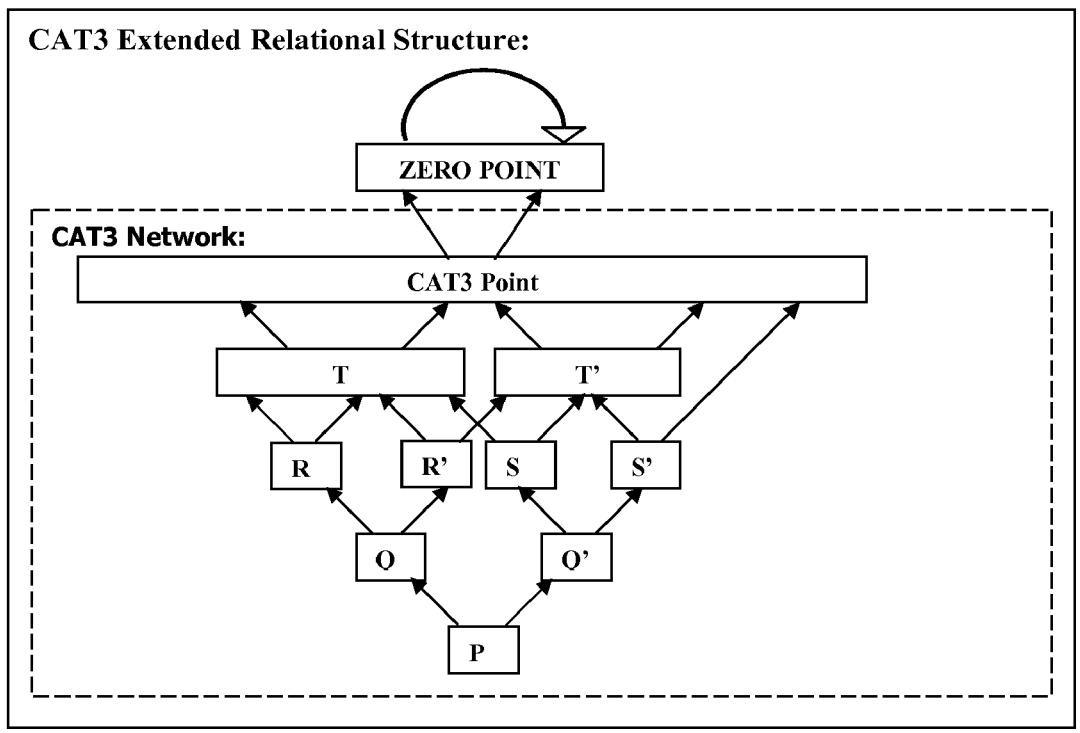
FIG. 4 illustrates an arbitrary CAT3 network in accordance with an embodiment of the present invention.

FIG. 4 illustrates an arbitrary CAT3 network. This structure satisfies the definition of a complete CAT3 Network, but this graph is not a useful structure from our point of view. The entire network comprises the interior of a point, P, and shows every parenting path upwards eventually arriving at CAT3. Note that every path upward from P reaches CAT3 and CAT3 parents to the Zero point. The Zero point parents back to itself and is not in the CAT3 network. R has T as both its left and right parent. Q, R, R', and T form an example of a diamond lattice, a fundamental sub-graph to be used below. Q and Q', the parents of P, split into two different sets of parents, failing to form a diamond lattice. Most parents in this network maintain consistent hierarchical levels relative to each other, except S', where the right parent jumps up a level directly to CAT3. R' and S have exactly the same interiors, meaning they have the same conceptual categories, or belong to the same group or list. The network defines a partial order relation based on the 'above' relation. The pair of R and R' has T as a least upper bound (lub), and Q as a greatest lower bound (glb). But the pair of points R' and S has no lub, because both T and T' are (distinct) upper bounds, but are not ordered. Conversely, the pair of T and T' has no glb, because both R' and S are (distinct) lower bounds, but are not ordered. Hence this network, which is the interior of P, does not represent a mathematical lattice. This is the case for a CAT3 Network comprising the interior of P whenever there are two points with identical interiors (R' and S) which are both in the interior of P (a sufficient, but not necessary, condition). The main practical interest is in stricter 'lattice sub-graphs ', where the interiors of points form lattices, and there are no jumps across parenting levels, except for functions. If the sub-graph containing all the points is considered but with only left parent edges, or only right parent edges, simple hierarchical trees are obtained, with variable (arbitrary) numbers of branches at each node.

Various intended types of graphs and their interpretations are specified later, but first a view of the CAT3 Network as a mosaic construction, generated by a recursive tiling process is described. This allows the definition of recursive operational procedures for constructing CAT3 Networks with necessary sub-graphs, and rules out undesirable sub-graphs like that illustrated above. This kind of constructive procedure is suited to the computerized implementation, where there is a need to expand and modify CAT3 Networks incrementally, using a limited set of recursively defined operations.

Mosaic Construction View.

Abstract axioms described above identify the defining properties of a CAT3 Network. But this does not give us any idea of how to 'construct' such a network—or how to construct 'useful' types of CAT3 Networks to implement representational spaces. A second, more practical approach is to generate CAT3 Networks via 'mosaic tiling' operations. These tilings are called the generators of the space of Networks. It is possible to start with an initial network, and build onto it using certain constructions. The most general rules for construction are:

General CAT3 Network Construction Rules.

Network Rule 1. Point Insertion. Extension of an existing CAT3 Network by insertion of a new point by: (i) defining the point content, and (ii) creating left and right edges to existing points in the Network. The end-points of the edges (parents) can be freely chosen from any existing points. A CAT3 Network always results (Consistency condition). Furthermore, the left and right edge structure of any CAT3 Network can be generated by applying this process to the minimal Network, comprising just the Zero point and CAT3 point (Completeness condition).

Proof of Consistency is as follows. Let P be the new point and Q and Q' be the new left and right parents. Since Q and Q' are in an existing CAT3 Network, all their maximal paths upwards end at the CAT3 point, with no cycles. All paths upwards from P go first to Q or Q', and then follow existing paths upwards from these points. Hence all the maximal paths upwards from P are simple extensions of maximal paths from Q and Q', and the same properties hold. Given all other CAT3 Network axioms are satisfied, the axioms must remain satisfied by the extended network.

Proof of Completeness is as follows. Assume, a rank ordering of all points is created as a sequence of finite sets, beginning with (i) the CAT3 point, then (ii) all the points with this point as the sole parent (for left or right edges), then (iii) all points with any of the points in (i) or (ii) as the parents, and so on, until any more such classes cannot be found. It can be shown that this includes all the points of the Network. Given this lemma, the insertion rule can be applied to each of the classes, (ii), (iii), etc, in turn, to create the parenting structure for all points. To prove the lemma, one can suppose that some points cannot be found in the sequence of (i), (ii), (iii), etc, and prove that this must contradict the axiom that there are no cycles in paths upwards.

This only deals so far with the left and right parenting edges. Specification of the third edge (identity edge) for a new token is optional, and comes under the fourth rule, below, for modifying edges. What is called the content of the point is also secondary to the construction of the network. As well as inserting points, to change the network shape it is possible to delete points, giving the second rule:

Network Rule 2. Point Deletion. Contraction of the network by deletion of an existing point requires removing all edges for which it forms an end-point, which requires: (i) deletion all its left and right child points, and (ii) deletion of any identity edges for which it forms an end-point. By recursion, deletion of child points requires deletion of their child points, and so on. Again it can be easily shown that this rule is consistent in always transforming preserving the CAT3 Network property.

Network Rule 3. Altering Edges 1 & 2. Alteration of the network by changing a left or right edge ('switching parents') requires changing the end-point of the edge. A parent of P can be changed from Q to Q' just in the case when Q' does not occur in any downward path from P before the change is made. This ensures that there are no cyclic loops upwards.

Network Rule 4. Altering Edges 3. Alteration of the network by changing an identity edge ('switching link') requires changing or deleting the end-point of the edge. Any identity edge can be consistently deleted. As before, an identity parent of P can be changed from Q to Q' just in the case when Q' does not occur in any downward path from P before the change is made.

Recursive application of these rules, beginning with the minimal Network, allows construction of any CAT3 Network. However these rules encompass the broadest class of CAT3 Networks, whereas in practice, there is need to generate Networks with special properties (incorporating special sub-graph structures). The rules to create this sub-class are more complex, and need not even be strictly fixed at this point: it may be necessary to extend the class for future interpretations. The following set of rules is not necessarily complete, but is sufficient to illustrate the main concepts.

Figure 5:
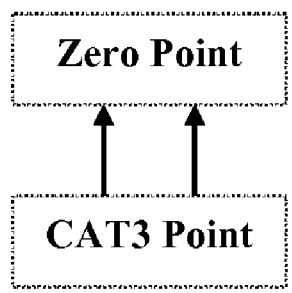
FIG. 5 illustrates the minimal network formed by tiling in accordance with an embodiment of the present invention.

FIG. 5 illustrates a minimal tiling network. The minimal Network has only the Zero Point and CAT3 Point. This is the common nucleus of every CAT3 Network, and these two points must be inserted first. They are always unique. Starting with this as the minimal sub-graph, the next step is to begin generating structures below the CAT3 point. Since no other point can have the Zero Point as a parent, at least one point must be inserted to begin with directly below the CAT3 point. This is called a CAT3 Partition. As many such Partitions can be inserted as necessary.

Figure 6:
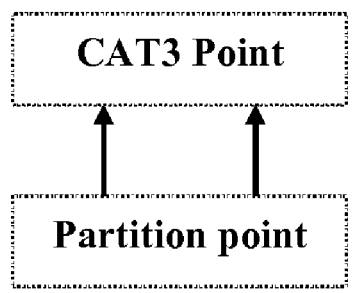
FIG. 6 shows a partition tiling in accordance with an embodiment of the present invention.
Figure 7:
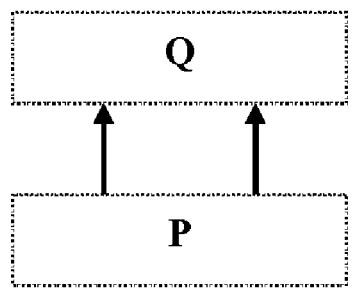
FIG. 7 shows an example of general partition tiling in accordance with an embodiment of the present invention.
Figure 8:
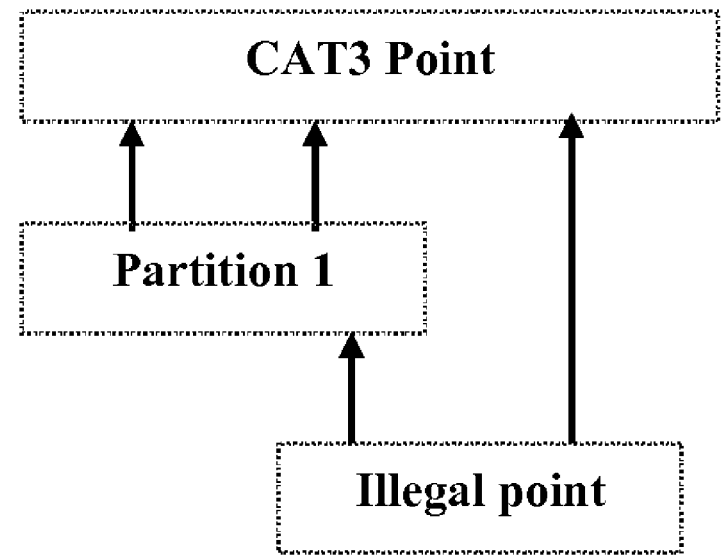
FIG. 8 shows an example of illegal tiling in accordance with an embodiment of the present invention.
Figure 9:
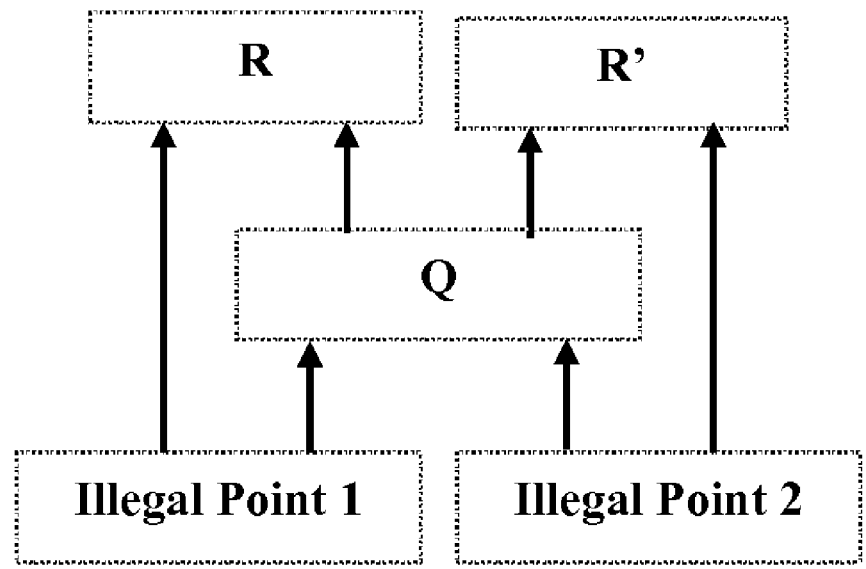
FIG. 9 shows a general example of illegal tiling in accordance with an embodiment of the present invention.

FIG. 6 illustrates CAT3 partitioning tiling. At least one CAT3 Partition point is used to begin building any structure. This is a special case of a general Partition tiling as illustrated in FIG. 7. A point P may be inserted immediately below any point Q (so Q is the left and right parent). P is called a Partition of Q. Any number of partitions can be inserted below any point. Note that inserting any points with left and right edges 'crossing' between such a Partition point and its parent is not allowed, i.e., tiling as illustrated in FIG. 8 is not allowed. FIG. 9 illustrates a more general example of illegal tilings for any point Q, R, R':

These tiling are consistent with the general CAT3 Network rules, but they directly cross between levels in the network hierarchy, and this is forbidden in the representational space presented. These restrictions apply only to left and right edges—identity edges can cross freely across the graph structure (as long as they do not create cycles, or circular loops back to themselves). Tiling rules for identity parents are considered later.

Figure 10:
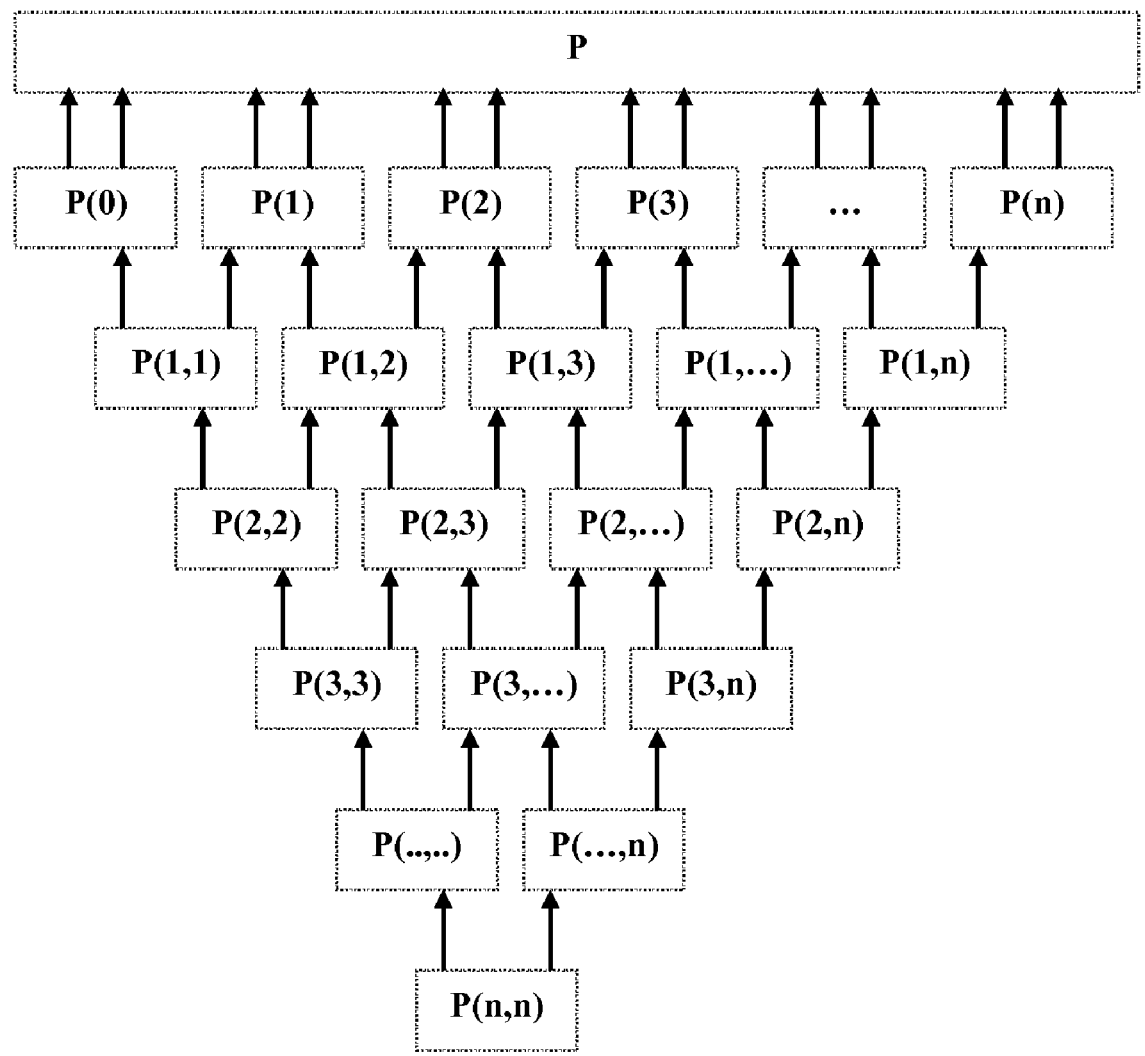
FIG. 10 shows a network with partition lattice tiling in accordance with an embodiment of the present invention.

To proceed, a structure of points called a Partition Lattice is inserted as illustrated in FIG. 10. The resulting structure is called a Platform. P may be any point, but is typically a Partition Point. (If P was the CAT3 point then the Partition Row 0 points would be a sub-set of CAT3 Partitions. This is admissible; but in the preferred interpretation CAT3 Partitions are kept separate (unordered, below), and begin building this type of structure below CAT3 Partitions, P. (i) Insert a Partition Row 0 with n+1 points: P(0), P(1), . . . , P(n), directly below P. P provides left and right parents for all points in Row 0. (ii) Insert a Lattice Row 1 with n points: P(1,1), P(1,2), . . . P(1,n) below the Row 0. Left and right parents for P(0,i) are P(i−1) and P(i), respectively. (iii) Insert a Lattice Row 2 with n−1 points: P(2,2), P(2,3), . . . P(2,n) below the Row 1. Left and right parents for P(1,i) are P(0,i−1) and P(0,i), respectively. . . . (iv) Insert a Lattice Row j with n−j+1 points: P(j,j), P(j,j+1), . . . P(j,n) below the Row 1. Left and right parents for P(j,i) are P(j−1,i−1) and P(j−1,i), respectively. . . . (v) Insert a Lattice Row n with 1 point: P(n,n) below Row n−1.

The Partition Row 0 forms a 'Platform' beneath which is stored information relevant to the partition P in the form of sub-graphs. The Partition P, Partition Row 0, and Lattice Rows 1 to n form a mathematical lattice (with 'x is higher than y' as the natural partial order relation). This is the fundamental type of sub-graph structure normally used to represent information. The purpose of the Partition Lattice structure, however, is not to store information directly in the Row points, but to provide an ordered structure to begin adding points to store empirical information. The lattice rows force a row order on Row 0, and provide a set of background points to orient ourselves as sub-graphs are added below the Partition Row 0. The Row Order is defined through the following concept of adjacent points (in a row).

ADJACENT POINTS (IN A Row). There are two structures sufficient for adjacency between two points, P and Q. Note adjacency is defined asymmetrically, with P to the left of Q. This can be distinguished as 'left-adjacency', and 'right-adjacency' introduced as the converse relation.

Figure 11:
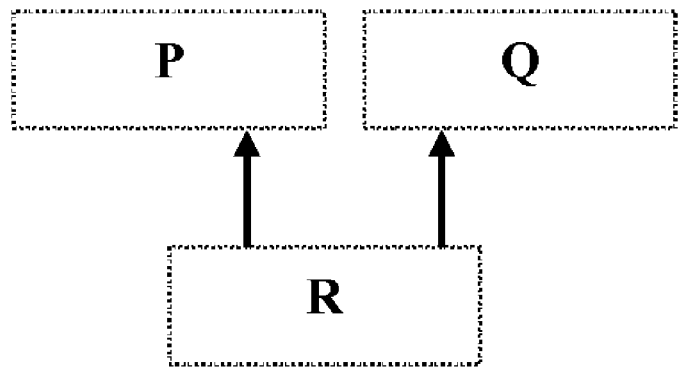
FIG. 11 illustrates adjacency rule 1 in accordance with an embodiment of the present invention.

(i) ADJACENCY RULE 1: FIXED BY EXTERIOR. P is adjacent to Q if there is at least one point, R, with P for its left parent and Q for its right parent as illustrated in FIG. 11.

Figure 12:
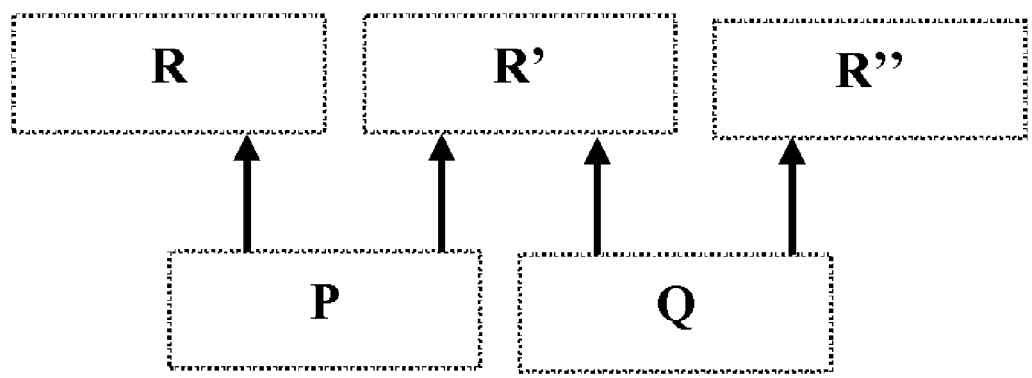
FIG. 12 illustrates adjacency rule 2 in accordance with an embodiment of the present invention.

(ii) ADJACENCY RULE 2: FIXED BY INTERIOR. P is adjacent to Q if there are 3 distinct, R, R' and R", with at least two points being distinct, where P has R as its left parent and R' as its right parent, and Q has R' as its left parent and R" as its right parent as illustrated in FIG. 12.

Note that points P(i) and P(i+1) in Row 0 in the Partition Lattice above are adjacent by Rule 1: their adjacency relations are fixed by their common exterior point, P(1,i+) of Row 1, but not by their interior. Points P(j,i) and P(j,i+1) in Row j in the Partition Lattice are adjacent by Rule 2: their adjacency relations are fixed by the interior points.

Figure 13:
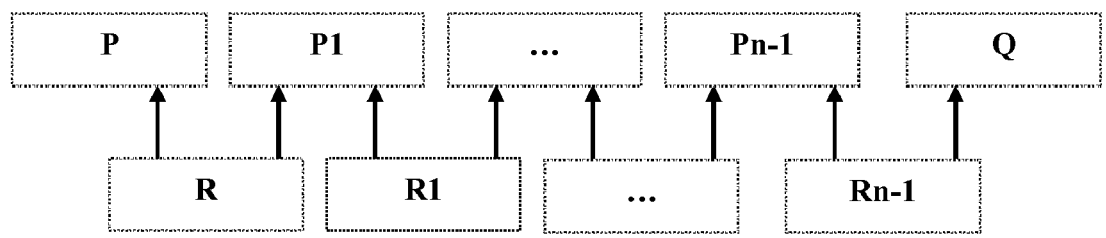
FIG. 13 shows an example of point being to the left of another point in accordance with an embodiment of the present invention.
Figure 14:
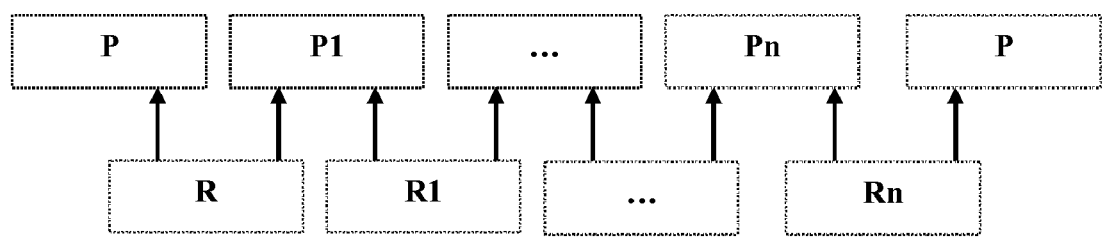
FIG. 14 illustrates an example of cyclic rows in accordance with an embodiment of the present invention.
Figure 15:
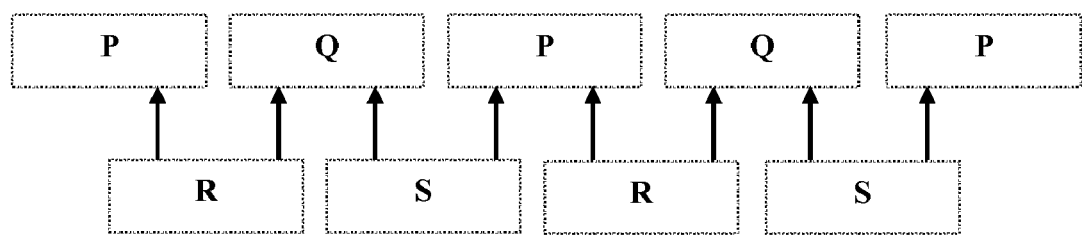
FIG. 15 shows a cyclic row order 2 in accordance with an embodiment of the present invention.

Note that any point (such as the CAT3 point) with at least one partition point is self adjacent, being adjacent to itself by Adjacency Rule 1. As illustrated in FIG. 13, a point P is (n places) left of Q (in a row) when there is a sequence of points: P, P1, . . . Pn−1, Q, that are pair-wise left-adjacent to each other through the sequence. As illustrated in FIG. 14, P is in a cyclic row just in the case when P is left of itself in some row of adjacent points. Note that any self-adjacent point is trivially in a cyclic row. Of more importance are non-trivial cyclic rows, having two or more distinct points. The simplest example is shown in FIG. 15.

Creation of cyclic rows in general should be avoided (except trivial cycles of Order 1). However these are not strictly banned. Cyclic rows are useful to model special kinds of geometric structures, for example. But in the following main rule for diamond lattice tilings, the insertion of points that would create non-trivial cycles in any rows is banned. For example, given R has parents (P,Q), insertion of S with parents (Q,P), as shown above is not allowed P and Q are Ordered in a Row. Two points P and Q are ordered in a row just in the case when there is a row in which either P is left of Q or Q is left of P. Two points P and Q are uniquely ordered in a row just in the case when they are ordered in a row and have the same order degree in every row in which they appear.

LEVELS. The Minimal Category Level of P is the number of edges in the shortest path of left and right edges from P to the CAT3 point. The Maximal Category Level of P is the number of edges in the longest path of left and right edges from P to the CAT3 point. For example, The CAT3 point has Category Level 0. A CAT3 partition has Category Level 1. Points from a partition row below a point P have a Category Level one more than that of their parent point. If the Minimal and Maximal Category Level of P are the same it is called the Category Level of P. The Identity Level of P is the number of identity edges in the shortest path of identity edges to an atomic point. Two points P and Q are uniquely ordered in a row just in the case when they are ordered in a row and have the same order degree in every row in which they appear. For example, Atomic points (with null Identity edges) have Identity Level of 0. Points linked directly to atomic points have Identity Level 1. The Vertical Level of P is the number of edges in the shortest path (of any type of edges) from P to the CAT3 point.

Figure 16:
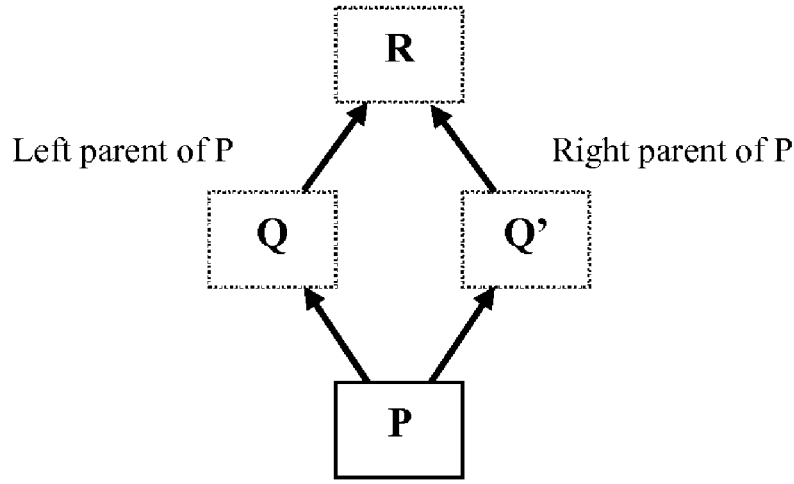
FIG. 16 shows an example of diamond lattice tiling in accordance with an embodiment of the present invention.

The key tiling rule for generating sub-graph structures for the representational space is stated: diamond lattice tilings. Use of the term "key" in this document does not necessarily mean that the feature, element, etc., is a necessary condition for all embodiments of the present invention. FIG. 16 shows a diamond lattice tiling. The conditions for insertion of a point P to form a 'diamond lattice tiling' are: (1) There exists a point R that is both the left parent of the right parent of P and the right parent of the left parent of P. (2) Q and Q' are adjacent, or Q and Q' are not Ordered in a row. This 'diamond lattice tiling' is the most fundamental type of sub-graph in the CAT3 Representational Space. There are two distinct cases, depending on whether Q and Q' are distinct points.

Case A. Normal Diamond Lattice Tiling. If Q and Q' are distinct, this is called a 'normal diamond tiling'. This is the fundamental method for tiling a CAT3 Space Network in a consistent manner, and provides the usual way of inserting information. This type of tiling is called the generator of 'flat sub-structures', or 'table-like structures'.

Case B. Partition Ladder Tiling. Where Q and Q' are identical, this is called a 'partition ladder tiling'. In this case, Q=Q' and is a partition of R, and P is a partition of Q. Note that not all Partition tilings are Diamond lattice tilings of Case B. If P is a partition of Q but Q is not itself a partition (having distinct parents, R and R'), then this does not satisfy the diamond pattern (Rule 1). P must be at least the second 'rung' in a 'ladder' of partitions downward from R, hence the name 'Partition Ladder Tiling'.

Note if R is allowed to be the Zero point one can include the case where Q=Q' is the CAT3 point, and P is a CAT3 partition, as a Partition Ladder Tiling. Note that Rule 2 rules out using this tiling to create any new cycles in row containing Q and Q'—but it allows cyclic relations to be added if cycles already exist. For example, if Q' is already adjacent to Q through a common child P', then Q and Q' are already ordered in a row. If Q is not already adjacent to Q' the diamond tiling rule does not allow us to add P—which would make Q adjacent to Q' and create a cyclic row.

The three primitive tilings defined so far—partitions, partition lattices, and diamond lattices—are highly restricted, and enable only a very special set of sub-graphs. For example, this set of tilings does not (by itself) allow cyclic rows to be generated. It does not allow points with different Minimal and Maximal Category Levels to be inserted.

Figure 17:
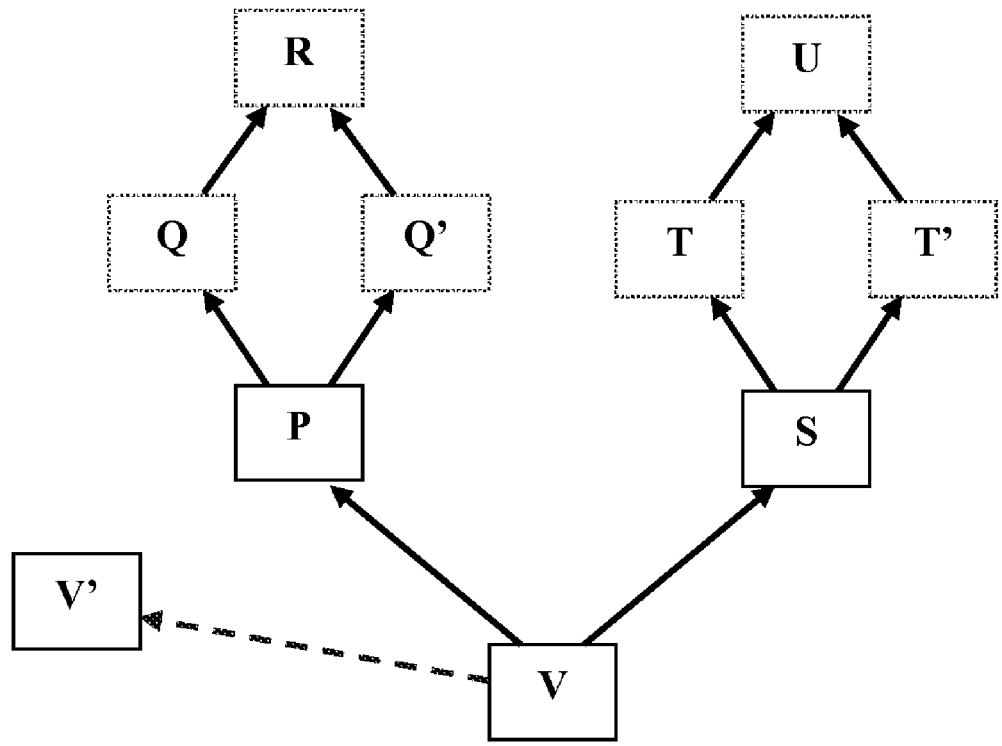
FIG. 17 shows an example of cross tiling in accordance with an embodiment of the present invention.

FIG. 17 illustrates a tiling that permits a much larger variety of sub-graphs to be generated. There are two rules that need to be followed: Rule 1. The left and right parents P and S of V are not in each others interiors. Rule 2. The identity parent V' of V if it exists is not in the exterior or interior of P or S. (That is, none of the parents of V are directly connected.) This is called a Cross Tiling whenever Q' and T are not identical. V represents a cross join of P and S. Rule 1 prevents tilings that cross 'levels' directly within an interior (like the Illegal Tilings defined earlier). However P and S may still be at different levels in the Network. Note that this tiling makes P and S adjacent. If two cross tiled points are adjacent, a diamond lattice tile may be inserted between them, as below.

Figure 18:
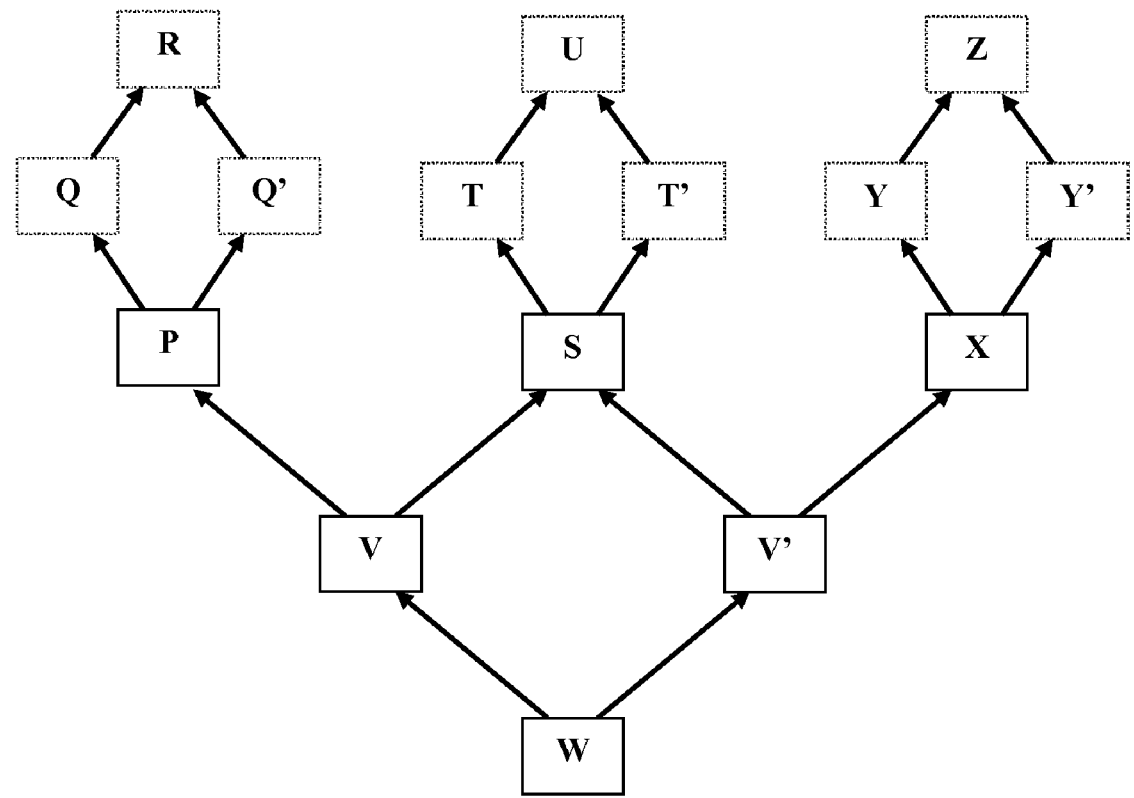
FIG. 18 shows an example of two cross tiled points joined by diamond lattice tiling in accordance with an embodiment of the present invention.
Figure 19:
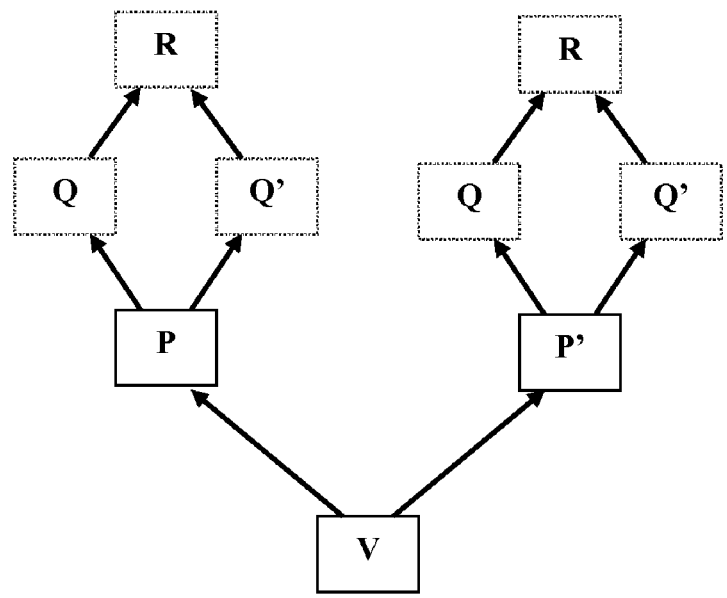
FIG. 19 shows an example of two points from same category joined by cross tiling in accordance with an embodiment of the present invention.

FIG. 18 shows an example of two cross tiled points joined by diamond lattice tiling. Point W can be inserted as a Diamond Lattice Tiling, not as a Cross Tiling. This is because the parents V and W are already ordered to be adjacent points under S. Two non-adjacent Cross Tiled points can also be joined from below by insertion of a new point. One example of Cross Tiling is to join two points from the same category as shown in FIG. 19. In this example, V joins P and P', where these have the same left and right parents, Q and Q'. This would make P and P' adjacent, with P to the left of P' in a row—even though they belong to the same category list. However this situation should normally be avoided, and an alternative method used to join two points from the same category list. Note that this example reduces to a Partition Tiling if: P=P', but Partition Tiling is not a instance of Cross Tiling as defined above, because P is in its own interior and therefore excluded by Rule 1.

In principle one can find alternative tiling methods to represent information in the representational space that avoids the need to create Cross Tilings—it is generally preferred to use identity links to create images of points in new locations, instead of creating cross tilings. But Cross Tiling is allowed as a possible tiling, primarily for the following example, used in inserting variables for functions, where it is very convenient.

Figure 20:
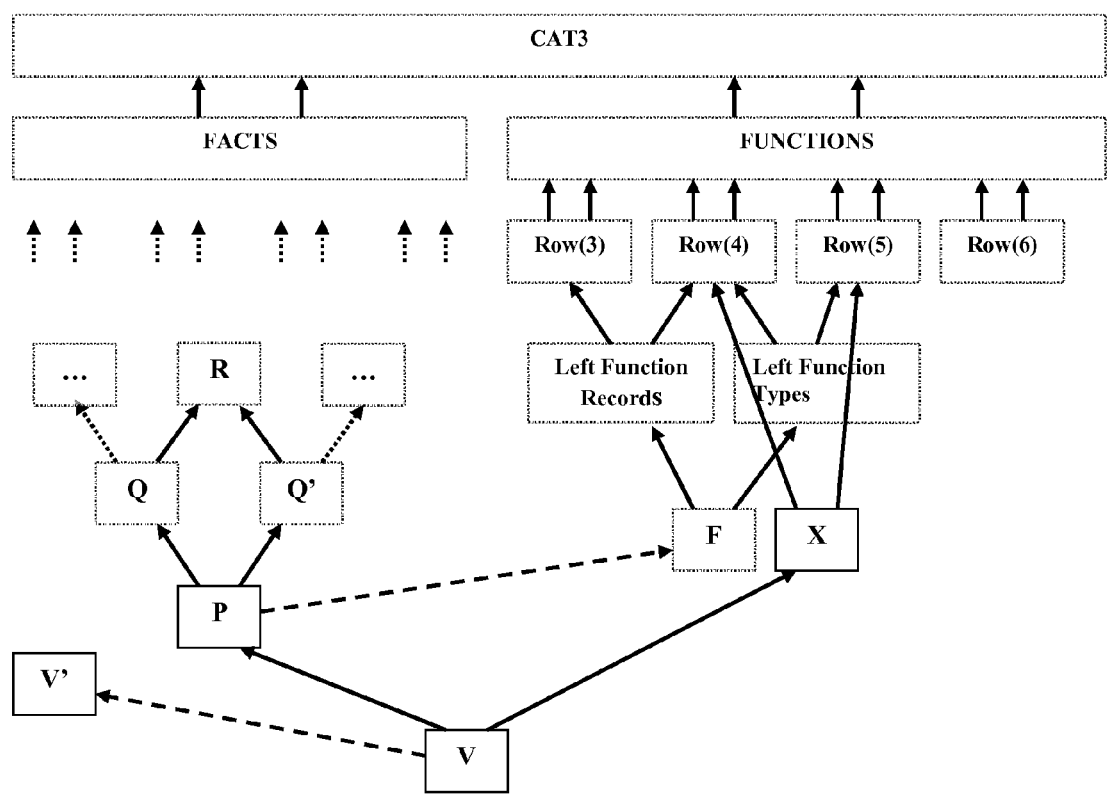
FIG. 20 shows an example of function-variable tiling as a special case of cross tiling in accordance with an embodiment of the present invention.

The primary use for Cross Tiling is for Function-Variable Tiling, shown in FIG. 20. In this construction F is called a (left) function type, P a (left) function instance of F, X a (left) variable type, V a (left) variable instance (or valuation) of X, and V' the value for V. This tiling is called the insertion of a left variable for function type F. The dashed line represents an Identity Edge (Link) from P to F. The point V crosses from P to X. F and X are shown with full parenting structure parenting upwards, to a CAT3 partition called FUNCTIONS. The diamond lattice: P, Q, Q', R parents up in a normal way to a disjoint CAT3 Partition called FACTS (the full parenting structure is not shown above Q, Q', R). Bi-lateral symmetry of the Network and tiling rules means one can define the insertion of a right variable for function type F with a similar diagram.

Figure 21:
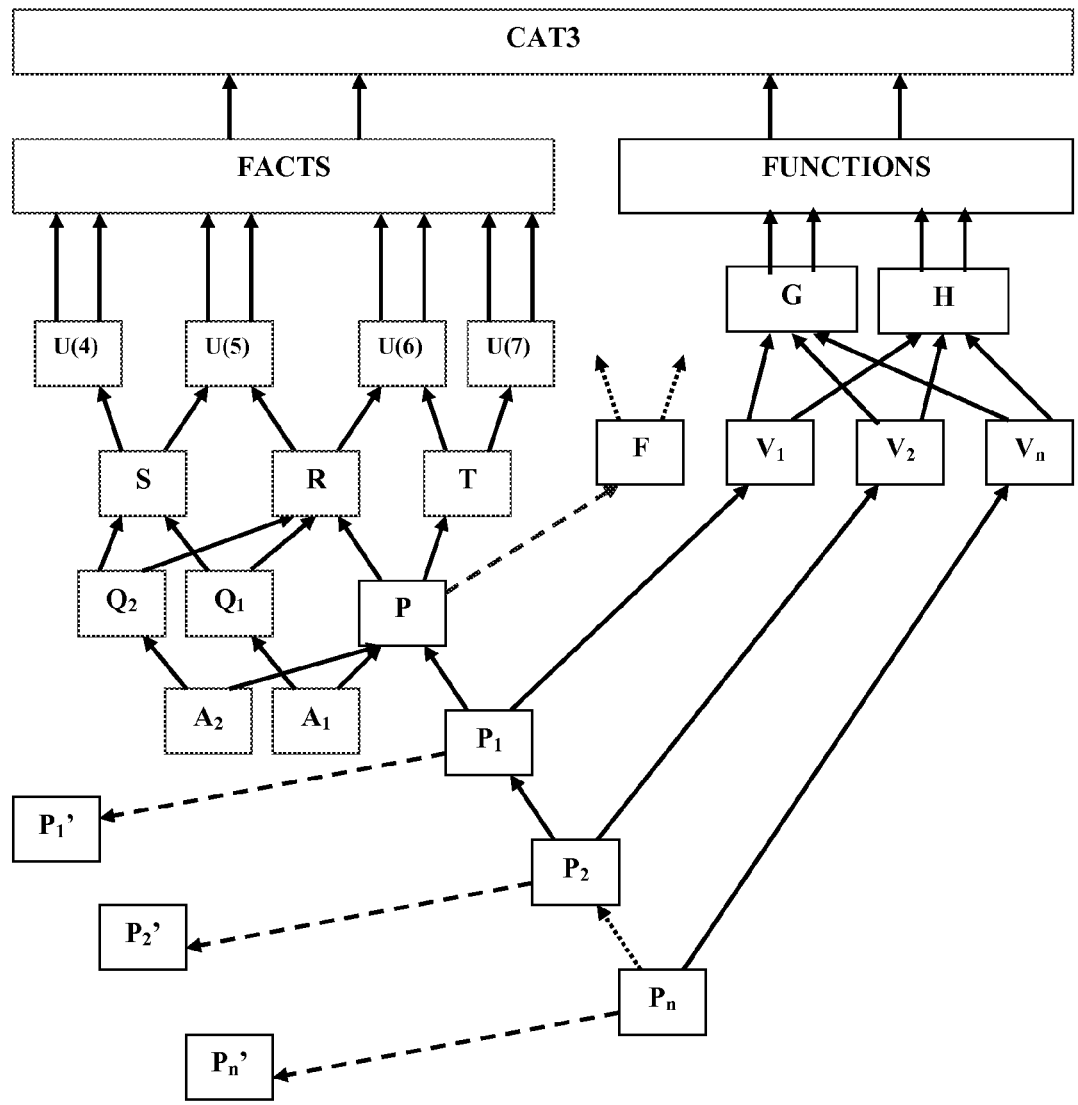
FIG. 21 shows a function tiling example in accordance with an embodiment of the present invention.

The process of Function Tiling is illustrated in greater detail in FIG. 21, showing the structure of tiling points involved in inserting a typical n-place function in the Network. Here a new point (instance of a function), P is inserted, which is linked to a function type, F. P is shown as parenting above to a CAT3 Partition called "FACTS", in a normal way, via a Partition row (the U(i)'s). F will parent above to a disjoint CAT3 partition called "FUNCTIONS" in a normal way. There is no specific requirement on the category structure above F, except that it is normally disjoint from the partition containing P. A chain of n variable arguments for P are inserted below-right, as $P_1, P_2, \ldots P_n$. These arguments 'refer to' other points, $P_1', P_2+, \ldots P_n'$, through identity edges, which provide values (content) from various other places in the network. $P_1, P_2, \ldots P_n$, are parented on the right to a chain of variables types, as $V_1, V_2, \ldots V_n$. These variable types are in the same list (under G and H). The results of the functional calculation are inserted below P as $A_1, A_2$, etc. There may be one or more of these, depending on the type of function. Insertion of all the variable arguments, $P_i$, is done by cross tiling as the points $P_1, P_2, \ldots P_n$ do not form diamonds. $V_1, V_2, \ldots V_n$ are called variable types, and are pre-defined in a permanent fixed location ('variable list'), as are the functions F' ('function list'). The same set of variables can be used for a range of different functions. In the interpretation it is seen that function types are associated with function objects, which are programmed functions. To ensure functionality, the arguments for functions must be determined from points in the network specified by network relations relative to the point representing the function type. Note that this is not the only method for inserting functions with arguments. Functions are normally identified through identity parents, but alternative methods for identifying arguments are possible. For example, an alternative method for propositional functions identifies arguments from adjacent points in a row in which a propositional function appears, allowing a linear sentence-like representation.

IDENTITY EDGES. Identity edges are used to represent functions, where the content (or 'value') of a point is determined by a function on the content ('values') of connected points. Functions in CAT3 are always represented by identity edges, except in the special case of zero-place hierarchical functions, noted below, which are functions of points that can be specified without needing additional arguments or locations to store results.

Identity Function. The simplest function is the identity function. Semantically, this is interpreted to mean that the child point has the same objectual reference as the identity parent. How this is reflected in the Content fields of the point depends on their interpretation—i.e., what the point content is used to represent. In the simplest case, the Content fields: Title and Value, need to be copied from the identity parent to the child point. This is called a simple link. The child point in this case represents a 'duplicate' of the parent, in another location in the network, and is fixed to its content. Content is copied or transferred in the parent-to-child direction (downwards). That is, the child is a function of the parent. Normally there is no need to copy the Order, Date1, Date2 or other content fields from parent to child, since these normally characterize properties relative to the child point in the Network. For example, Order normally characterizes a (conventional) order of appearance in a list of points, and is usually differs for child and parent points. Hence there is need to be able to specify variations for implementing the identity function, where the rules for transferring Content vary. For example, sometimes a child point is used to represent a different name for the object of reference, provided by the Title. In this case there is need to maintain the Title of the child point distinct from that of the parent. Sometimes the Value of the child point represents a different quantity to the Value for the parent point, and these should be kept independent.

To specify these variations in the rules for updating content, the Hfunction field is used (an extended content field of points) as a parameter to select an update function. For example, one may implement a convention that: (i) If the Hfunction=0 for point P, the Title and Value for P are updated from its identity parent. (ii) If the Hfunction<0 for point P, the Value but not the Title of P is updated to the identity parent. (iii) If Hfunction>0 for point P, the edge does not represent the identity function, and any updating process involving P depends on the identification of a function type by the parent point. (iv) If Hfunction>0 for point P, and there is no identity edge, the Hfunction value specifies a function for updating the content of P.

Links: simple identity parents representing referential identity. Identity edge relations are called links when the point does not represent another function type. It is possible to: (i) make a transitive chain of links, (ii) have links from many child points to the same parent, (iii) have no link if needed (meaning the parent is an atomic point). Where links exist, there is need to: (iv) maintain a unique parent for each link, and (v) avoid circularity of link paths.

Figure 22:
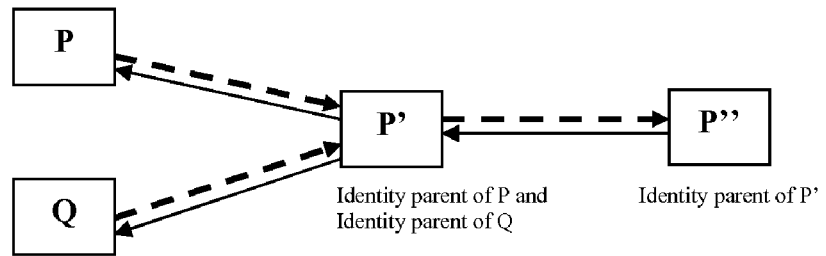
FIG. 22 shows an example of transitive links in accordance with an embodiment of the present invention.

These determine the basic properties of identity edges, as illustrated in FIG. 22. Dashed lines indicate identity edges, with arrows pointing upwards from child to parent points. This illustrates two child points, P and Q, both with links to the same identity parent P', which in turn has a link to identity parent P". This can be extended indefinitely, through a chain of links. When the links are updated, the content of P" is copied to P' (according to the Hfunction rule of P'), and the content of P' is copied to both P and Q (according to their Hfunction rules, which may be selected independently). The point P" has no link, and is an atomic point.

Figure 23:
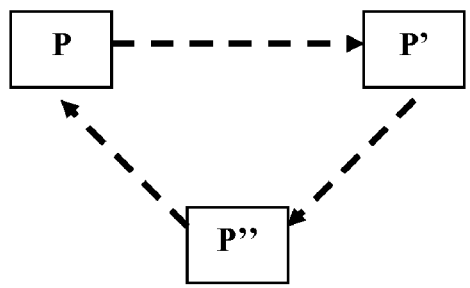
FIG. 23 shows an example of cyclic link path that is illegal in accordance with an embodiment of the present invention.
Figure 24:
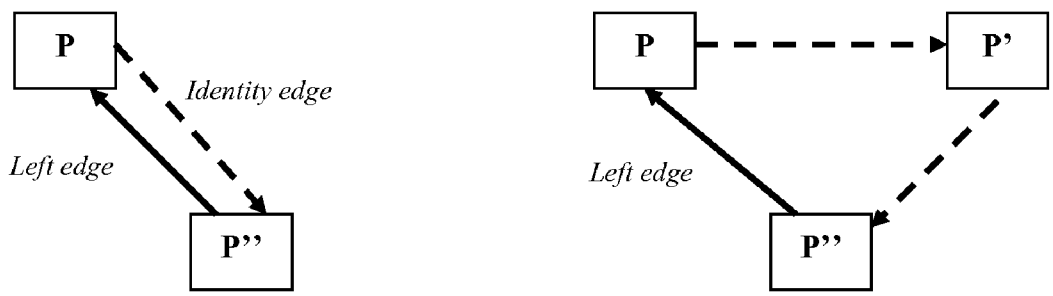
FIG. 24 shows more examples of cyclic paths in accordance with an embodiment of the present invention.

The identity link from any point to its parent is unique, i.e., functionally deterministic in the child→parent direction. Links to a given parent may be multiple, i.e., one-many from parent→child. Transference of content through an identity link is in the parent→child direction (red lines), which is functionally deterministic. FIG. 23 illustrates a viciously circular path from P to P' to P" to P. Circular chains like this are not allowed, because: The content transferred around the path depends on the starting point, which is undetermined or arbitrary: unless some primary data is inserted at a some point, there is nowhere to start - but primary data should not be inserted into linked points, because it is immediately overwritten when the link is updated. Also, The meaning of P depends on the link, but it is not functional because of the circularity, as seen from: Value(P)=Value(P')=Value(P")=Value(P). However it worth noting that this kind of circularity is not necessarily functionally inconsistent, and there could be some interpretation in which it is useful—e.g., to model circular paradoxes. Creating cycles needs to be avoided through combinations of left or right edges with identity edges, as shown in FIG. 24. This illustrates two examples where identity edges are not cyclic by themselves, but create cycles in combination with another type of edge.

Calculated Functions. More generally, the function represented by an identity edge may be a calculated function, not simply an identity function (representing an identity of the references of points). In this case, the parent point itself represents the function, or function type. For example, "=X+Y" is the Title of a point representing a particular function type. An identity link from point P to this point is interpreted as defining P as an instantiation (instance) of this function type—no longer the simple identity function. (This can be flagged by setting the Hfunction field for P to >0, but the identity parent itself determines the function type).

Points representing function types are stored in one or more special locations in the network, identified by unique category parents. They may be subsequently identified as specific function types by either their point identity, or by some element of Content. It is convenient to identify function types by Titles: e.g., "=X+Y", "=X*Y", "=Sum(X)", "=If X is Y then Z", are conventional names for various function types in one implementation. These function types are associated with programmed procedures. These functions or procedures use one or more variable arguments. For example, "=Sum(X)" has one argument; "=X+Y" has two arguments; "=If X is Y then Z" has three arguments.

A child point with an identity link to a function represents an instance of the function type. To calculate such an instance of the function type a programmed procedure must be run which can: (i) identify the appropriate valuation of the arguments—which must be supplied from data represented by existing points in the network; (ii) process the calculation correctly to generate the intended result, and subsequently: (iii) insert points with content to represent these results in appropriate locations in the networks.

The principle that both arguments and results of calculations must be stored in the network is fundamental to maintaining special properties of functionality, compositionality and completeness intended in the design. Naturally the programmed procedures for implementing functions may store data in intermediary forms, but they must result in information represented in the CAT3 Network.

The system for identifying locations to find arguments for functions, and locations to insert results of functions must also meet a general convention: these locations must generally be specifiable by relative positions in the Network of points connected to the function points. This is fundamental to maintaining universality (or uniformity) of the semantic interpretation of functions, both across locations in a given network, and across distinct CAT3 Networks.

Hierarchical Functions. There are also zero-place functions for points that do not need any additional arguments specified (besides the point). These are characteristically hierarchical statistical functions. For example, one may want to use the Value of a category point to represent the number (count) of its Left or Right Child points; or the sum of Values of its Left child points; or the average of Values of its Left child points; etc. Any simple aggregate function of content fields of a class of points determined directly by a given point can be an hierarchical function of that point.

The inputs for this type of zero-place function are already determined by the parent point, without needing any further variable arguments to be supplied. The location to store the result is value field of the point itself. In this case one can simply use the Hfunction value as a parameter to specify the function directly - there is no need to specify Hfunctions via identity parents; and one can specify Hfunctions for points with existing links, without deleting those links.

Manual Operations. Note that functions as discussed above are quite distinct from manual operations that are performed at the discretion of a user. The latter are also programmed through database functions acting on the table. But they are not defined or determined by the table data itself. Functions in the sense above are implemented through information inserted in the table itself, and may be updated by automatic periodic system-wide procedures, independently of user actions. They correspond to calculated functions or automated procedures in a conventional database. The difference is that insertion of CAT3 functions are represented by table data, not by ad hoc programming objects such as SQL queries or programming modules, as in conventional databases.

Identifying a CAT3 Network and CAT3 Database.

CAT3 network may be embedded in a bigger system. This section describes a criteria to define similarity between a CAT3 network, and other systems or representational structures. This is based on the mathematical concepts of structural isomorphisms, and isomorphic embeddings, combined with the notion of an implementation of a representational structure as a computerized system of representation.

Isomorphism between two relational structures. A structure is defined as consisting of: (i) a class of points, P, with (ii) any set of constants, $a_1, a_2, a_3 \ldots$, which are points in P, and (iii) any set of relations $R_1, R_2, R_3, \ldots$ on the points, and (iv) any set of functions $F_1, F_2, F_3, \ldots$ on the points. The structure is symbolized generally as: $<P; a_1, a_2, a_3 \ldots; R_1, R_2, R_3, \ldots; F_1, F_2, F_3, \ldots>$. Note that when applied to CAT3, this serves only to define the basic network structure. The content of points is introduced subsequently through additional functions from points to symbolic strings or quantities (i.e., not functions from points back to points). Additional CAT3 Network axioms are introduced as conditions or theories imposed on the relations or functions that define the basic structure.

In general, the relations and functions may have any finite degree or arity. This is illustrated first with the simple case of a structure: $\pi = <P; a; R>$, with just one constant, a, one binary (2-place) relation, and one function F mapping: $P \to P^3$, where: $p^3$ is the (triple) Cartesian product: $P \times P \times P$, i.e., members of $P^3$ are ordered triplets of points from P: $(p_1, p_2, p_3)$. In this case, R is equivalent to a set ordered pairs of points from P: $R \equiv \{(p,q): R(p,q)\}$. F is equivalent to a set ordered pairs of points from P and triplets from $P^3$: $F \equiv \{(p, (p_1, p_2, p_3)): F(p) = (p_1, p_2, p_3)\}$.

Definition: Two structures: $\pi = <P; a; R; F>$ and $\pi^* = <P^*; a^*; R^*; F^*>$ are isomorphic just in the case when there is a 1-1 mapping M of the class P point-wise onto P* such that: for all p, q in P:

(a-condition) $a = p$ if and only if: $a^* = M(p)$,
(R-condition) $R(p,q)$ if and only if: $R^*(M(p,q))$
(F-condition) $F(p) = (p_1, p_2, p_3)$ if and only if: $F^*(M(p)) = (M(p_1, p_2, p_3))$ where: $M(p_1, p_2, \ldots p_n)$ represents the image: $(M(p_1), M(p_2), \ldots M(p_n))$ of any ordered n-tuplet: $(p_1, p_2, \ldots p_n)$ of P.

a*, R*, F* are called the images of a, R, F respectively under the isomorphism.

For brevity point images can be symbolized as: M(p)≡p*, and generally:

$M(p_1, p_2, \ldots p_n) \equiv (p_1, p_2, \ldots p_n)^* \equiv (p_1^*, p_2^*, \ldots p_n^*)$.

Functions on P can generally map ordered n-tuplets: $(p_1, p_2, p_n)$ to ordered m-tuplets: $(q_1, q_2, \ldots q_m)$, with all $p_1, p_2, \ldots p_n$ and $q_1, q_2, \ldots q_m$ from the class P.

This can be referred to as mapping a type: $(p_n)$ to a type: $(q_m)$.

The previous definition may be generalized to structures with multiple constants, $a_1, a_2, a_3 \ldots$, relations: $R_1, R_2, R_3, \ldots$, and functions: $F_1, F_2, F_3, \ldots$, by:

Definition: Two structures: $\pi = <P; a_1, a_2, a_3 \ldots; R_1, R_2, R_3, \ldots; F_1, F_2, F_3, \ldots>$ and: $\pi = <P^*; a_1^*, a_2^*, a_3^* \ldots; R_1^*, R_2^*, R_3^*, \ldots; F_1^*, F_2^*, F_3^*, \ldots>$ are directly isomorphic just in the case when there is a 1-1 mapping M of the class P point-wise onto P* such that:

(a-condition) for all p in P:
$a_i = p$ if and only if $a_i^* = p^*$
(R-condition) for each relation $R_k$ of degree n, for all $p_1, p_2, \ldots p_n$ in P:
$R_k(p_1, p_2, \ldots p_n)$ if and only if $R_k^*(p_1^*, p_2^*, \ldots p_n^*)$
(F-condition) for each function $F_k$ mapping type: $(p_n)$ to type: $(q_m)$,
for all $p_1, p_2, \ldots p_n$ in P:
$F_k(p_1, p_2, \ldots p_n) = (q_1, q_2, q_m)$ if and only if:
$F_k^*(p_1^*, p_2^*, \ldots p_n^*) = (q_1^*, q_2^*, \ldots q_m^*)$ The last condition may be put in the more compact form:
$(F_k(p_1, p_2, \ldots p_n))^* = F_k^*(p_1^*, p_2^*, \ldots p_n^*)$ Definition: Two structures: $\pi = <P; a_1, a_2, a_3 \ldots; R_1, R_2, R_3, \ldots; F_1, F_2, F_3, \ldots>$ and: $\pi = <P^*; b_1, b_2, b_3 \ldots; S_1, S_2, S_3, \ldots; G_1, G_2, G_3, \ldots>$ are isomorphic just in the case when there are permutations (re-orderings) of: $b_1, b_2, b_3 \ldots, S_1, S_2, S_3, \ldots$ and $G_1, G_2, G_3, \ldots$ to: $a_1^*, a_2^*, a_3^* \ldots, R_1^*, R_2^*, R_3^*, \ldots$ and $F_1^*, F_2^*, F_3^*, \ldots$ respectively, where: $<P; a_1, a_2, a_3 \ldots; R_1, R_2, R_3, \ldots; F_1, F_2, F_3, \ldots>$ and: $<P^*; a_1^*, a_2^*, a_3^* \ldots; R_1^*, R_2^*, R_3^*, \ldots; F_1^*, F_2^*, F_3^*, \ldots>$ are directly isomorphic.

Isomorphisms of the CAT3 Network Structure. The special case of the CAT3 Network Structure is specified here, where P is a set of points, and four constants, $a_1, a_2, a_3, a_4$ are defined (which are the CAT3 point, the null identity point (serving as a parent for null identity edges), and left and right Zero points), and a function, F: $P \rightarrow P^3$, mapping each p in P to an ordered triplet: $(p_1, p_2, p_3)$ from P (which represent the three edges for each point). A structure of this general type is symbolized: CAT3=$<P; a_{CAT3}, a_{null}, a_{ZeroLeft}, a_{ZeroRight}; F>$. This will be called a CAT3 Structure. (Each distinct instance is said to be an instance of the type of structure referred to as the CAT3 Structure.) A CAT3 Structure represents a CAT3 Network Structure (network structure without content of points) if it embeds a CAT3 Graph, i.e., if it contains a sub-structure: CAT3 Graph=$<P^-; a_{CAT3}, a_{null}; F>$, where: $P^-$ is a subset of $P/\{a_{ZeroLeft}, a_{ZeroRight}\}$ (i.e., $P^-$ is a subset of P, excluding the 'zero points', $a_{ZeroLeft}, a_{ZeroRight}$) which conforms to the CAT3 Network Axioms by identifying: (i) $P^-$ as the class of CAT3 Graph points (ii) $a_{CAT3}$ as the CAT3 point (iii) $a_{null}$ as either null or as the unique special point defining a null identity parent (iv) $a_{ZeroLeft}$ as the point providing the left parent of the CAT3 point (in the CAT3 Structure but outside the CAT3 Graph) (v) $a_{ZeroRight}$ as the point providing the left parent of the CAT3 point (in the CAT3 Structure but outside the CAT3 Graph). As shown in FIG. 68, a CAT3 structure may include additional points or graph structures outside any particular CAT3 Network embedded within it. A CAT3 Structure used to construct CAT3 Networks may embed numerous distinct CAT3 Networks.

The following definitions are generally equally applicable to CAT3 Structures or (the more limited class of CAT3 Network Structures). A CAT3 Structure [Network] CAT3=$<P; a_{CAT3}, a_{null}, a_{ZeroLeft}, a_{ZeroRight}; F>$ is directly isomorphic to a structure: $S^* = <P^*; a_{CAT3}^*, a_{null}^*, a_{ZeroLeft}^*, a_{ZeroRight}^*; F^*>$, of the same type, just in the case when there is a 1-1 mapping M (denoted by '*' below) of the class P point-wise onto P* such that:

(a-condition) for all p in P:
$a_{CAT3} = p$ if and only if $a_{CAT3}^* = p^*$
$a_{Null} = p$ if and only if $a_{Null}^* = p^*$
$a_{ZeroLeft} = p$ if and only if $a_{ZeroLeft}^* = p^*$
$a_{ZeroRight} = p$ if and only if $a_{ZeroRight}^* = p^*$
(F-condition) for all p in P:
$F_k(p) = (p_1, p_2, \ldots p_n)$ if and only if:
$F_k^*(p^*) = (p_1^*, p_2^*, \ldots p_n^*)$ A CAT3 Structure [Network] CAT3=$<P; a_{CAT3}, a_{null}, a_{ZeroLeft}, a_{ZeroRight}; F>$ is isomorphic to a structure: $S^* = <P^*; b_1, b_2, b_3, b_4; F^*>$ just in the case when CAT3 is directly isomorphic to: CAT3*=$<P^*; b_i, b_j, b_k, b_l; F^*>$, where: $b_i, b_j, b_k, b_l$ is a permutation of $b_1, b_2, b_3, b_4$.

A CAT3 Structure [Network] CAT3=$<P; a_{CAT3}, a_{null}, a_{ZeroLeft}, a_{ZeroRight}; F>$ is isomorphically embedded in a structure: $\pi = <Q; a_1, a_2, a_3 \ldots; R_1, R_2, R_3, \ldots; F_1, F_2, F_3, \ldots>$ just in the case when there is a sub-structure: $\pi^* = <P^*; b_1, b_2, b_3, b_4; F^*>$, with P* a sub-class of Q, and $b_1, b_2, b_3, b_4$ members of $\{a_1, a_2, a_3 \ldots\}$, and F* a member of $\{F_1, F_2, F_3, \ldots\}$, such that CAT3 is directly isomorphic to $\pi^*$.

Direct Structural Isomorphism. A structure: $\pi^* = <P^*; b_1, b_2, b_3, b_4; F^*>$ is directly structurally isomorphic to the CAT3 Network Structure just in the case when: (i) there is an instance: CAT3=$<P; a_{CAT3}, a_{null}, a_{ZeroLeft}, a_{ZeroRight}; F>$ of a CAT3 Network Structure that is isomorphic to $\pi^*$, and: (ii) For any arbitrary instance: CAT3=$<P; a_{CAT3}, a_{null}, a_{ZeroLeft}, a_{ZeroRight}; F>$ of a CAT3 Network Structure, there is a possible structure: $\pi^{} = <P^{}; b_1^*, b_2^*, b_3^*, b_4^*; F^*>$ of the same type as $\pi^*$ that is isomorphic to CAT3.

The structure: $\pi^{} = <P^{}; b_1^*, b_2^*, b_3^*, b_4^*; F^{**}>$ has to have the same type of formal structure as: $\pi^* = <P^*; b_1, b_2, b_3, b_4; F^*>$, and represent a variation of content of P* and values of $b_1, b_2, b_3, b_4; F^*$. That is, $\pi^{**}$ can be arrived at by altering the point-class P* to a new class P**, the identities of constants $b_1, b_2, b_3, b_4$ from P* to constants $b1^{}, b_2^{}, b_3^{}, b_4^{}$ from P**, and the values of the function F* as a mapping from P* to $P^{*3}$ to F as a mapping from P to $P^{**3}$.

A structure: $\pi = <Q; a_1, a_2, a_3 \ldots; R_1, R_2, R_3, \ldots; F_1, F_2, F_3, \ldots>$ is said to embed a direct structural isomorphism of the CAT3 Network Structure just in the case when there is a sub-structure: $\pi^* = <P^*; b_1, b_2, b_3, b_4; F^*>$, with P* a sub-class of Q, and $b_1, b_2, b_3, b_4$ members of $\{a_1, a_2, a_3 \ldots\}$, and F* a member of $\{F_1, F_2, F_3, \ldots\}$, and there is an instance: CAT3=$<P; a_{CAT3}, a_{null}, a_{ZeroLeft}, a_{ZeroRight}; F>$ of a CAT3 Network Structure such that $\pi^*$ is directly structurally isomorphic to CAT3. (i) A structure $\pi$ that embeds a direct structural isomorphism of the CAT3 Network Structure implements a CAT3 Network. (ii) A programmed system that represents a structure that embeds a direct structural isomorphism of the CAT3 Network Structure implements a CAT3 Database.

A given structure can be recognized as a CAT3 network by one of the following mechanisms: (a) showing that the structure satisfies Axioms 1-9 presented above or by (b) showing that the structure is structurally isomorphic to an existing CAT3 network structure. Any structure that is structurally isomorphic to a CAT3 Network is itself a CAT3 network.

Content of Points. This model-theoretic representation (in conjunction with the Network Axioms) gives a way of formally defining the CAT3 Network Structures. But the CAT3 Networks also includes contents of points, i.e., symbolic strings associated with points (Title, Order, Value, Date1, Date2). The function F above only refers to the graphical relations. The content is represented by a second function, symbolized as G, from points to their symbolic strings or numerical values: in the preferred interpretation:

G: P→(Title, Order, Value, Date1, Date2).

The previous representation may be expanded to include this:

CAT3=<P; $a_{CAT3}$, $a_{null}$, $a_{ZeroLeft}$, $a_{ZeroRight}$; F; G> as long as it is recognized that G is a function from the class P to a class of independent constructions (symbols or numbers or external object references, etc). Because G can be implemented in a variety of ways consistent with the CAT3 Axioms, it is not necessary or possible to specify the previous isomorphisms to include any specific form of G. But it can be specified that there must be some content function G to implement the full CAT3 Network as a representational space for information.

CAT3 Databases. A CAT3 Database is a computerized system designed to systematically construct representations of CAT3 Networks, used as structures for the purpose of representing information. A CAT3 Database must implement the critical components of the CAT3 Structure—i.e., represent the set of points, P, the edge function, F, the content function, G—in some systematic and functional manner. A feature is that the class of CAT3 Network Structures of the intended form: CAT3=<P; $a_{CAT3}$, $a_{null}$, $a_{ZeroLeft}$, $a_{ZeroRight}$; F; G> can be represented by a single relation, implemented as a conventional database table. This is because of the functional construction of F and G: i.e., they are functions on the class of points, P. Hence each point has a unique value for F and G. Points can therefore be treated as table records, and the components of the functions as fields of a table, with the table representing a relation.

A representation in this systematic form is one way to identify that a CAT3 Database has been implemented. Of course there can be variations in this implementation. The primary example is: (A) Splitting the record set of points between a number of tables with the same CAT3 structure. This may be necessary to process large record sets. For example, in one preferred implementation, a current record set is stored in one table, for immediate processing work, and a larger record set, called a library, is stored in a table with almost identical structure, with programmed functions to transfer records representing CAT3 Networks back and forth between the two. In this implementation, both tables represent complete CAT3 Networks. However, it may be desirable to split smaller record sets off that do not represent complete CAT3 Networks by themselves. But a system like this still directly represents a CAT3 Network if at least one table directly implements a CAT3 Network.

A second key variation is: (B) Implementing the primary CAT3 Structure, but without implementing strong relationships or functions requiring all the CAT3 Network Axioms to be consistently satisfied by the complete structure (maximal structure). It is not necessary to implement all the Networks Axioms in a strong form over all the Table records to implement a CAT3 Database. For some transformation processes it may be necessary to allow some sub-sets of records (i.e., points) to contradict the Network Axioms, at least temporarily. For example, for a subset of points, cyclic paths may be allowed to be defined, or parenting structures allowed that do not have all maximal paths upwards to the CAT3 point, or parents allowed outside the CAT3 Network. This does not contradict the definition of a CAT3 Database as long as the representation includes some sub-graph isomorphic to a CAT3 Network.

In general, a CAT3 Database can be expected to focus around an implementation of a broader CAT3 Structure, with only a sub-set of records fully satisfying the CAT3 Network Axioms. Equally, the CAT3 Structure may be expanded to include additional structure: e.g., additional parents might be incorporated for some special purpose. The criteria for a CAT3 Database therefore revolves around the question of whether there is a systematic representation of the CAT3 Structure structurally embedded within a representational structure, along with some systematic implementation of tools or functions that specifically depend on the features of the CAT3 Network structure.

Another key variation is: (C) Implementing the primary CAT3 Structure, but modifying the parenting structure at the top, e.g., introducing a multiplicity of CAT3 points as the maximal parents, or allowing the CAT3 point to serve as its own parents. Such variations may mean that the full CAT3 Structure (maximal structure) defined below the maximal point or points now fails to satisfy the CAT3 Network axioms. But there are generally numerous CAT3 Networks isomorphically embedded in a CAT3 Network. For example, the exterior of a partition point with partition rows at its only child points generally defines the CAT3 point of a CAT3 Network (although its identity links may now point outside the network, and no longer represent the same information as originally intended). In general, any realistically useful CAT Network will embed numerous other CAT3 networks as subgraphs. Unless something is done to systematically remove the characteristic CAT3 Network properties from the whole structure, the result of modifying ad hoc elements of the original parenting structure leaves a CAT3 Structure systematically embodying CAT3 Networks, and hence a CAT3 Database.

The CAT3 Representational Space: Interpretation of Information.

CAT3 Networks are a class of mathematical structures with two key features: (i) They can be represented by a single Relation (or table), with a simple fixed construction. (ii) They can be used to represent a wide range of information. The first feature makes them especially convenient to implement in a computerized database. Next is described a method of implementation via a relational database platform in more detail in the following section. The second feature makes them useful as a representational space. The representation of information in CAT3 Networks is described by defining various interpretations of conventional information in CAT3 Networks. Note that this is not intended to be a complete or exhaustive account: only examples of interpretations of central interest are described, and some general principles underlying the intended construction of interpretations are specified. Certain other significant features of CAT3 Networks that distinguish CAT3 representation over conventional table representation are described here.

Plurality of Cell-Values. The second feature—plurality of Cell-Values in CAT3—reflects a strength of CAT3: it means the CAT3 Lattice representation of 'table data' is more flexible (or powerful) than the conventional table representation. Conventional tables are limited to only one Cell-Value for each (Record-Field)-pair. But this is often problematic, because often there are fields that naturally have multiple values. For example, there is need to record more than one value in a "Phone Number" field for a Client. In conventional tables, one must either extend the table by adding extra fields (e.g., "Home Phone", "Work Phone", etc), or insert a subtable structure, which is like a list attached to the "Phone Number" field. The latter method is a complex operation—essentially linking two tables to each other—while the former remains a limited and ad hoc solution—e.g., what if a "Work Phone" field is added, but clients have more than one Work Phone? (This is seen more clearly with a truly multi-property, e.g., "Children of . . . ": it is impractical to add numerous fields like "First Child", "Second Child", . . . —where does it stop?) Modifying the conventional table structure by adding new fields also means one has to modify other programmed structures dependant on these fields. In CAT3, this problem is automatically solved: one can insert as many "Cell Values" as needed between any two points. If a field really corresponds to a 'the-property' with unique Cell-Values (e.g., "The Height of . . . ") then a single value is inserted. But if multiple values need to be added (e.g., for "Phone", "Child", etc) one can. (This makes a plural intersection-list between the two points). Where there are truly multiple "Cell-Values" at a given time one can distinguish them from each other by the Order property of the points. For example, in an "Address" field, one can insert numerous address lines (e.g., for street, suburb, town, region, country), and simply distinguish them by their Order properties, which will determine their order on reports used to generate documents such as letters, etc.

Dates: Dynamic Records. Alternatively points can be distinguished by the Date properties of the point. Each point in the CAT3 Lattice has 5 'content properties': Title, Order, Value, Date1, Date2. The Date1, Date2 properties are interpreted as specifying the time interval for which the record is valid. This adds a natural dimension of temporal logic to the system. Date1 is the initial time at which the record is valid (or alternatively, with non-temporal information, this can be used for the time of data entry). If Date1 is null, then the record is always valid in the past. Leaving Date2 null means the record is currently valid (up to and including the present time). If Date1 and Date2 are both specified, then the record is valid only in the interval [Date1, Date2]. This also means that one can record a dynamic series of values very simply. For example, if a client's phone number changes to a different value at a certain date, one could overwrite the existing Phone Number value with the new number when that date is reached—but then the record of their previous phone number is lost. In CAT3 one can instead enter the change-over date as Date2 in the exiting record, and add a new record with the change-over date as Date1 in the new record. The old number or the current number can be looked up by referring to the date properties. Note that recording dynamic records is also often an awkward operation in conventional tables: normally the Record is labeled with a Start and Finish Date, and duplicated at the Record level to represent changing values. The CAT3 system is much more flexible, and this is a significant advantage over conventional tables, both in terms of logical transparency and economy.

A CAT3 Network can be regarded as a symbolic construction. To use a symbolic construction to represent information one must supply it with an interpretation, or a system of semantics. The semantics specifies how to interpret the intended meanings of symbolic elements. This is a set of conventions for 'reading' information from the symbolic constructions. A wide range of possible conventions is possible for CAT3 semantics. But in the proposed implementation, it is intended that these cohere with certain general semantic meta-principles—defined in various theoretical studies as 'consistency', 'compositionality', 'functionality', 'transparency', 'completeness', etc. Some examples are presented which will be common to a wide range of practical applications envisaged for the system.

1. CAT3 Partitions.

Figure 25:
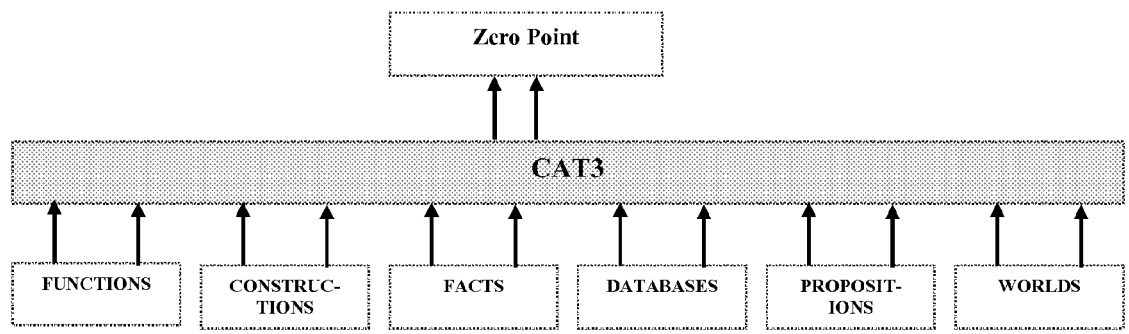
FIG. 25 shows points representing partitions below the CAT3 point in accordance with an embodiment of the present invention.

CAT3 Partitions are inserted, along with Partition Rows and Lattices, as fundamental locations to begin storing data. Examples of CAT3 Partitions in one preferred implementation include 9 points named: FUNCTIONS, CONSTRUCTIONS, FACTS, IDENTITIES, DATABASES, PROPOSITIONS, WORLDS, ACTIONS and TRACKS. Their locations are immediately below the CAT3 point as illustrated in FIG. 25. These points are not ordered, and generally do not have adjacency relations. Only cross tiled points generally have left and right parents crossing between points in different CAT3 Partitions—but there are numerous identity edges that cross between points in different partitions, e.g., to provide reference to functions and constants or to empirical objects across different partitions.

Figure 26:
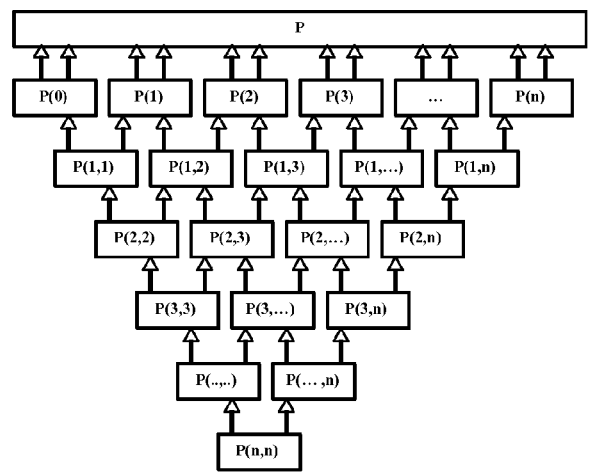
FIG. 26 shows a CAT3 lattice structure with points below partitions in accordance with an embodiment of the present invention.

In a preferred implementation, each of these standard CAT3 Partitions has a pre-defined Partition Platform, with 10 Row points, and a Partition Lattice defining a row order for these, as defined previously, with structure pictured in FIG. 26. (The choice of ten Partition rows is purely for convenience: additional rows may be added as desired).

The intended interpretation of the Partitions mentioned above is described as follows. Note that the programming method for the CAT3 database system stores certain kinds of system information in the CAT3 Network itself, including functions types, logical constants, system-defined lists, and information for defining certain interfaces and controls. An initial set of database records is reserved for this purpose, called the core record set. The following CAT3 Partition Points, and their Row and Lattice Points, are also defined in the core record set. Other CAT3 Partitions can be added as empirical partitions as desired.

FUNCTIONS: Provides special locations to store system-defined functions types, variables, and certain logical constants. Locations are referred to by programmed code implementing functions.

CONSTRUCTIONS: Provides special locations to store constructions of system objects for the database implementation itself: e.g., properties of certain Forms, Controls, Reports, Tables, Queries, and Modules. Locations are referred to by programmed code implementing functions.

FACTS: Standard location for storing empirical information in an integrated form. CAT3 allows all empirical information (about any variety of domains) to be integrated in a single partition. But depending on the user's preferences, domains of empirical information may be split into independent groups (Partitioned) by inserting additional Partitions—e.g., business information versus personal information versus special projects, etc. Locations are not referred to by programmed code.

IDENTITIES: Standard location for fundamental empirical object classes with system-wide reference across different empirical domains—but these can always be stored in other empirical partitions. Locations are not referred to by programmed code.

DATABASES: Provides special locations to store imported data, duplicating external database tables and constructions. Used via specially programmed data import interface. Locations are referred to by programmed code for this interface.

PROPOSITIONS: Provides special locations for a special set of propositional functions, dictionary of words, and information defining natural language interpretations. Used via specially programmed function interface. Locations are referred to by programmed code for this interface.

WORLDS: Provides special locations to store copies of other CAT3 Networks. These copies represent information, beliefs or knowledge maintained by other agents, including rules for synchronizing point identities with other CAT3 Networks. Can be used to model counterfactual possibilities, multi-agent logics, logics for propositional attitudes, etc. Locations are referred to by programmed code for special interfaces.

ACTIONS: Provides special locations for a special set of user-defined actions, similar to the concept of macros, so that users can define and execute commonly used groups of manual actions. Locations are referred to by programmed code for special interfaces.

TRACKS: Provides special locations to store information about ongoing processes or activities or actions performed in the CAT3 Network by users. Analogous to activity memory. Used to define common procedures. Locations are referred to by programmed code for special interfaces.

CAT3 Representation of Conventional Tables.

The following examples generally show empirical information stored in a location beginning in the center of the FACTS partition, as the typical empirical partition. Relational databases use tables to represent relations. A table is a type of variable with a fixed functional construction. The table construction is defined by: (i) the table object, (ii) the set of fields. The table variables are defined by: (iii) the set of records, and (iv) the set of data cells (cell values). A concrete example is presented followed by a generalized method. Consider a table called Job Charges, which has fields named: Jobs, Client, Date, Time (hrs), Charge Rate ($/hr), and Total Charge($), and current records named: Job 1, Job 2, Job 3, Job 4, and the data (cells) as illustrated:

| Jobs  | Client | Date         | Time (hrs) | Charge Rate ($/hr) | Total Charge ($) |
|-------|--------|--------------|------------|--------------------|------------------|
| Job 1 | Mr. A  | Jan. 2, 2008 | 3          | 50                 | 150              |
| Job 2 | Mrs. B | Mar. 4, 2008 | 5          | 80                 | 400              |
| Job 3 | Mrs. B | Apr. 4, 2008 | 7          | 40                 |                  |
| Job 4 | Ms. C  | Jun. 5, 2008 | 8          |                    |                  |
| ...   | ...    | ...          | ...        | ...                | ...              |

The CAT3 representation of this table information is constructed in 4 steps, corresponding to these four types of object in the table construction. Note that each point insertion in the following steps is a diamond lattice tiling.

Figure 27:
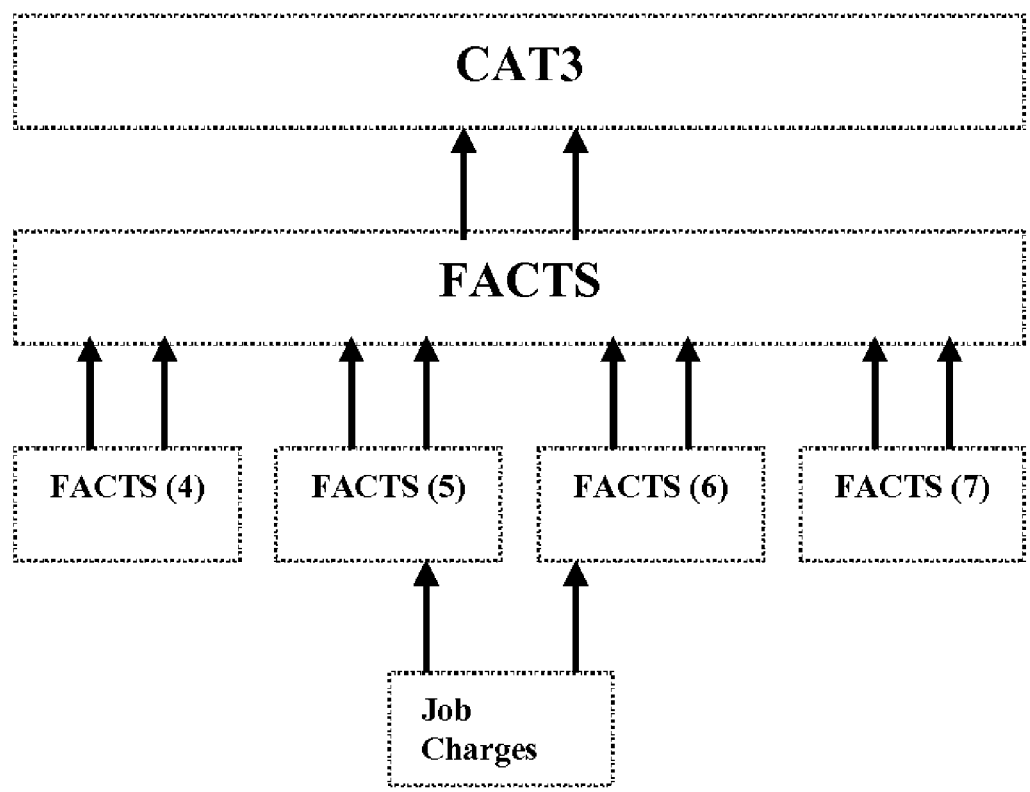
FIG. 27 illustrates how a table object is inserted in accordance with an embodiment of the present invention.

(i) Inserting the Table Object. First choose (or construct) a location in the CAT3 Network to insert a point to represent the table object. For this example, this can be inserted under an existing Partition Row below a CAT3 Partition called "FACTS", as illustrated in FIG. 27. This point has the Title: "Job Charges". The left parent is shown as the existing point "FACTS (5)". The right parent is shown as the existing point "FACTS (6)". These are adjacent members of an existing Partition Row. The identity parent is null. The other content fields do not matter much at this stage, but the normal convention followed here is: (a) Order for the new point is set to the maximum order of points in this location+1. (Note there may be other points already in this location.) (b) Value is left null, since this is not a quantitative record. (c) Date1 is set to the current date-time of insertion of the point, or the earliest date-time at which the point object data is valid or exists. (d) Date2 is set to 0 if the point object is currently valid; or to the final date-time at which it is valid if it goes out of use.

Figure 28:
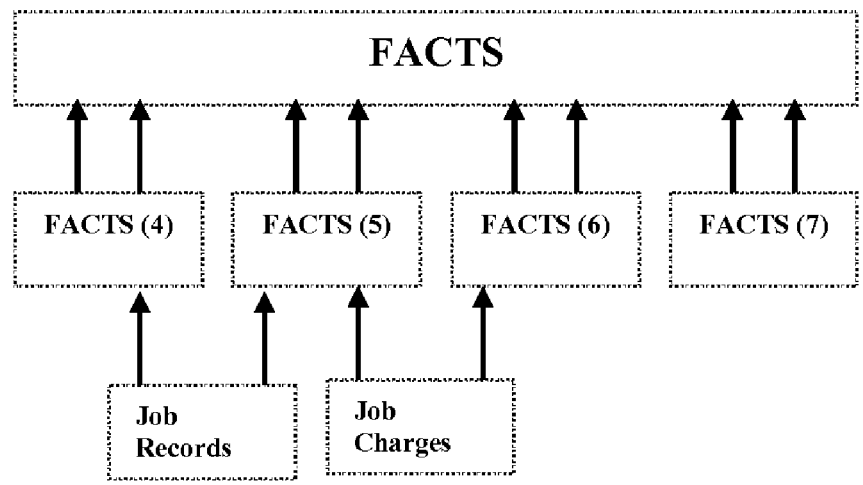
FIG. 28 illustrates how a record in inserted in accordance with an embodiment of the present invention.
Figure 29:
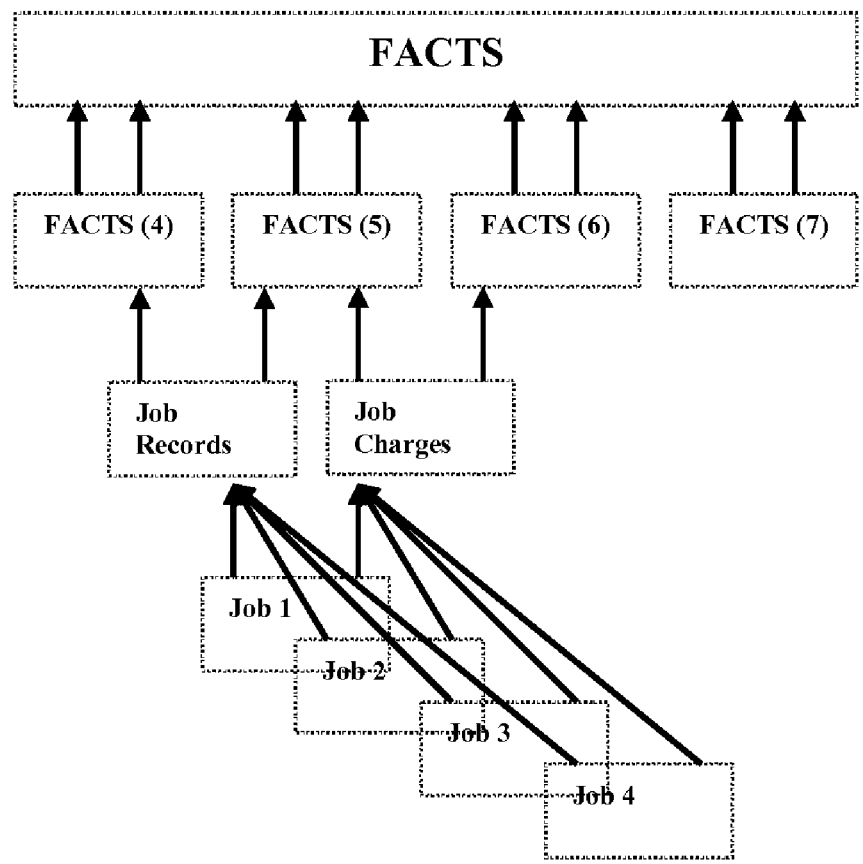
FIG. 29 shows multiple table records being inserted in accordance with an embodiment of the present invention.

(ii) Inserting Records. Next points are inserted to represent records. By convention, points are inserted representing table records on the left under the table object point (which forms the right parent for its records). A left parent is also needed for these record points. A left parent point, called the Record Stem is created with the Title "Job Records", in a position left adjacent to the table point as shown in FIG. 28. Then a point is inserted for each table record as shown in FIG. 29. As shown in FIG. 29 the points are as shown corresponding to table records have titles and have null identity parents. Other Content fields for these points do not matter much, but the following Normal Conventions is preferred: (a) Points lists with n members are normally Ordered uniquely from 1 to n. However; (b) If the Record title is a unique integer identifier, this may be used as the Order. (c) Value is null for points that do not represent quantitative values. (d) Date1 is the date-time of record insertion, or of initial validity of the record. (e) Date2 is 0 if the record is currently valid, or the final date-time of validity of the record data.

Figure 30:
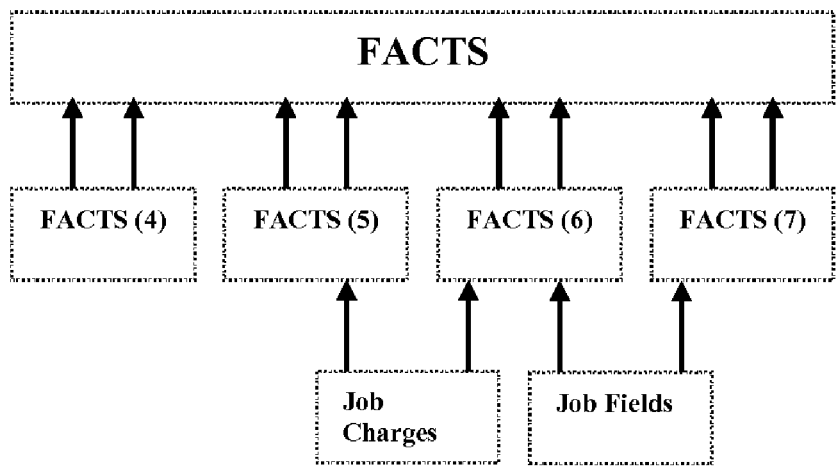
FIG. 30 shows the insertion of a point representing fields in accordance with an embodiment of the present invention.
Figure 31:
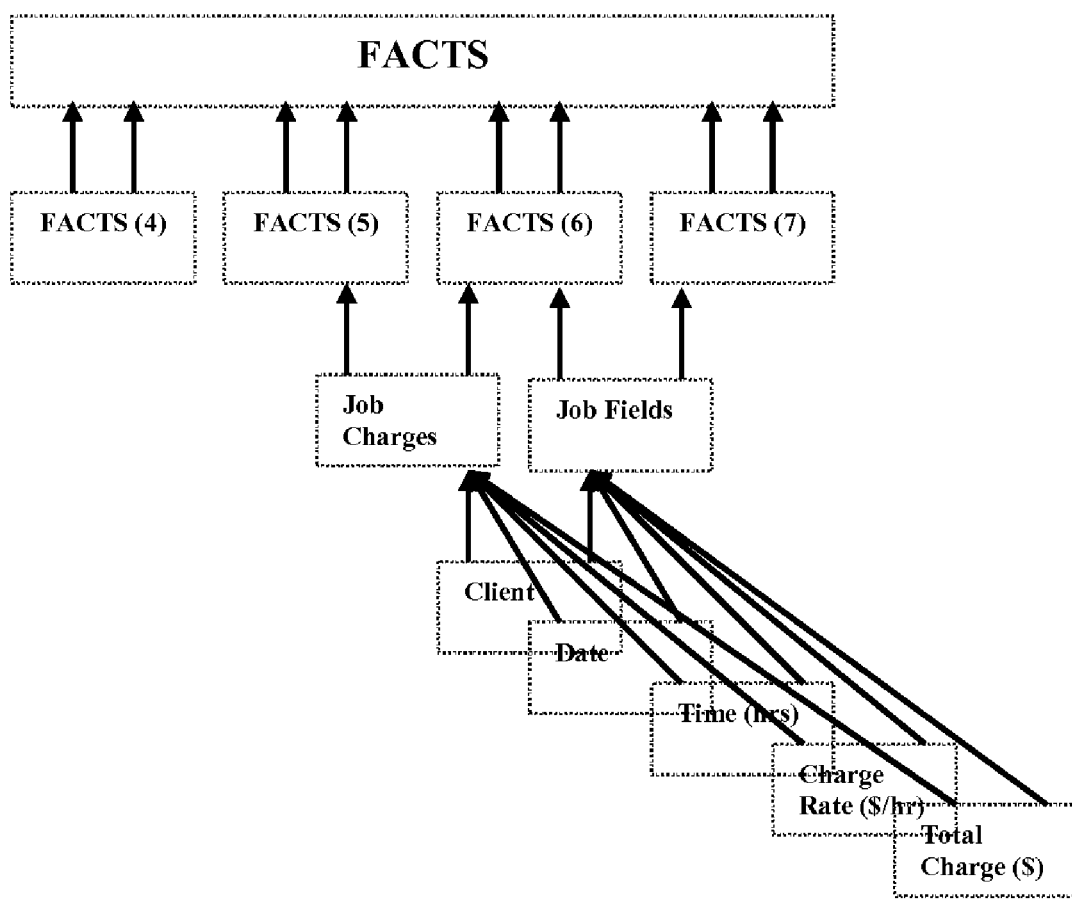
FIG. 31 illustrates how points are inserted for each field in accordance with an embodiment of the present invention.

(iii) Inserting Fields. An exactly symmetric operation is performed on the right to insert points to represent fields. By convention, points representing table fields (or properties of objects in record lists) are inserted on the right under the table object point (which forms the right parent for its records). A right parent is needed for these field points. A right parent point, called the Field Stem is created, with the Title "Job Fields", in a position left adjacent to the table point as shown in FIG. 30. A point for each table field is inserted as shown in FIG. 31. Titles for these points are as shown. Identity parents are null. Other Content fields follow the Normal Conventions, as for the previous Record points.

Figure 32:
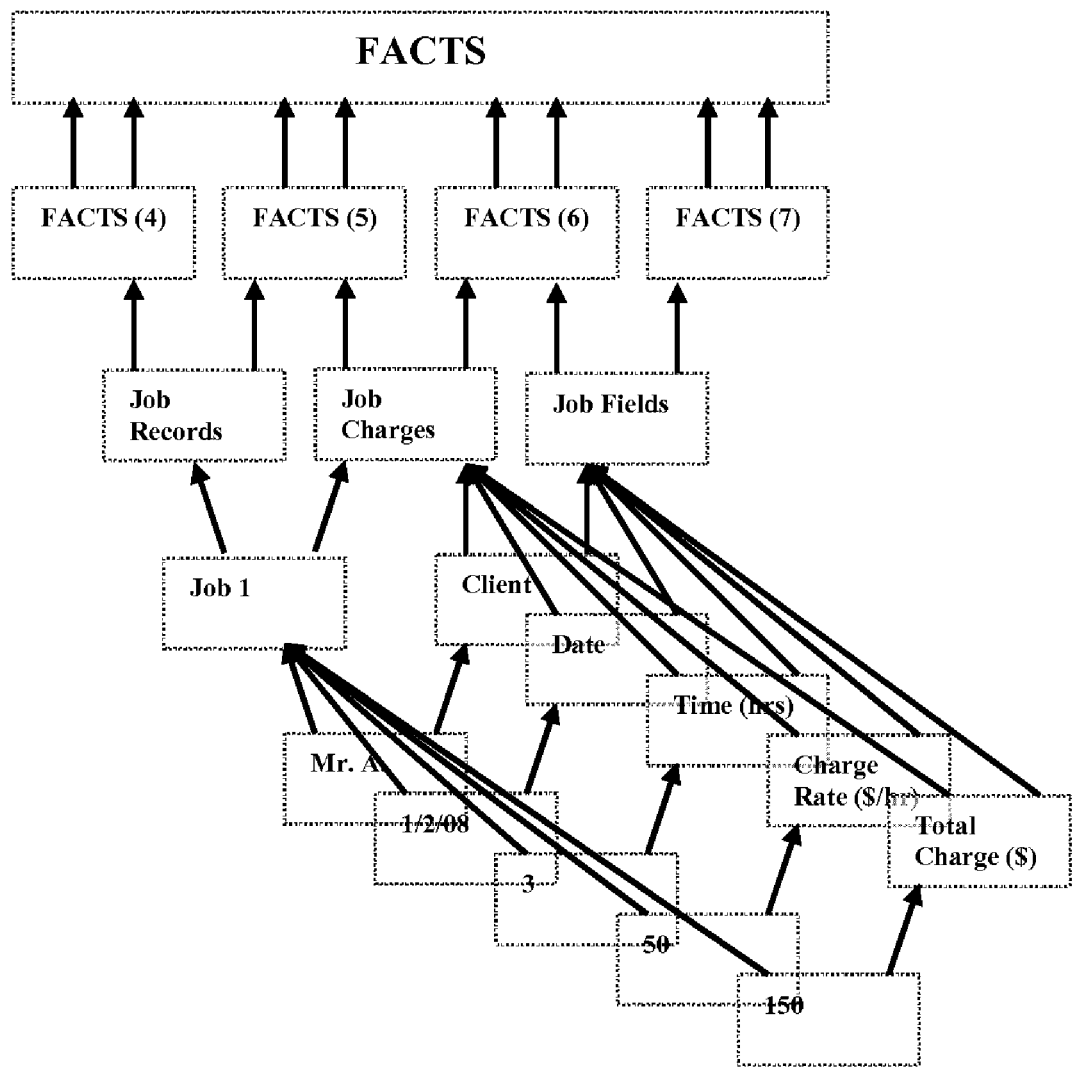
FIG. 32 illustrates insertion of data values in accordance with an embodiment of the present invention.

(iv) Inserting Data Values (Cells). Finally a point is inserted for each Data Cell of the table between its corresponding pair of record-field points as shown in FIG. 32. By convention, points representing data cells (or property values of objects in record lists) are inserted beneath the corresponding record point and the field point. FIG. 32 illustrates this for the first record, "Job 1". Titles for these points are as shown. Identity parents are null. Content fields for cells with quantitative values now are used, and take appropriate values:

| Title   | Order | Value       | Date1                | Date2 |
|---------|-------|-------------|----------------------|-------|
| "Mr. A."| 1     | 0           | [date-time inserted] | 0     |
| "1/2/08"| 1     | Val(1/2/08) | 1/2/08               | 0     |
| "3"     | 1     | 3           | [date-time inserted] | 0     |
| "50"    | 1     | 50          | [date-time inserted] | 0     |
| "150"   | 1     | 150         | [date-time inserted] | 0     |

Note that the table data for Job 3 and Job 4 has empty (null) cells, under Total Charge for Job 3, and Total Charge and Charge Rate for Job 4. By convention no points are inserted to represent null cells of tables. But this is optional: points can be inserted with null content if necessary.

General Representation of Tables.

The above example is generalized for an arbitrary table and has: (i) a table object called Table k, (ii) a set of fields called Field1, Field2, ..., Field N. (iii) a set of records called Record 1, Record 2, ..., Record M, (iv) a set of data cells called Cell(1,1), Cell(1,2), ..., Cell(M,N). (v) Cell(i,j) is the data for the pair of Record i, Field j. Note that a standard Table representation defines a unique mapping from each ordered (Record, Field)-couple to a data value (Cell) as shown in the following table.

| Records: | Field 1   | Field 2   | ...  | Field N   |
|----------|-----------|-----------|------|-----------|
| Record 1 | Cell(1, 1)| Cell(1, 2)| ...  | Cell(1, N)|
| Record 2 | Cell(2, 1)| Cell(2, 2)| ...  | Cell(2, N)|
| ...      | ...       | ...       | ...  | ...       |
| Record M | Cell(M, 1)| Cell(M, 2)| ...  | Cell(M, N)|

Figures 33, 34:
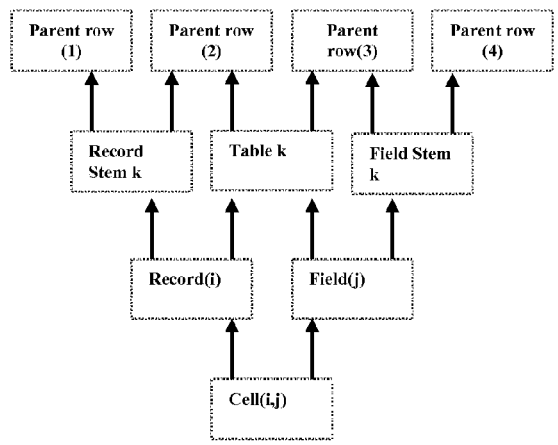
FIG. 33 illustrates the CAT3 representation of a cell(i, j) in accordance with an embodiment of the present invention.
FIG. 34 shows an example of a relationship between two tables in accordance with an embodiment of the present invention.

A CAT3 representation may generally be constructed in the following steps: (1) Decide on a location in the CAT3 Network to insert a point for the Table Object ("Table k"), with a Parent row of 4 adjacent points to parent the table structure. (2) Insert 3 points in the next row down for the table object, record stem, and field stem. (3) For each Record(i) insert a point between the Record Stem k and Table k points. (4) For each Field(j), insert a point between the Table k and Field Stem k points. (5) For each Cell(i,j), insert a point between the Record(i) and Field(j) points. (6) Assign values to the Content Fields (Title, Order, Value, Date1, Date2) for each point inserted, following the Normal Conventions: assign any quantitative values to the Value field of the point. As shown in FIG. 33, each data cell (i,j) of the table is then represented uniquely by a point forming a diamond lattice under the Table object point, with parents determined in the pattern illustrated.

2. Table Relationships: Joins and Foreign Keyed Fields.

Relational databases also allow relationships between tables, typically represented by using foreign keyed fields in one table to reference records from a related table. For instance, the Client field in the previous example of the Job Charges table could be related to a second table, called Clients, which holds permanent data about clients. Values in the Client field reference records of the Clients table, via the keyed field of that table. Each record in the Clients table may correspond to multiple records in the Job Charges table, via the Client field. This is illustrated as follows with few typical type of fields in FIG. 34.

There is a 1-many join (outer join) from the Client field in the Clients table, to the Client field in the Job Charges table. (Arrow between the Fields). There is a unique value of the Client field in the Clients table, identifying each Record (row) of that table. There can be multiple values in the Client field in the Job Charges table, referencing rows of Clients table, via matching records in the Clients field. (Arrows upwards between records).

Next, such relationships are represented in the CAT3 Network. Two different methods are defined.

Method 1. Joining By Identity Edges. First the CAT3 sub-graph is constructed to represent the Clients table. This is put in the same location as the Job Charges table (although for this example, it could be inserted anywhere except in the exterior of the Job Charges table point). This is illustrated for the first record, "Mr. A", and its data cells as shown in FIG. 35. The following identity edges are added: (i) from each Client field cell in Job Charges to refer to the corresponding record point in Clients, and: (ii) from the Client field point in Job Charges to the Clients table point. The edges between the Client points themselves (Mr. A-Mr. A, etc) represent the semantic notion that the external entity referred to by the Mr. A data point in the Job Charges table is the same entity referred to by the Mr. A record point in the Clients table.

As illustrated in FIG. 36, the edge from the Client field point in Job Charges to the Clients table point represents the same general semantic notion of identity: that these also refer to the same external entity. In this case the 'entity' is an empirical property or empirical class. That is, the property of 'being a Client'. If the notion that all Client cells under the Job Charges field are Clients in the sense of the Clients table class needs to be represented, this identity edge is added as well. This would be the normal understanding from the relational database view of treating the Client field in Job Charges as a foreign field referring to Clients records.

This is what an outer join between the fields, created as a fixed system-wide relationship in an SQL database means. The CAT3 representation of this allows a weaker relationship, however: one can create individual edges between the Client cell-records points (Mr. A to Mr. A, etc), but leave out the edge between the Client field-table points. Individual edges could be created for some of the Client cells to Clients record points (Mr. A to Mr. A, etc), but not for others—this is equivalent to making the identities contingent or ad hoc. This weaker relationship can be implemented in a relational database by using special SQL queries as ad hoc functions to identify matching records between record sets in certain views, without requiring strict joins between the tables. In this case the Client field in Job Charges table is no longer a foreign field fixed by a system-wide relationship. This illustrates how the identity relationship can be 'weakly' represented in CAT3 (as a contingent relation). The second method creates a stronger identity relationship.

Figure 37:
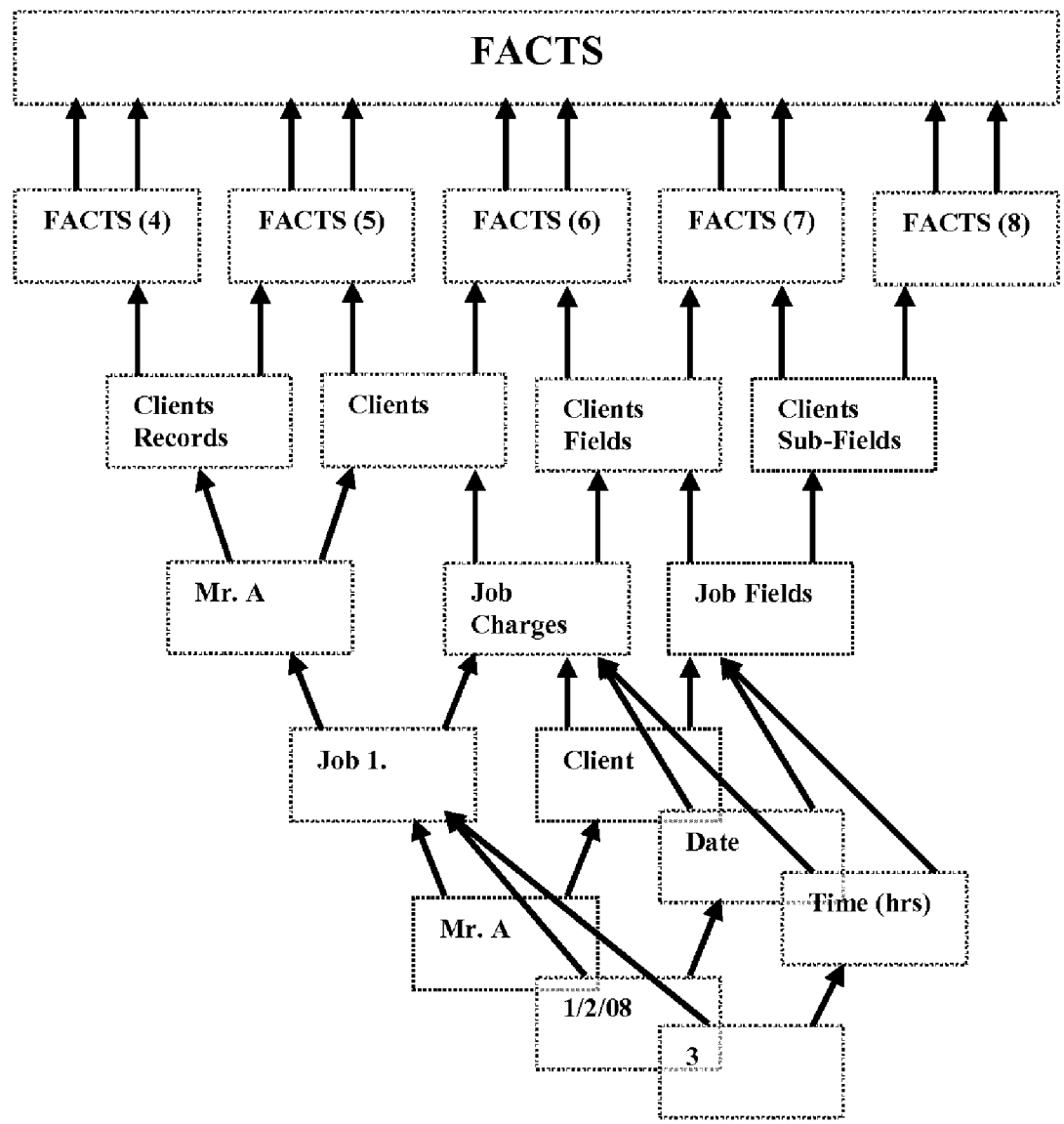
FIG. 37 illustrates how to join using category edges in accordance with an embodiment of the present invention.

Method 2. Joining By Category Edges. First the CAT3 sub-graph is constructed to represent the Clients table, as before. The category edges of Job Charges sub-graph are modify to enforce a logical relationship between records. This is called, moving the Job Charges table into the exterior of the Clients table. The parents are modified as shown in FIG. 37. The steps are (1) Change the left parent of Job Charges from Facts(5) to the Clients table point. (2) Change the right parent of Job Charges from Facts(6) to Clients Fields. (3) Create a new point titled Clients Sub-Fields adjacent left of Client Fields. (4) Change the left parent of Job Fields from Facts(6) to Clients Fields. (5) Change the right parent of Job Fields from Facts(7) to the new Clients Sub-Fields. (6) For each Record point (Job 1, Job2, . . . ) under Job Charges, change the left parent to the Clients Record point (Mr. A, Mrs. B, Ms. C, . . . ) corresponding to the Client field cell (Mr. A, Mrs. B, Ms. C, . . . ) below the Job Charges record. (Illustrated for the Mr. A record only). (7) No other parents in the exterior of Job Charges need to be changed.

After changing the parents in this way, the original Client field point and their data cell points under Job Locations are effectively redundant and may be deleted—the information is duplicated above. Of course this transformation depends on the existence of a Client Record point in the Clients table corresponding to each Client field data point in the Job Locations table—the condition for an outer join. Conversely, if the Job Charges table is constructed in this location, a Job Charges record cannot be entered except under a Clients record, enforcing the relationship between the two tables. Hence this is a stronger way of representing the relationship than the first method of using identity edges. These representations of table information are examples of a more general interpretation of semantic categories: classes, properties and relations; and empirical versus categorical facts. A more systematic convention for representing these in CAT3 is described next.

3. Classes and Properties.

The clients in the Clients table is an example of a class. The jobs in the Job Charges table is another example. Other examples from common experience are the class of colors (red, blue, green, yellow, . . . ); countries (Afghanistan, Algeria, Angola, Antigua, Argentina, Australia, . . . ); authors (Shakespeare, Dickens, Joyce, . . . ); astronomical objects (stars, galaxies, planets, asteroids, . . . ); stars (Sun, Alpha Centauri, alpha Proxima; . . . ); planets (Earth, Mercury, Venus, Mars, Jupiter, . . . ); weekdays (Sunday, Monday, Tuesday, . . . ); dates (1 Jan. 2008, 2 Jan. 2008, 3 Jan. 2008, . . . ) animals (horses, dogs, cats, . . . ); animals (Flipper the Dolphin, Gentle Ben, Yogi Bear, Lassie, . . . ); natural numbers (1, 2, 3, . . . );files on a computer drive; folders on a computer drive; etc.

Natural language can be ambiguous of course, with terms assuming different meanings in different contexts. A key ambiguity illustrated above is the difference between types and individuals. For example, in referring to the class of animals as including horses, dogs, cats, . . . one is really referring to a class of types (or species) of animals. In referring to the class of animals as including Flipper the Dolphin, Gentle Ben, Yogi Bear, Lassie, . . . , one is referring to a class of individual animals. The same term (animals ) is used ambiguously. When natural language information is interpreted in a strict symbolic representation like a database or CAT3 Network it is necessary to disambiguate such meanings to begin with. Some typical examples of this are considered next. First, an unambiguous example of a property applied to a class is presented. It is assumed that the classes to be represented have: (i) a class name, and (ii) a set of members. The set of members may be infinite or unknown but one can only explicitly represent discrete, finite classes. (Mathematical functions can be used to generate open-ended classes via functions).

4. Inserting a New Class in CAT3.

Figure 38:
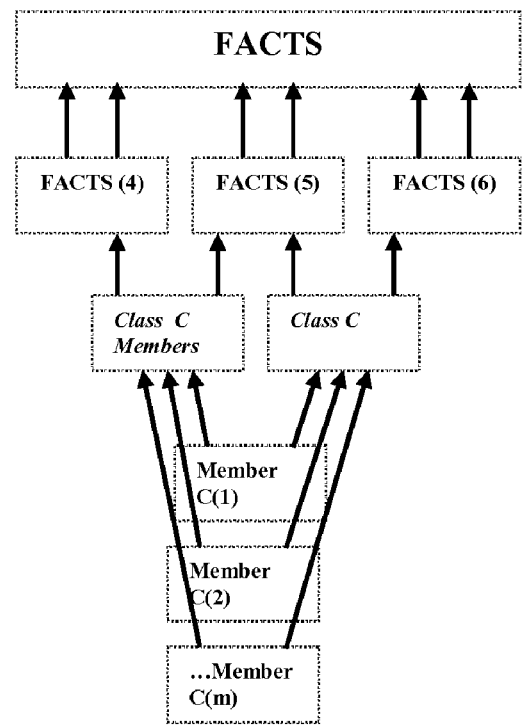
FIG. 38 shows how to insert a new class in a CAT3 network in accordance with an embodiment of the present invention.

The normal convention in CAT3 for representing a new class is: (i) insert a point at a suitable location for the class object, with the class-name as its title; (ii) insert a point to the left of the class object point, as a record stem for the class, with the title class-name members; (iii) insert a point for each member of the class between the record stem point and the class object point, with the member's name as its title. (iv) The default position for a new class object point is under the center of a partition row used for empirical objects or facts as shown in FIG. 38. Note that the term members is standard terminology for the class membership property. The earlier terminology "records", as in "Client Records", "Job Records" is used for the special case of table memberships, which are traditionally called records.

5. Empirical Properties.

Members of classes have properties relative to the class. Properties can be empirical or categorical, relative to a class. For example, empirical properties of Clients may include their hair color, weight, height, gender, etc. Categorical properties include: is a client. Categorical properties are determined by parenting edges. The empirical properties are considered here. It is assumed that the properties to be represent have: (i) a property name (e.g., hair color), and (ii) a class of possible values (e.g., brown, black, white, grey, brunette, blond, red, blue, green, yellow, . . . ), and (iii) a class, C, of objects to which they apply (e.g., Clients: Mr. A, Mrs. B, . . . ). Note (iv) in general, an object may have more than one value for a property, or no value.

Figure 39:
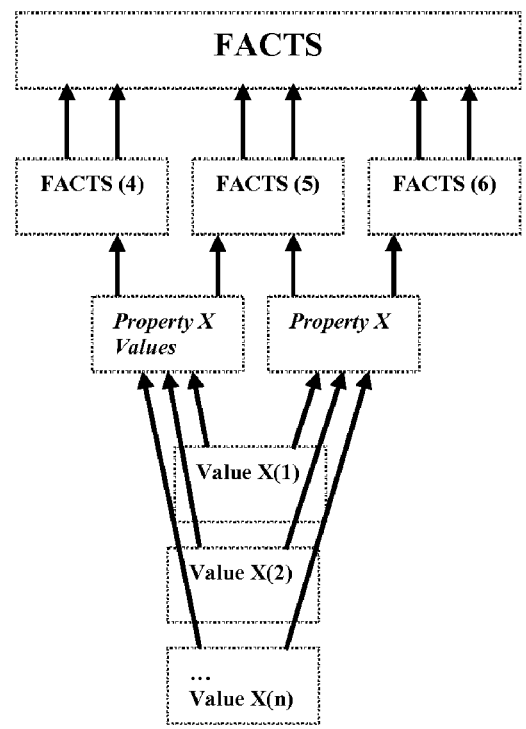
FIG. 39 shows how to insert values for properties in accordance with an embodiment of the present invention.
Figure 40:
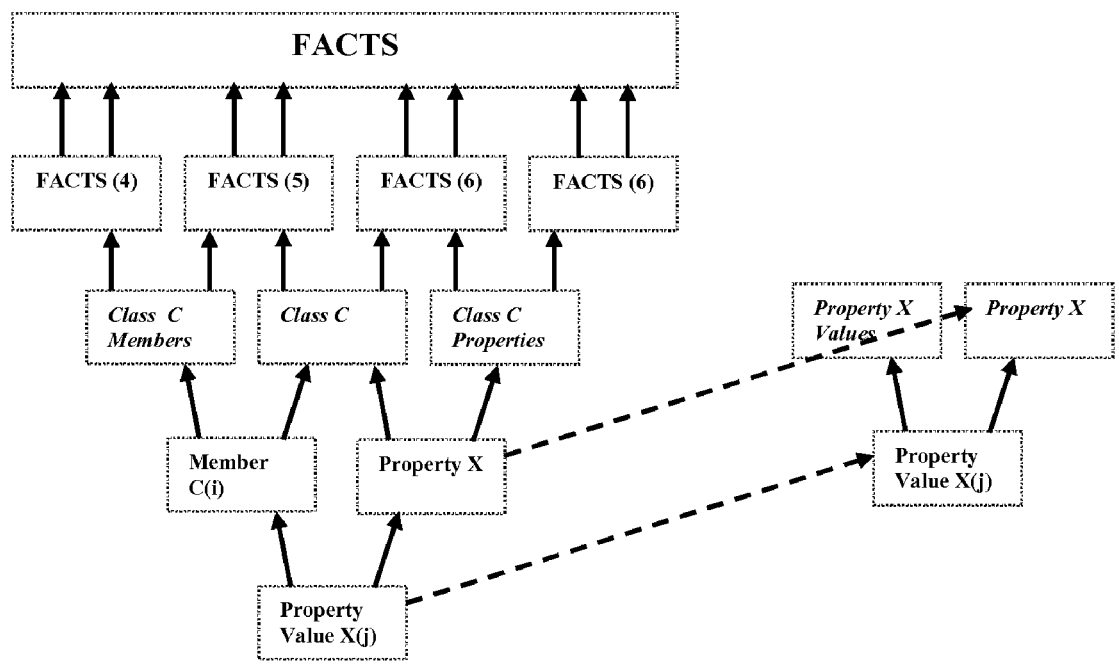
FIG. 40 shows how to insert a representation of the property X applied to the class C in accordance with an embodiment of the present invention.

Properties are more complex than classes. Assumption (i) and (ii) mean that a property already involves a class, viz. the class of property values. First a case is considered where this is a discrete, finite class. When property values form infinite or continuous classes they are characterized using numerical values, stored in Value or Date fields. For discrete properties, first a class of property values is inserted similar to other classes as shown in FIG. 39. FIG. 40 shows, how to insert a representation of the property X applied to the class C. The class C is assumed to be represented, with a Class Object Point, and Class Member Points, as above. To represent a property for this class the following actions need to be done: (i) insert a point adjacent to the Class C point, called Class C Properties, as the right parent under which to insert the instance of Property X. (ii) insert a point for (this instance of) Property X below Class C and Class C Properties, and create an identity link to the original Property X point. (iii) for each Member C(i) of Class C insert one (or more) points, Value X(j) corresponding to the value/s of Property X for C(i), and create an identity link to the original Value X(j) point.

If C(i) has no value for Property X, no value point is inserted. If C(i) has multiple values for Property X, a point is inserted for each distinct value. This applies directly to the Hair Color field in the Clients table example above. Note that the identity parents for property values represents information sufficient to determine inferences about identity of properties across different instances (instantiations), such as: (1) Mr. A has blue hair color and Mrs. B has blue hair color. Therefore: (2) Mr. A has the same hair color as Mrs. B.

This is a natural language inference. Given the information in (1) is represented correctly in CAT3, this representation needs to be able to support the inference to (2). The representation of (1), on the model above, inserts two points under Mr. A—Hair Color, and Mrs. B—Hair Color, with common identity parent blue (a point of the Hair Color class). Clearly this supports the natural inference to (2): identity of their hair color property values (blue) is represented by the existence of the common identity parent.

This can be seen by contrasting with the case where the identity parents to blue are not created, i.e., where there is no representation that the point blue for Mr. A is related to the points blue for Mrs. B. In this case there is certainly something missing from the representation: viz. the identity referred to by (2) between the values. (Note that a similarity of Titles of points does not represent any concept of identity in CAT3.)

Whether natural language propositions like (1) and (2) can be directly represented in CAT3 is a separate question: is there a method for inserting CAT3 points to directly represent the information represented by (1) or (2). In an embodiment such a method requires implementing a system of propositional functions, to form points to represent complex propositions from simple elements of information. Such a system can be implemented, but it is a more advanced application of the representational method than needed to define here, and beyond the present discussion.

6. Types of Information: Categorical, Empirical and Identity Information.

It is useful to distinguish three main ways that information can be represented in CAT3. The CAT3 categories are self-contained. The following ways are defined: (1) Empirical information relative to a point P is information represented by: (a) exterior connections of P, (b) the Content of points in exterior connections, (c) the Content of the point P. (2) Categorical information relative to a point P is information represented by (a) the interior connections of P, (b) the Content of points in interior connections. (3) Identity information relative to a point P is information represented by identity connections of P, i.e., by its connections to other points through identity edge paths.

EXAMPLES

Empirical information: Mr. A←blue→Hair Color represents empirical information about both Mr. A, and about Hair Color. For example, "Mr. A has blue hair color" is an empirical fact about Mr. A. For example, "blue is a Hair Color (of someone)" is an empirical fact about Hair Color.

Value(Job 1←150→Total Charge)=150 represents empirical information about Job 1, Total Charge, and the point entitled 150. For example, "Job 1 has Total Charge with value of 150" is an empirical fact about Job 1. For example, "150 has value of 150" is an empirical fact about 150. Note that it is only a convention to (normally) assign Titles to value points with a copy of the numerical value as a string. The point 150 could equally well get the Title: "Total Charge for Job1", and the previous example would then read: For example, "Total Charge for Job1 has value of 150" is an empirical fact about Total Charge for Job1.

Categorial Information. Mr. A←blue→Hair Color represents categorical information about blue. For example, "blue is a Hair Color", and "blue is an instance of a property for Mr. A." Client Records←Mr. A→Clients represents categorical information about Mr. A. For example, "Mr. A is a Client", and "Mr. A is a instance of a property for Client Records". Note in the latter example, consistent with the general interpretation of classes and properties specified above, one can regard Client Records as an object in its own right (a higher-order type of object, which is a member of the class represented by the partition row point FACTS (5)). Regarded as an object with its own properties, this has Clients as its property type, and individual clients (Mr. A, Mrs. B, etc) as the values or instances of the Clients property.

Identity Information. The identity edge: blue→blue can be represented from the instance of the Hair Color property for Mr. A to the class property with the notation:

(Mr. A←blue→Hair Color)→(Members←blue→Hair Color)

This represents identity information about Mr. A's blue Hair Color. Similarly:

(Mrs. B←blue→Hair Color)→(Members←blue→Hair Color)

represents identity information about Mrs. B's blue Hair Color. These two items jointly entail identity information such as: Mr. A and Mrs. B have the same blue Hair Color.

Another example from classical logic is used to illustrate the necessity for identity information. A long, long time ago, what is now known as the planet Venus was known by two names, identified as two 'stars': the morning star, called 'Phosphorus', and the evening star, called 'Hesperus'. Phosphorus and Hesperus, in the modern scientific view, are really one object, commonly called 'Venus', seen at two different times. And in modern terms, of course, Venus is not a star but a planet. But this is empirical information that took significant astronomical observation to discover.

One day a philosopher stayed up all night, and observed that Phosphorus and Hesperus appeared to be one single, continuous star. Philosophers have been arguing ever since about what the two names refer to, and how many stars there really are. Some philosophers argued that there are indeed two stars, which take turns to appear: at some point during the night, the star Phosphorus disappears, and the star Hesperus appears in its place. Others think that there is one star, but it simply changes its name during the night: at some moment, the star loses the name "Hesperus", and at some moment, it gains the name "Phosphorus". Others think that there is one star (or planet) referred to by two different names.

One of the main difficulties in representing the semantics for this is that identity relations are normally considered to be logical or analytic, and most systems of formal logic allow substitution of one side of an identity for the other, in any other statement. But this makes it is hard to represent the notion that: Hesperus=Phospherus is an empirical fact. In particular, what prevents us making the inference:

(1) Mr. A knows that (Hesperus=Hesperus) [knowledge of a trivial logical truth]

(2) Hesperus=Phospherus [a fact of identity]

Therefore:

(3) Mr. A knows that (Hesperus=Phosphorus) [identity substitution of (2) into (1)]

Figure 41:
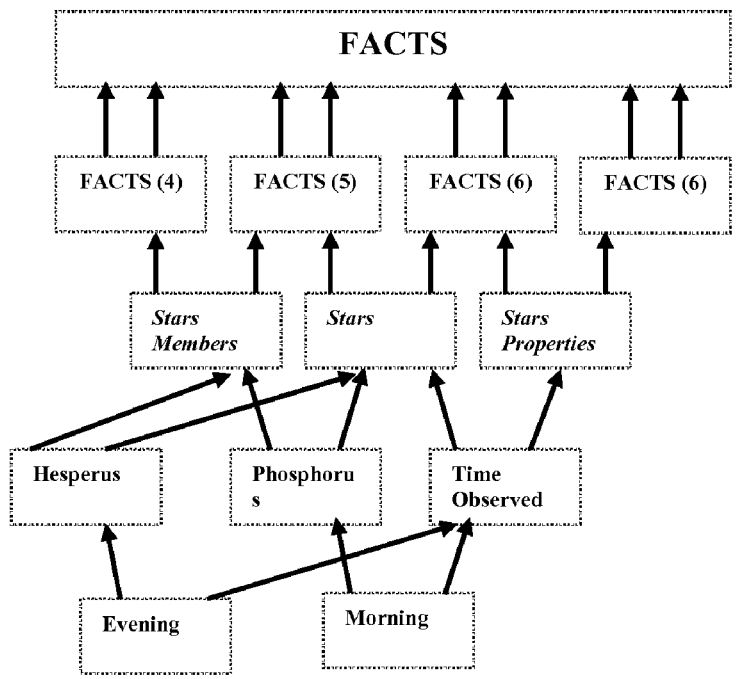
FIG. 41 illustrates how to avoid false inferences in CAT3 in accordance with an embodiment of the present invention.

Of course this entails the false logical inference that Mr. A must know that Hesperus=Phosphorus. This kind of false inference needs to be avoided. This example is represented in CAT3 as illustrated in FIG. 41. First, two points are inserted under a class called "Stars", representing two distinct objects, named "Hesperus" and "Phospherus". The information that Phosphorus is observed in the evening, and Hesperus is observed in the morning, as properties is included.

Figure 42:
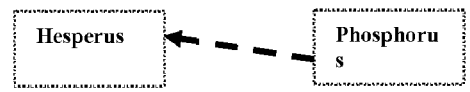
FIG. 42 shows an example representation of information in accordance with an embodiment of the present invention.
Figure 43:
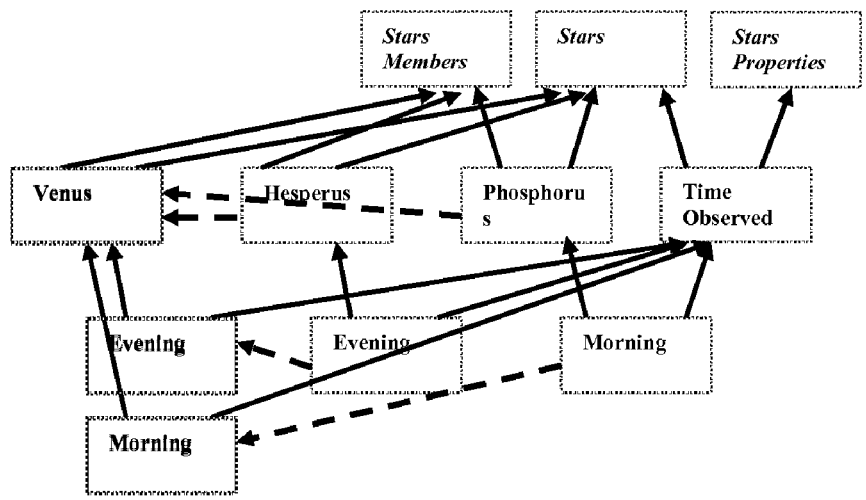
FIG. 43 shows how to add a common identity point as a common parent in accordance with an embodiment of the present invention.

Subsequently the information that Phosphorus is Hesperus is added. This can be done directly with an identity edge between the two as shown in FIG. 42. Or one can add a parent point, "Venus", as the common identity parent as shown in FIG. 43. Also Time Observed properties for Venus are added to duplicate those for Phosphorus and Hesperus, with direct identity edges between these, to show that they represent the same properties. It is clear that the identity edges added represent additional empirical information about the identity of Phosphorus and Hesperus as a single object.

At the same time, there is no need to allow the problematic inference given above, based on the principle of substitution. The principle of substitution stated above is that if: a=b then one can substitute a for b in any symbolic expression. But among the symbolic expressions of CAT3, the only identities of this kind are the trivial identities of points with themselves. It is true therefore that: if point P=point Q then for any CAT3 expression (sub-graph of the network) in which P occurs, the same expression with Q substituted for P is also a CAT3 expression (sub-graph of the network). This is trivially true, because P and Q are the same point.

However, it is never true that: P=Q if there is an identity edge: P→Q. Substitution of points with their identity parents to form new CAT3 expressions (sub-graphs) is not generally permitted. The identity parent relation is not the logical identity relation. Rather it is a semantic relation: if P has identity parent Q, then the external object of reference of P is the external object referred by Q. But this does not represent identity of points P and Q at all. In terms of a more complete hyper-intensional semantic theory, like Transparent Intensional Logic (TIL), CAT3 points correspond to hyper-intensional objects, called constructions in TIL, and points with the same reference (or intension) are nonetheless distinct constructions, and generally represent distinct information by their constructions. A full theoretical interpretation of CAT3 representations as constructions cannot be given here.

7. Relations and Cartesian Products.

A preferred method for interpreting relations in CAT3 is presented, beginning with simple 2-place relations. Typical examples of 2-place relations are familial relations like P is father of Q, P is mother of Q, P is Daughter of Q, P is son of Q. These are simple discrete or binary relations, where the objects generally belong to a single reference class. P Owns Q is another example, where the objects generally belong to different reference classes. P is Distance X from Q between places (e.g., cities) is an example involving quantitative values.

Figure 44:
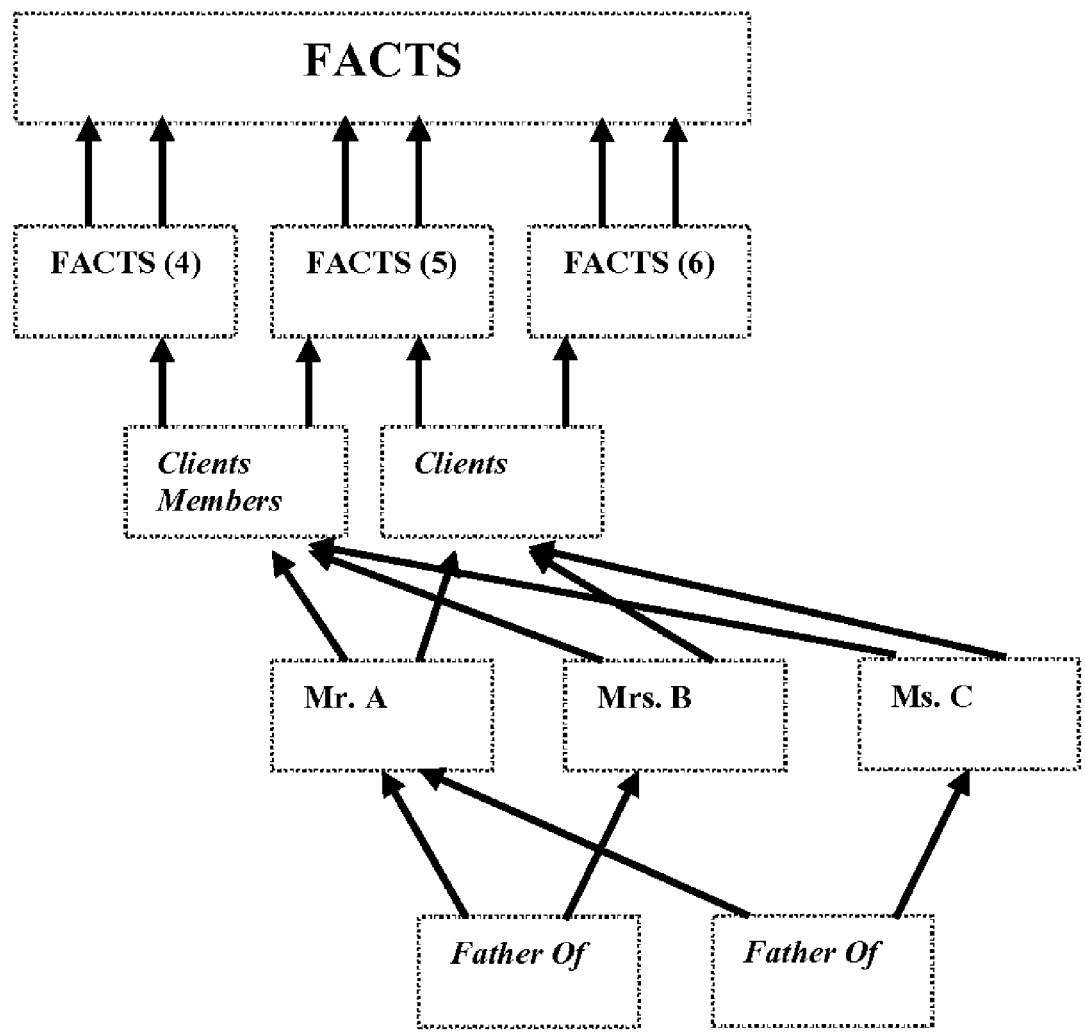
FIG. 44 shows an incorrect method for representing a 2-place relation in accordance with an embodiment of the present invention.
Figure 45:
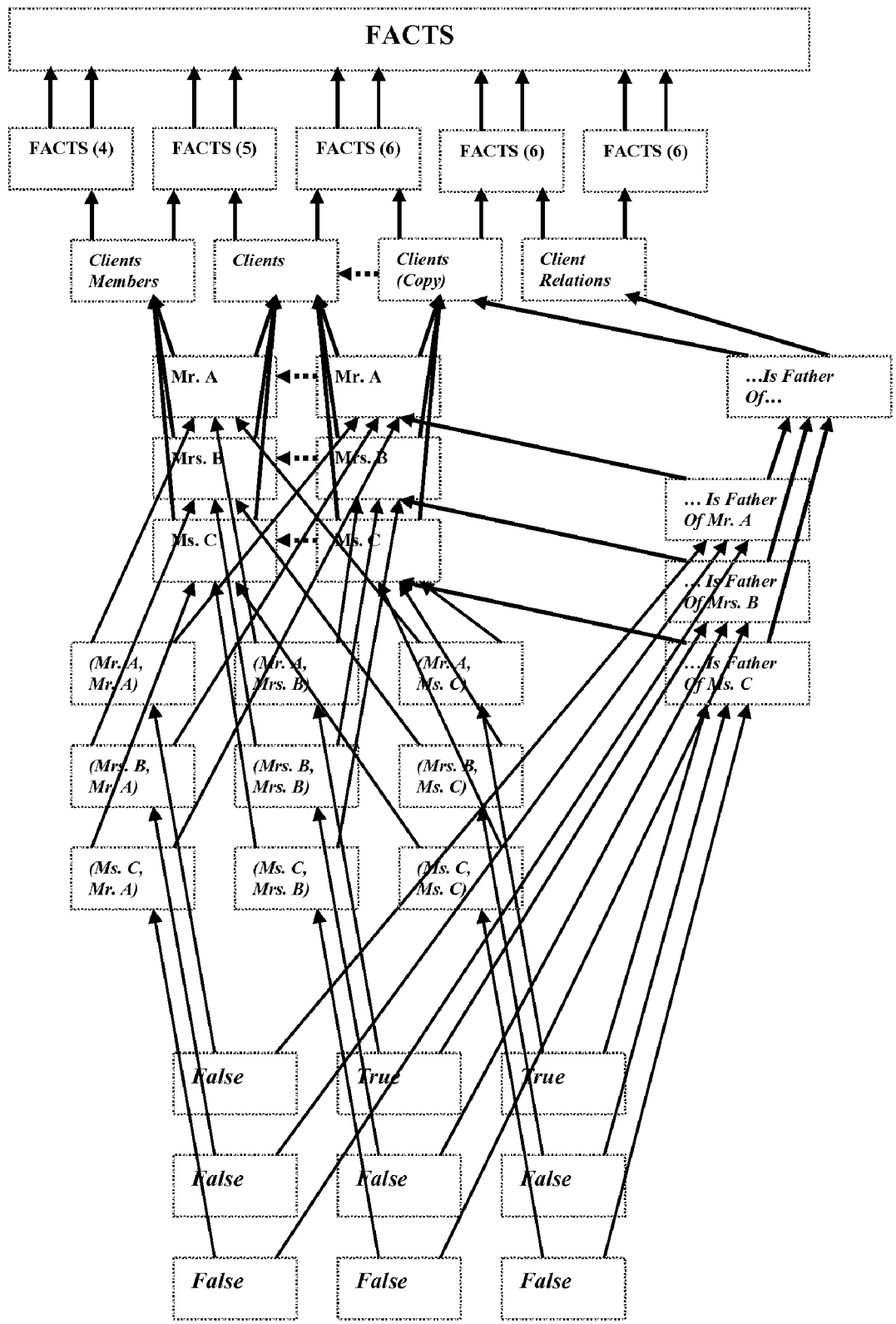
FIG. 45 shows a preferred method for representing relations by Cartesian Products in accordance with an embodiment of the present invention.

Following is an example of familial relations between Clients. Suppose that Mr. A is the Father of Mrs. B. The most obvious way to represent this is by inserting a new point, 'Father Of', with Mr. A and Mrs. B as left and right parents. Similarly suppose that Mr. A is the Father of Ms. C and represent this in the same way by inserting a new point, 'Father Of', with Mr. A and Ms. C as left and right parents. This incorrect method for representing a 2-place relation is shown in FIG. 44. This is possible as a sub-graph (the "Father Of" points are inserted as cross tilings), but it has serious deficiencies: (i) First, it uses cross tilings, and this should be avoided wherever possible—it is preferred to render the sub-graphs as diamond lattices whenever possible. The only place cross joins are desirable is in inserting variables for functions. (ii) Second, the 'Father Of' relation is intended to be the same relation in both cases—but as it stands, there is no representation of identity between the two 'Father Of' points. This could be fixed by providing a common identity parent for these however. (iii) Third, this method could only work for 2-place relations—because it depends on using the two category parents. It would not work for 3- or higher-place relations (P is between Q and R, for example). The method cannot be arbitrarily limited by the number of parenting edges available in this way. Instead a different method is adopted as illustrated in FIG. 45, which is easily generalized to n-place relations, and relations with quantitative values.

Figure 46:
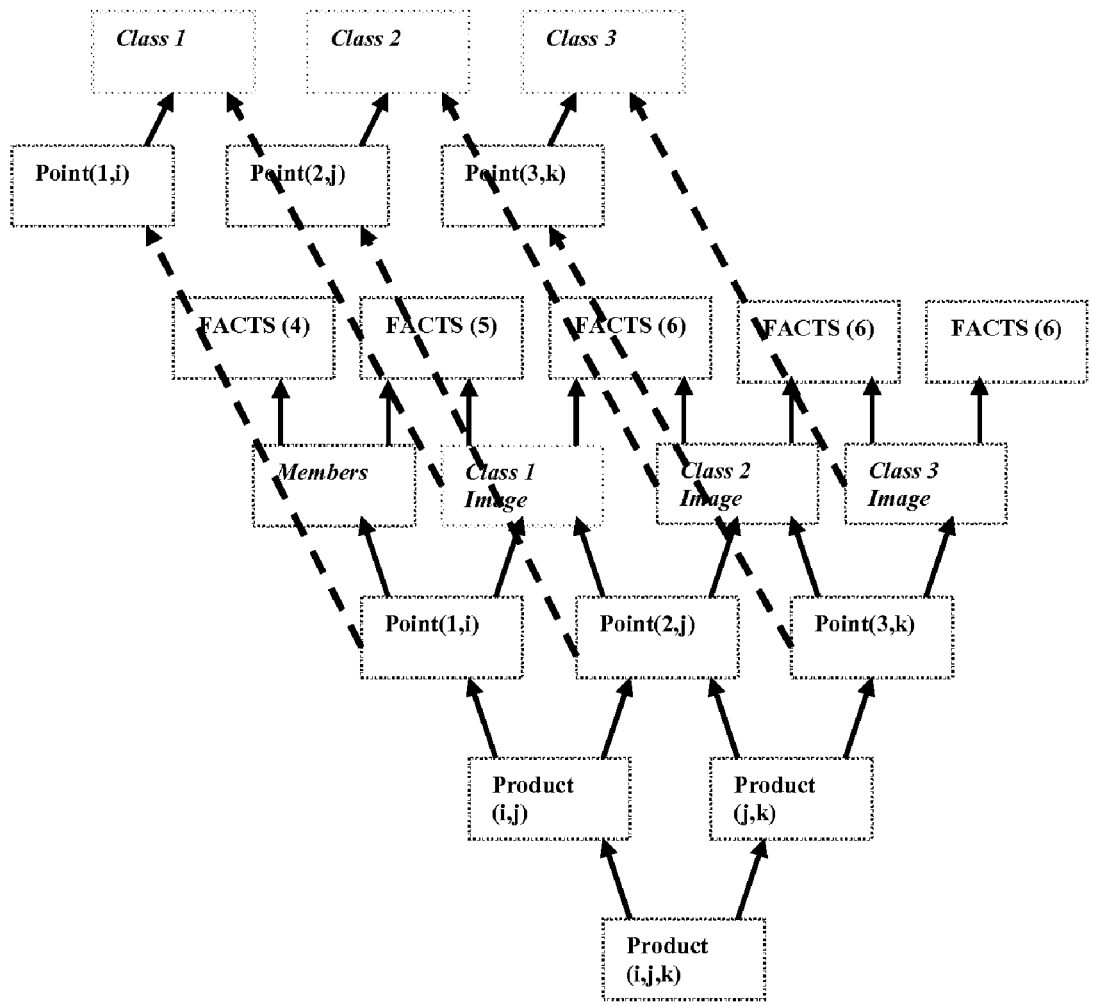
FIG. 46 shows an example representing relations by Cartesian Products in accordance with an embodiment of the present invention.

Cartesian Products. The previous example is based on the construction of a Cartesian Product of two classes: Clients X Clients, as a new class ordered pairs. This is constructed adjacent to the original Clients class, but in general it may be constructed in an arbitrary location (not in the exterior or exterior of the original class). In general, to construct the Cartesian Product of two classes, Class 1 and Class 2 we: (1) Insert a image of Class 1 and all its members, in a preferred location. The image is an isomorphic graph, with identity edges to the original graph. (2) The notation used is: (a) The members of Class 1 are points: Point(1,i), the image members points are: Image(1,i). (b) If the members of Class 2 are points: Point(2,j), the image members points are: Image(2,j). (3) Insert an image of Class 2 and all its members, adjacent to the image of Class 1, using the Class 1 image point as the left parent for Class 2 image members. (4) Insert a point, Product (i,j), for each ordered pair of members, (Point(1,i), Point(2, j)), from Class 1 and Class 2 respectively, between the two member image points, i.e., insert a point Product(i,j) in the location; Image(1,i)←Product(i,j)→Image(2,j). (5) To extend this to a 3-dimensional Cartesian Product, of Class 1×Class 2×Class 3. (6) Add an image of Class 3 adjacent to the right of the image of Class 2, and repeat the process to make the product for Class 2×Class 3, then insert a new set of points, Product(i,j,k), between each point Product(i,j) and Product(j,k) as shown in FIG. 46.

Figure 47:
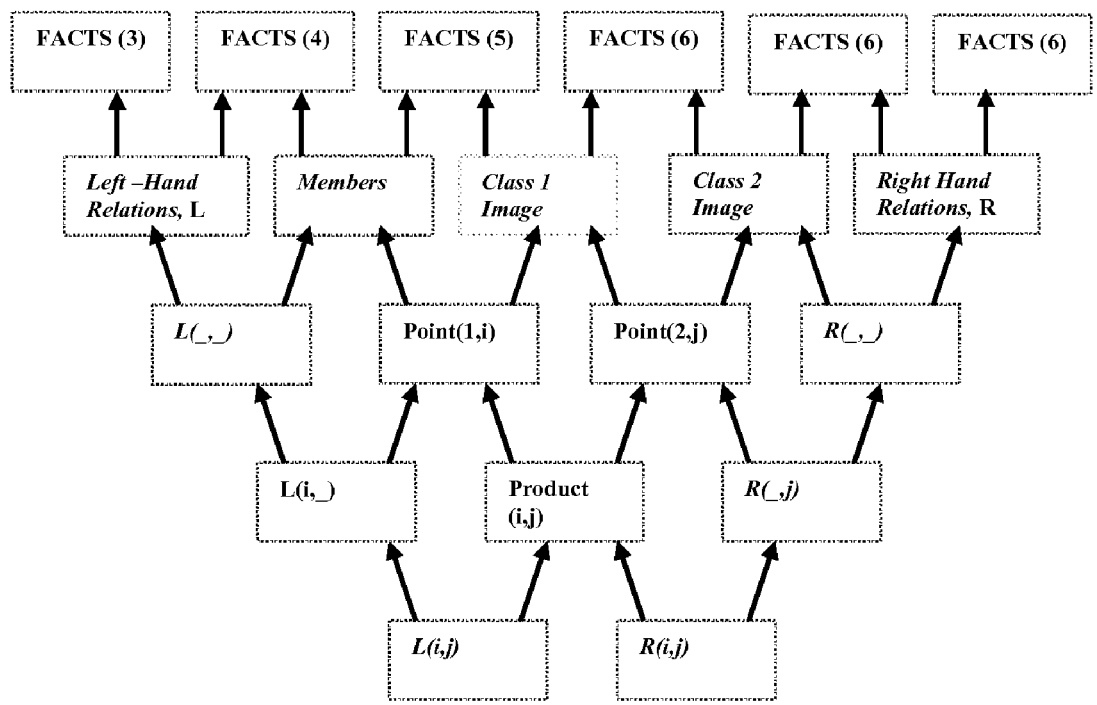
FIG. 47 illustrates how to represent a relation using a Cartesian Product in accordance with an embodiment of the present invention.

This can be extended indefinitely to construct the (representation of) an N dimensional Cartesian Product of N arbitrary Classes in an obvious way. After constructing the Cartesian Product, a representation of the Relation is inserted, effectively as a property on the members of the Cartesian Product Class. Conventionally this is placed on the Right, but may be inserted on the Left or the Right as shown in FIG. 47. The points L(i,j) or R(i,j) represent the values of the relation. For the simple 2-place relation " . . . father of . . . ", the values R(i,j) are binary values or truth value (True or False). This allows the ability to leave value points out (null) to indicate missing values if necessary. Alternatively, the value points can be inserted only where the relation is true, considering missing value points to mean the relation is False. (But this means one cannot distinguish 'False' from 'Missing Values'). For a quantitative 2-place relation (or real-valued function), like: "the distance from x to y is d", the Value content field is used. Alternatively, one could set Values in the Product(i,j) points directly to represent the values of the relation, and leave out the additional Relation points. But if there are multiple relations on one product it is preferable to avoid duplicating the entire product every time.

CALCULATED FUNCTIONS. A feature of CAT3 is its representation of calculated functions. The Job Charges table described above contains the field called Total Charge ($), and it is obviously intended that this is a calculated field: Total Charge ($)=Time (hrs)×Charge Rate ($/hr). In a conventional database, the data for this field would not be entered manually but generated by a calculation function, defined in SQL or in a programmed module. This function is defined separately from the table itself, and must be executed at some point to update data for the calculated field. Note that if such a function was executed, it could not result with the null value shown for the Job 3 record for this field. (Regarded as a base table, however, any data is possible).

Calculated fields are defined as functions of other data, requiring functional dependencies between data items. In CAT3 information defining such functional dependencies is represented in the CAT3 Network itself. Next, a method for inserting such functions in CAT3 is illustrated. The function used for the Total Charge ($) field in the example is the function that takes each pair of data values for the fields Time (hrs) and Charge Rate ($/hr) for each record, multiplies them together, and inserts the result as the value of the point for the Total Charge ($) field for that record.

To define the information to implement this function references have to be defined to: (i) the function type, in this example represented by a point called "=X*Y" in the FUNCTIONS partition. (ii) the fields Time (hrs) and Charge Rate ($/hr) that provide reference to the values for the calculation. (iii) the records that the function is to apply to. This is done by inserting or modifying points as follows: (i) the original point Total Charge ($) under Clients-Fields has identity parent to the function type point "=X*Y" in the FUNCTIONS partition added. (ii) two image points with identity parents to Time (hrs) and Charge Rate ($/hr) are inserted, in a chain on the right below the Total Charge point; their right parents are the special points "X" and "Y" (called variables) stored in the FUNCTIONS partition. (iii) the class of the left parent of the field point defines the record set for the function to operate on.

This is sufficient information to define the intended functional calculation. The calculation is executed (by activating a general procedure to update calculated functions) with the following general process: (1) determine whether the original field point: Total Charge ($) has a link to the function type: "=X*Y"; if so, call this Field(0), and execute a sub-routine defined for this function type. This routine proceeds as follows: (2) determine the identity links of the chain of the first two variable argument points on the right of the function point; call these Field(1) and Field(2). (3) determine the left parent of the function point (Clients), and the Class on its left (Job 1, Job 2, Job3, . . . ); call these Record(!), Record(2), . . . Record(n). (4) for each record, determine if there is a unique pair of data points: Record(i)←Data(1,i)→Field(1) and Record(i)←Data(2,i)→Field(2); if so, define the value: Data (0,i)=Value($\overline{\text{Data}(1,i)}$)*Data(2,i). Otherwise define: Data(0, i)=null. (5) check whether a (data) point exists with parents: Record(i)-Field(0). If not, insert a new point, and set its value as Data(0,i). There are possible variations on the function definition, e.g., it may be decided that: (6) if the value of Data(0,i)=Value(Data(1,i))*Data(2,i) is null, delete the data point Data(0,i); or: (7) if there is more than point for either Data(1,i) or Data(2,i) for a record i, choose the latest values by Date 1 in either case, and perform the calculation: Data(0,i)= Value(Data(1,i))*Data(2,i).

A point is that such programmed functions are defined in general terms independently of any specific point to which it may apply. That is, nothing in the programmed functional procedure refers to any specific point. The procedure refers only to a type of sub-graph structure around any point. Its functional inputs are completely determined by information stored in the network relations.

Implementation

In an embodiment the implementation of a CAT3 database minimally requires: (i) a representation of the CAT3 Network as a relation, called, for example, the 'CAT3 Table', implemented as one or more tables or files; (ii) a representation of network rules to ensure consistency with key CAT3 axioms and Network Rules; (iii) an implementation of CAT3 Network Functions necessary to manipulate table records, i.e., functions to insert, delete, and modify records of the CAT3 Table.

Implementation as a practical application includes additional interfaces, tools and programming structures to enable a user-friendly system for programmers and users, which is an open-ended project. Only the minimal structure is outlined here. An implementation could be achieved on any variety of platforms sufficient to program the CAT3 Table object and functions.

A method for implementation using a relational database management system (RDMS) as a platform is presented. This is a particularly convenient platform, as an RDMS comes equipped with high-level tools for building tables, fixing relationships, and constructing SQL functions for manipulating tables via a database engine, as well as tools for designing interfaces and programming objects (forms, reports, queries, etc). Note however it is not necessary to use a RDMS to implement the system: a CAT3 Database engine could be specifically programmed with the functionality, and does not require SQL. In the preferred RDMS implementation, the CAT3 Table is represented as a single table, and key network rules are implemented via fixed relationships.

(i) THE CAT3 TABLE. The Fields for the CAT3 Table in a preferred implementation are shown in FIG. 48, with their data types. A view of the first 11 records of the CAT3 Table (the Zero point, the CAT3 point, and nine initial CAT3 Partition points) is rendered in FIG. 49 in the standard format, showing their fields. Note that the BID number: −2 has been assigned to the Zero point, and the number: 0 to the CAT3 point. Numbers 1 to 9 have been assigned to the initial CAT3 Partitions. These are useful conventions. In particular, some special number must be assigned to the CAT3 point for system-wide reference in programmed functions, and 0 is the obvious choice. Likewise a special number must be assigned to the Zero point, and by convention, this is the only point with a negative BID number. BID is a long integer used as the primary keyed field, identifying CAT3 Table records. Each record represents a point in the CAT3 Network. Three fields represent the Edges: (i) BID1 is a long integer, joined to BID used to define the left parent. (ii) BID2 is a long integer, joined to BID used to define the right parent. (iii) BID3 is a long integer, joined to BID used to define the identity parent. Conventionally the value '0' is used to represent the null edge (null identity parent).

In an embodiment, these three fields are 'foreign fields' in the CAT3 Table, but they refer back to the BID field in the same table. These three fields can take duplicate values. Values are required. Five fields represent the core Content: (1) Order is a long integer. (2) Title is a string. (3) Value is a double (real). (4) Date1 is a date-time. (5) Date2 is a date-time. Values are not required for these fields. Four fields represent Extended Content for hierarchical functions: (1) Hfunction is a long integer, representing an index for functions associated with points. (2) H$f$1, H$f$2, H$f$3 are binary fields, representing inclusion or exclusion from hierarchical lists relative to left, right and identity parents. Two fields represent additional Extended Content: (1) Prob is a double (real), allowing a second real value quantity, used e.g., to represent transition probabilities, or imaginary components of complex numbers. (2) BID4 is a long integer, used to represent special mappings between other BID fields, e.g., to map the record BID to a record BID in another CAT3 Table for define a translation between CAT3 Databases.

Figure 50:
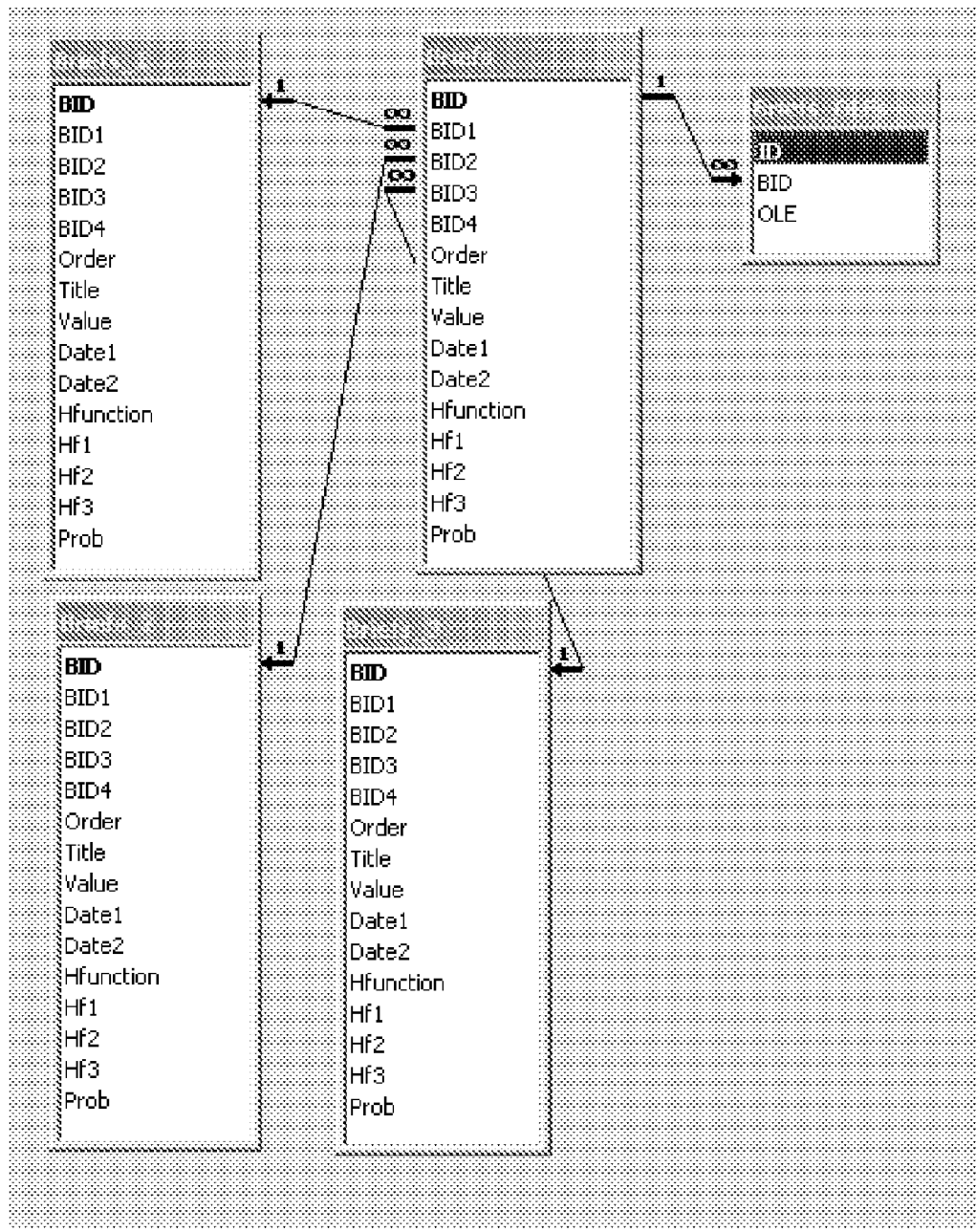
FIG. 50 shows relationships between CAT3 tables in accordance with an embodiment of the present invention.

(ii) Network Rules. Significant Network Rules are those requiring that (a) a unique left and right edge exists for every point, with parent points within the Network (except in the case of the CAT3 point which has the Zero point as parents); and (b) a unique identity edge exists for every point, with parent point either within the Network or null. By conventionally defining null identity edges with a parent BID number 0 (i.e., the number for the CAT3 point), a basic rule can be implemented for all edges in the same way, by defining 1-many (outer) joins from BID1, BID2 and BID3, respectively, to BID, fixed as permanent relationships. This is pictured in FIG. 50 for a CAT3 Table, called 'Briefs' in a preferred implementation:

These relationships are defined with the Enforce Referential Integrity property, so that the basic Network rules above cannot be broken. For convenience, the following relationships are defined: BID1→BID and BID2→BID with (i) Cascade Update and (ii) Cascade Delete as (transactional) properties, so that (i) if the BID number for a record is changed, any dependant (left and right child point) records automatically update to retain the same parent reference; and (ii) if a record is deleted, its dependant (left and right child point) records delete. If the dependant points are not expected to be deleted, their edges must be altered before deleting the parent point. For the join BID3→BID, the (i) Cascade Update property is defined, to ensure points retain their identity parent references; but Cascade Delete is not defined for this join, as it is not preferred to delete child points of identity edges. Rather, the identity edges are deleted (and set to null) before deleting the parent. These relationships then ensure the most fundamental Network rules as maintained, with convenient transactional properties for updating keyed fields. This does not represent the complete set of set rules (or Network Axioms). E.g.: (i) it allows edges from any point (not just the CAT3 point) to the Zero point; (ii) it does not rule out cycles in the Network; (iii) it does not ensure that that all paths upwards lead to the CAT3 point.

These additional rules are implemented in a different way, via the implementation of Network Functions normally used to insert, modify and maintain records. But the Network rules or axioms do not have to be maintained in a strict fashion for all the Table records. In a preferred implementation, sub-graphs are allowed to be represented by the Table which do not conform to all the CAT3 Network axioms. Indeed, the Zero point already lies outside the CAT3 Network proper. If the Table contains additional points that do not conform to the axioms or rules, then only sub-sets of the Table represent CT3 Networks. The CAT3 Network can be defined by the Table as the maximal sub-graph that does conform to all the axioms.

One reason for allowing this is to enable modifications to a Network by changing parents, via transformation processes that lead to intermediate graphs that do not conform to all the axioms at every step. Such transformations should not be ruled out. Note that many representational properties of the CAT3 Network continue to hold for sub-graphs having anomalies with the full set of Network Rules for the CAT3 Representational Space. However, the full set of defined system functions and semantic interpretation cannot generally be presumed to be consistent or unequivocal for such sub-graphs.

External Tables and Extensions.

Note that the relationship diagram above also shows a relationship with an external table, called Briefs_OLEs, with a 1-many (outer) join from the CAT3 Table (Briefs table) field BID to a corresponding field BID in Briefs_OLEs. The specific purpose of Briefs_OLEs in this case is to hold additional information on linked or embedded objects (such as media objects), using a field with a special OLE data type (defined in Microsoft database systems, but not necessarily others) for this purpose. This is an example of an extension (or content extension) defined through an external table. Note that content extensions defined earlier as extensions of the CAT3 Table fields (such as the Hfunction, Prob, and BID4 fields) could be defined in a similar way, by creating these fields in an external table. However, if this is defined with an 1-1 (inner) join to the CAT3 Table, it is logically equivalent to a single table (a single relation). Indeed, the core Content fields (Title, Order, Value, Date1 and Date2) could equally be externalized in a second table with an inner join on a unique BID field if necessary; but the logical structure remains that of a single relation in the sense of conventional database or first-order model theory.

Clearly relationships between the CAT3 Table and other external tables can be defined in any variety of ways. The CAT3 Network can be used as a base to conceptually structure information, and subsequently relate records to other external objects via additional tables. Such extensions do not generally form an intrinsic part of the CAT3 Database. Information in such extensions is not generally a part of the CAT3 Representation. No intrinsic limitations on any such extensions are defined in the specification of a CAT3 Database.

Finally note that content extensions can instead be defined by empirical properties, represented by points within the Table, rather than requiring any extension by adding Table fields. For example, the Prob (real number) field that is added as a content field in one extension could instead be defined for the points to which it needs to be applied as an empirical property, with a Value (just as other empirical fields are defined). However, if this property is used very widely, or has some special function associated with it, it is preferable to define it as a special (calculated) function; i.e., define a new function type, and link the point for representing the property to the function type, and program a computational function (as is done for "=X+Y", etc) specifically to implement the functionality. If such a property is used as a generic function, commonly applying a large number of points, it becomes pragmatically sensible to implement it as an additional content field. (In fact in principle this can be done for any of the content fields; e.g., the Value field could be deleted, and Values inserted as empirical properties; but the real number values would have to be symbolized as digital strings, using the Title field (since no points would have Values any longer); and then function types would have to be programmed to mimic 'numerical computations' as transformations on these strings. Of course this has already been done in the form of functions defined on number fields in the database engine used as a platform, and it would be quite impractical to duplicate this at least in this implementation, but it is important to realize this method is available in principle.)

(III) CAT3 Network Functions.

Operations have to be performed on CAT3 Networks, essentially reflecting the base of Network Rules defined earlier. These operations include insert, delete and modify CAT3 Table records, including modifying both content and edges. Also, abilities include the ability to search for records by various criteria, define selections of records, and output these in various formats. The situation is somewhat parallel to the function of SQL for ordinary tables. In a RDMS equipped with a variant of SQL, the SQL functions obviously provide a very general method for defining functions for specifically manipulating the CAT3 Table. Alternative methods are available through any variety of programming languages equipped with functions to manipulate table content. Note that the functions only involve manipulation of table content, not of the CAT3 Table structure, as the CAT3 Table structure is fixed for the database implementation in question.

A set of functions specifically defined for the purpose of manipulating CAT3 Table content will include a minimal base set, and various higher-order functions defined to manipulate groups of records for special purposes, including exchanging information between CAT3 and other types of representations (e.g., databases, spreadsheets, etc). Such an implementation can be referred to as a system of CAT3 Network Functions or Programming Functions. However such a system can be defined in a variety of different ways, for different operating platforms, and does not form part of the definition of the CAT3 Database per se. A practical implementation will also employ methods for rendering CAT3 Database information via screens or reports, importing and exporting CAT3 data to various external formats, etc. Again these lie outside of the definition of the CAT3 Database per se.

Implementation of the CAT3 Lattice as a Relational Database.

The CAT3 system has been programmed and implemented as a Microsoft Access (MSAccess) relational database, CAT3.mdb. This uses tables, SQL queries, forms, reports and VB modules, as usual. The choice of a relational database management system as a development platform is only for convenience: a CAT3 system could be programmed in a more fundamental language, and does not require a pre-existing SQL engine, or a relational database management system. CAT3 does not fundamentally depend on relational database technology—it is essentially an alternative model for constructing databases. The main component in the representation is a single table or file, here called Briefs.

Briefs Table Records. The Briefs table has an unlimited number of records. Each record represents a lattice point identity, along with the three edges: left-up edge, right-up edge, identity edge, and the elements of the content of the point. These are represented by the following fields.

Briefs Table Fields. The Briefs table has 9 fields named as follows:

| Field Name: | Format: | Interpretation: |
| --- | --- | --- |
| BID | Long Integer | Record Identity (Keyed field) |
| BID1 | Long Integer | Left Parent Record Identity |
| BID2 | Long Integer | Right Parent Record Identity |
| BID3 | Long Integer | Link Parent Record Identity |
| Title | Text (alphanumeric) | (See Interpretation below) |
| Order | Long Integer | (See Interpretation below) |
| Value | Double (real number) | (See Interpretation below) |
| Date1 | Date-time (real number) | (See Interpretation below) |
| Date2 | Date-time (real number) | (See Interpretation below) |

A certain group of initial records in this table needs to be standardized as a basis for programming functions and interpreting a basic foundation for object representation. An example of an initial set of Briefs records is shown in FIG. 51. Note that the first record (the 'zero point') does not belong to the CAT3 Lattice proper. Only the records that belong to the CAT3 Lattice are used to represent information. The zero-point has only a pragmatic function.

Enforcing Relational Structure.

Figure 52:
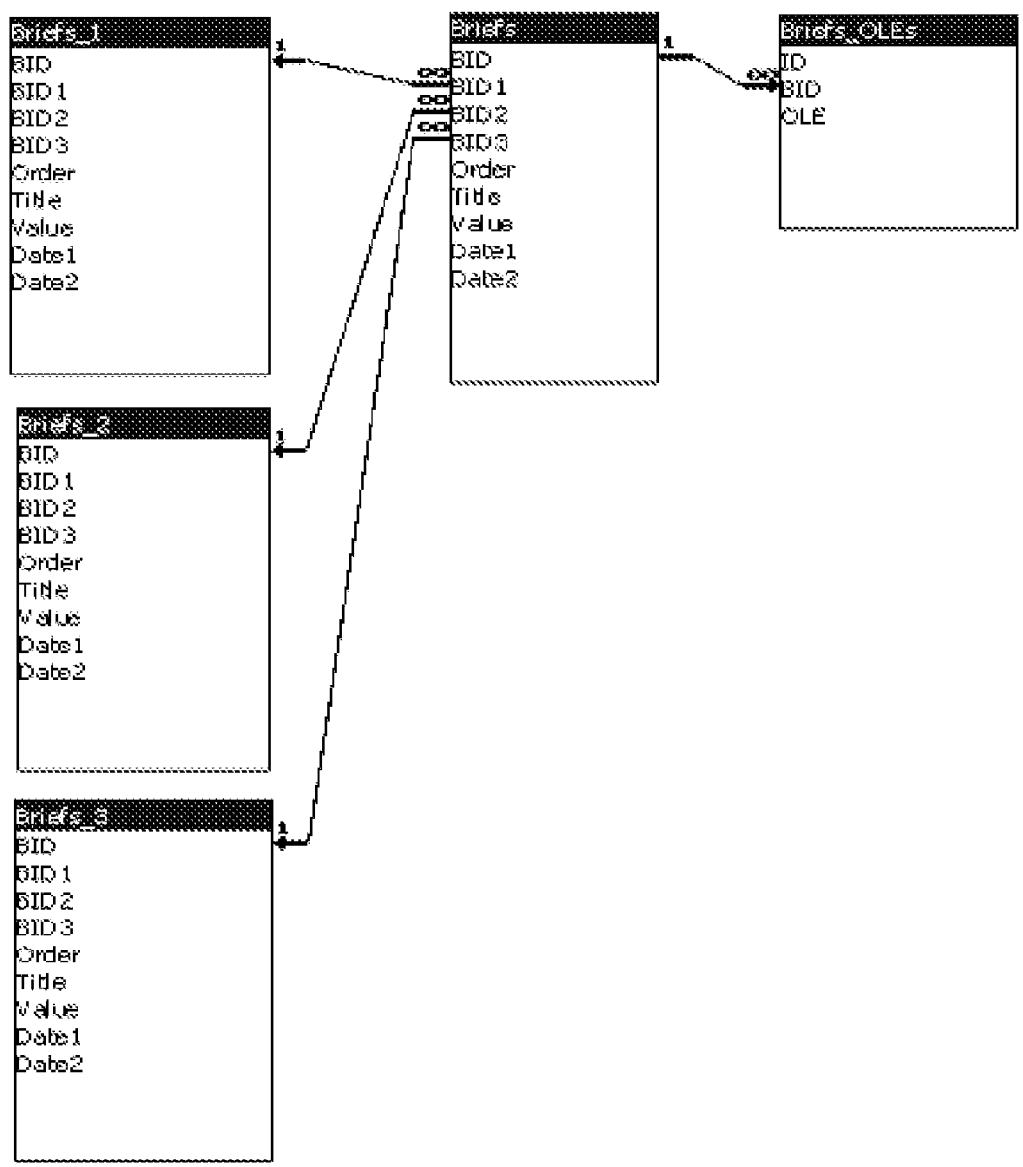
FIG. 52 illustrates relationships between CAT3 tables in accordance with an embodiment of the present invention.

To enforce the main rules for the CAT3 Lattice a number of table relationships are implemented through SQL transactional properties, as depicted in FIG. 52 for the MSAccess CAT3 database. As shown in FIG. 52, the relationships enforced on BID1, BID2, BID3 are 'self-relationships' on the Briefs table. These relationships are a simple way to enforce the rules that BID1 and BID2 (left parent and right parent) are always members of Briefs (points, identified by BID).

Note that here the same rule is enforced for BID3 (identity parent); in the case where BID3 is null, which must be allowed, insert 0 as the conventional value for the CAT3 point, and interpret this as 'null'. This means one can never identify (link) any other token with the CAT3 point itself—and in practice this should never be done. To completely enforce the CAT3 lattice structure on the Briefs table a few additional rules have to be implemented, to prevent self-referring parents, and to prevent circular loops. This is done via programmed functions. However, note that it is not necessary to completely enforce all these rules on the Briefs table itself. Records may be allowed in Briefs that do not belong to the CAT3 lattice proper—as long as only record-sets containing points in the CAT3 lattice proper to represent information are used. That is, one can make the Briefs table more general than the CAT3 lattice proper. However, in practice, the only additional record needed is the 'zero-point'.

External Table Links. Note in the Relationships depicted above an additional table is shown, called "Briefs_OLEs", which is a table of 'external objects' (linked objects such as clip art, pictures, equations, etc) which may be associated with a lattice point. This is a simple, external, extension of the intrinsic properties of points. The same logical result can be achieved by adding an OLE field to the Briefs table, as part of the 'content' of a point. However, instead of expanding the Briefs table structure in this ad hoc manner, it is better to maintain the minimal structure of the Briefs table needed for functional purposes, and attach 'expanded' object references such as OLEs by adding linked additional tables such as Briefs_OLEs as needed for special applications. The Briefs_OLEs table has the following structure.

| Field Name: | Format: | Interpretation: |
|---|---|---|
| ID | Long Integer | OLE Record Identity (Keyed field) |
| BID | Long Integer | Briefs Record Identity |
| OLE | OLE | OLE reference |

Screens: Viewing the Briefs Table through Forms, Reports and Queries. The content of the Briefs table is viewed and manipulated through 'screens' by means of 'forms', 'reports', and SQL queries, to render it visually as the CAT3 Lattice structure. These include:

| Forms: | Query: |
|---|---|
| Flatland | qryFlatlandCenter |
| CAT3Lattice | qryCAT3Lattice |
| ImportTablesForm | qryImportTablesForm |
| FlatlandDataEntry | qryFlatlandDataEntry |
| FlatlandLinkform | qryFlatlandLinkForm |
| Reports | Query: |
| Table Report | qryTableReport |
| LinksTree Report | qryLinksTreeReport |
| Queries | Purpose: |
| qryCrossTabProperties | Renders lattice data in a table-like format. |

The basic method is to: (i) Use SQL queries to render the individual records in the Briefs table (points) as a set or series, and assign these to controls in forms graphically arranged to display the data 'points' in the lattice arrangement. (These are called lattice mosaic queries.) (ii) Use SQL queries to create Lists (generally the intersection lists or union lists as defined above), assigned to controls which are displayed between the lattice points. (These are called lattice list queries.) The lattice mosaic queries have a repetitive mosaic construction, which may be extended indefinitely to show as much of the lattice in one view as necessary (subject to limitations of physical memory and processing power). In practice, viewing areas of the lattice can be limited to only about 6 units deep, because this is generally about as much complexity as can be comprehended at one time. However, for various special projects expanded mosaics may be used to view more detail at once. The full display of lattice points is shown in the graphical display of the CAT3Lattice form. However, the most useful views in practice are of the flat lattice sub-spaces. The display of flat lattice sub-space points and union lists is shown in the graphical display of the CAT3 Lattice form. The same basic type of 'mosaic' construction is used in all renderings of the data in lattice form (e.g., in the TableImportForm and display of various search/filter tools). Sub-spaces are rendered in more conventional 'table-like' displays for some purposes, e.g., to make data entry forms (e.g., the FlatlandDataEntry form), reports (e.g., the Table Report), and queries (e.g., the qryCrossTabProperties query).

Figure 53:
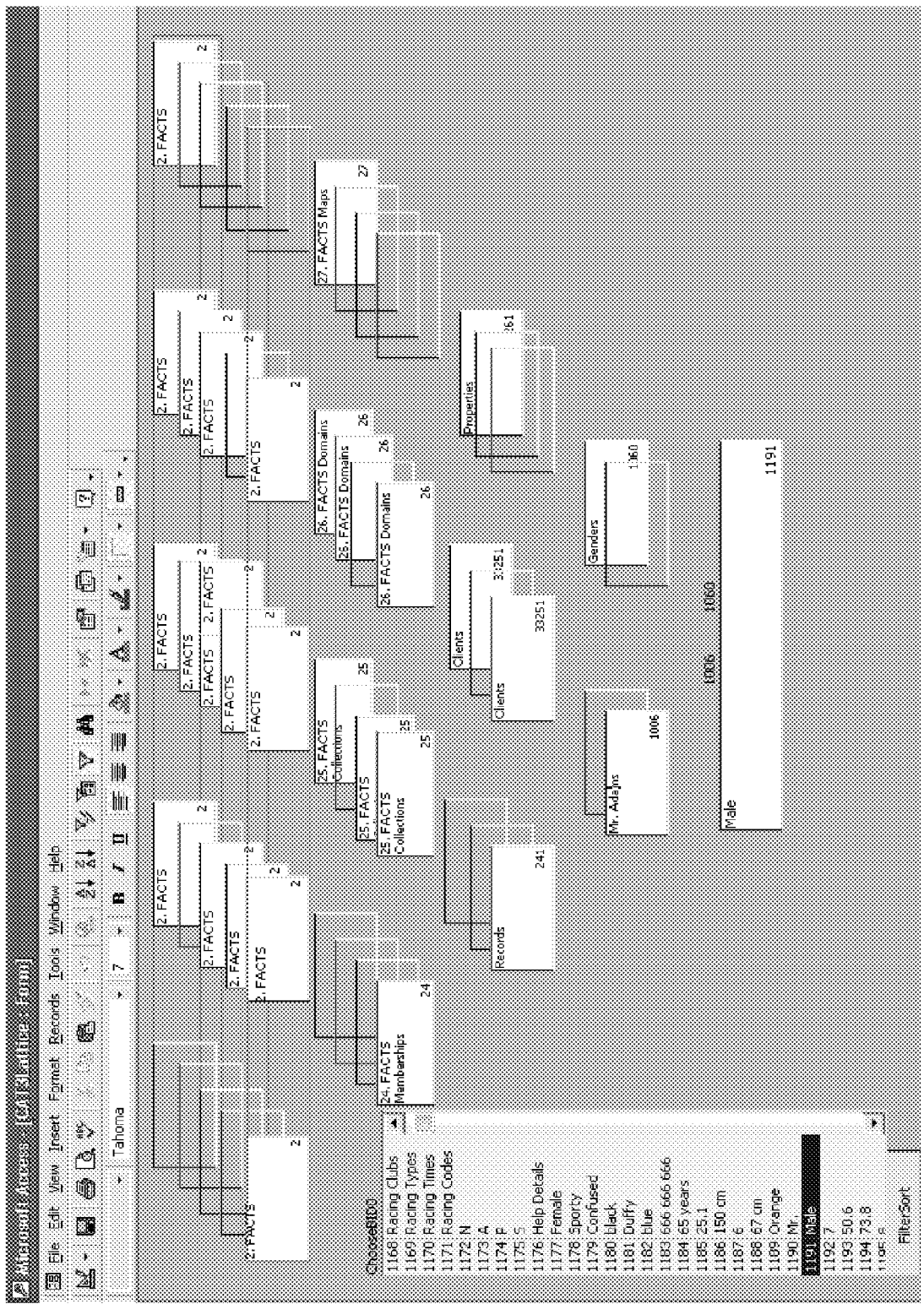
FIG. 53 shows the CAT3 Lattice form in accordance with an embodiment of the present invention.
Figure 55:
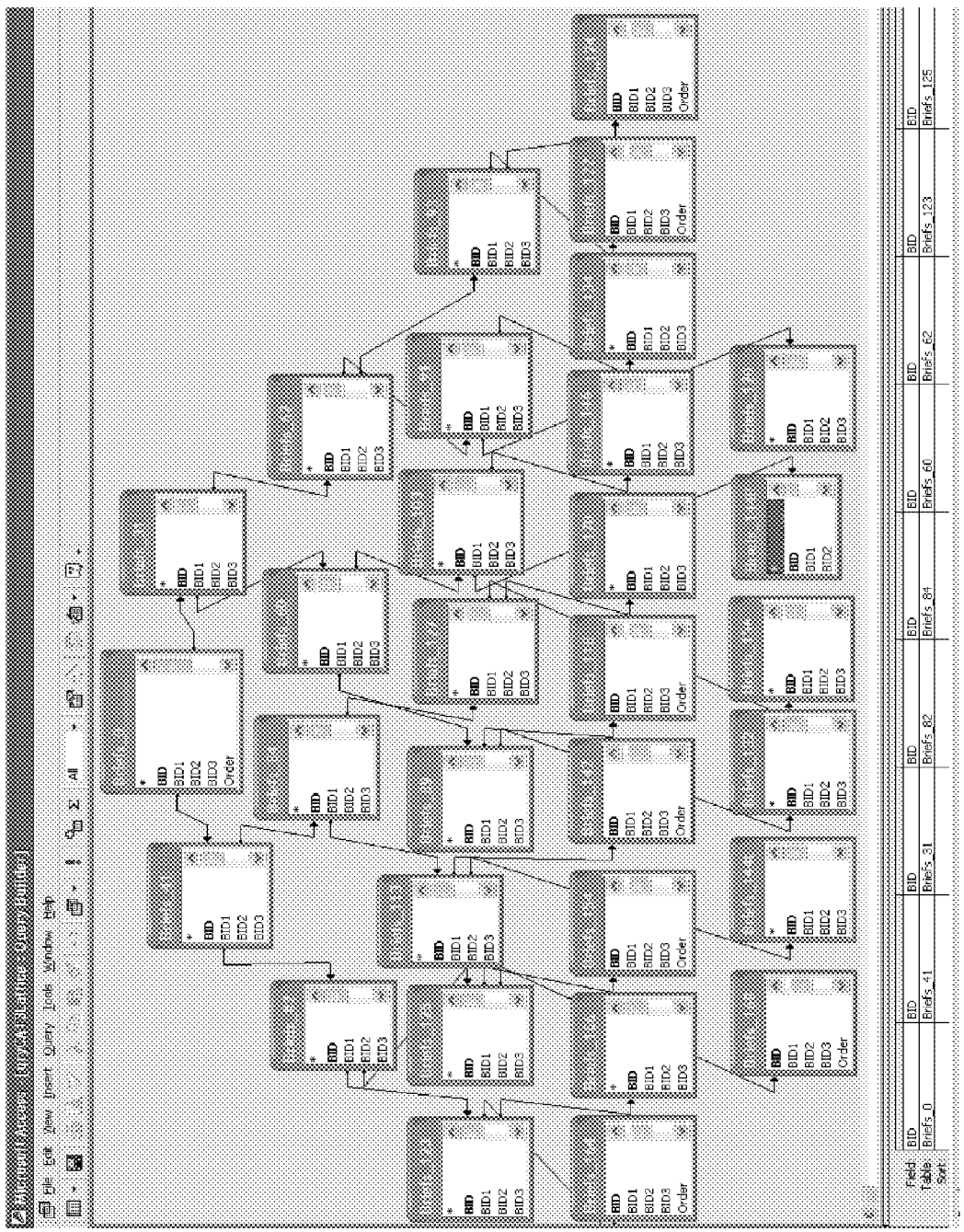
FIG. 55 shows SQL used in the CAT3 Lattice form in the query builder view in accordance with an embodiment of the present invention.

The CAT3 Lattice Form. This allows the full lattice construction to be viewed (to 5 units deep). That is, it shows all parent fields separately, without assuming a flat sub-space. This form can be used to check whether a record belongs to a 'flat' lattice sub-space, or whether it has parenting anomalies. FIG. 53 shows the CAT3 Lattice form with all parent fields shown separately. FIG. 54 shows the SQL query corresponding to the CAT3 Lattice form called qryCAT3Lattice. FIG. 55 shows the qryCAT3Lattice in the query builder of MS Access.

Figure 56:
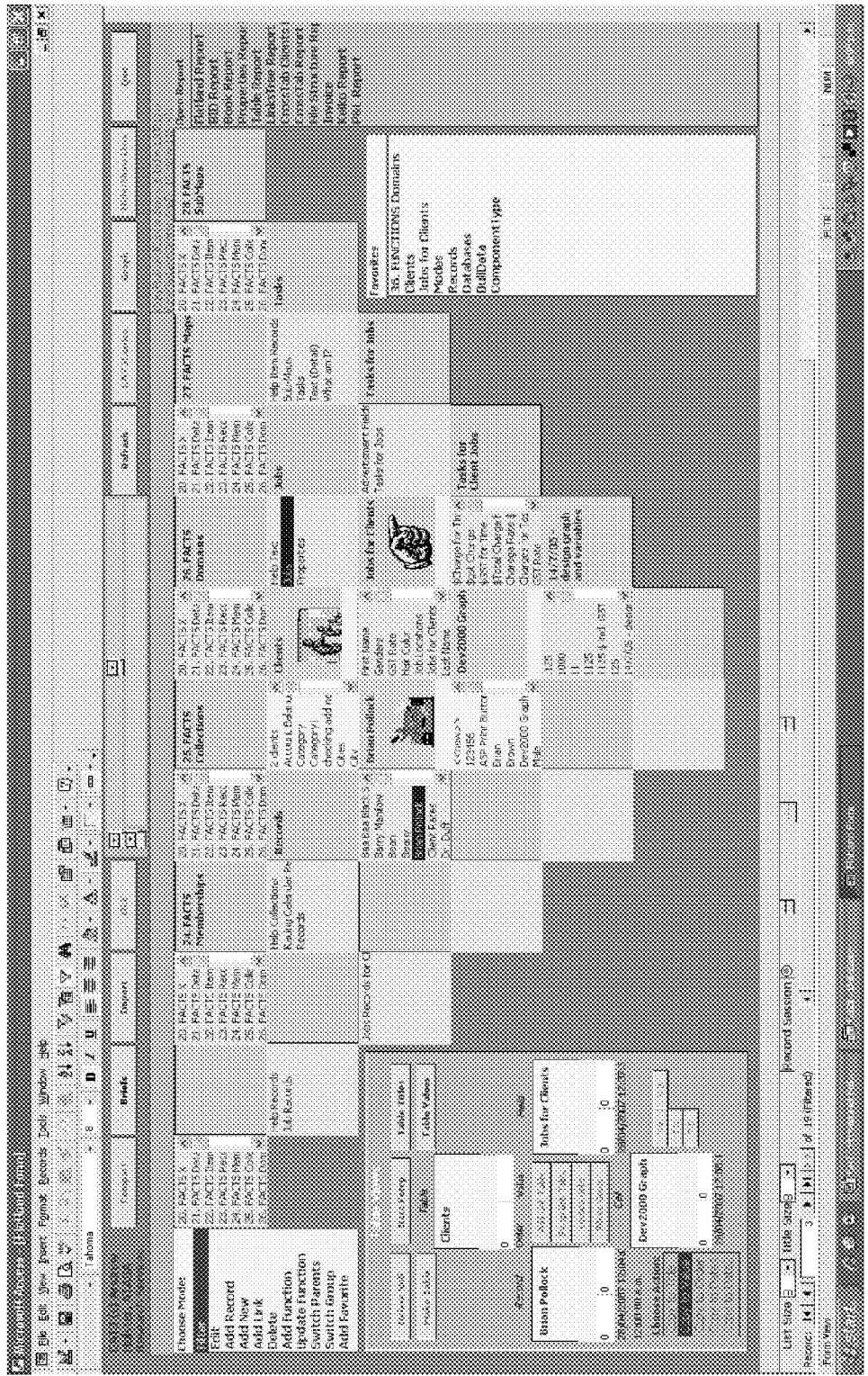
FIG. 56 shows the Flatland form in accordance with an embodiment of the present invention.
Figure 58:
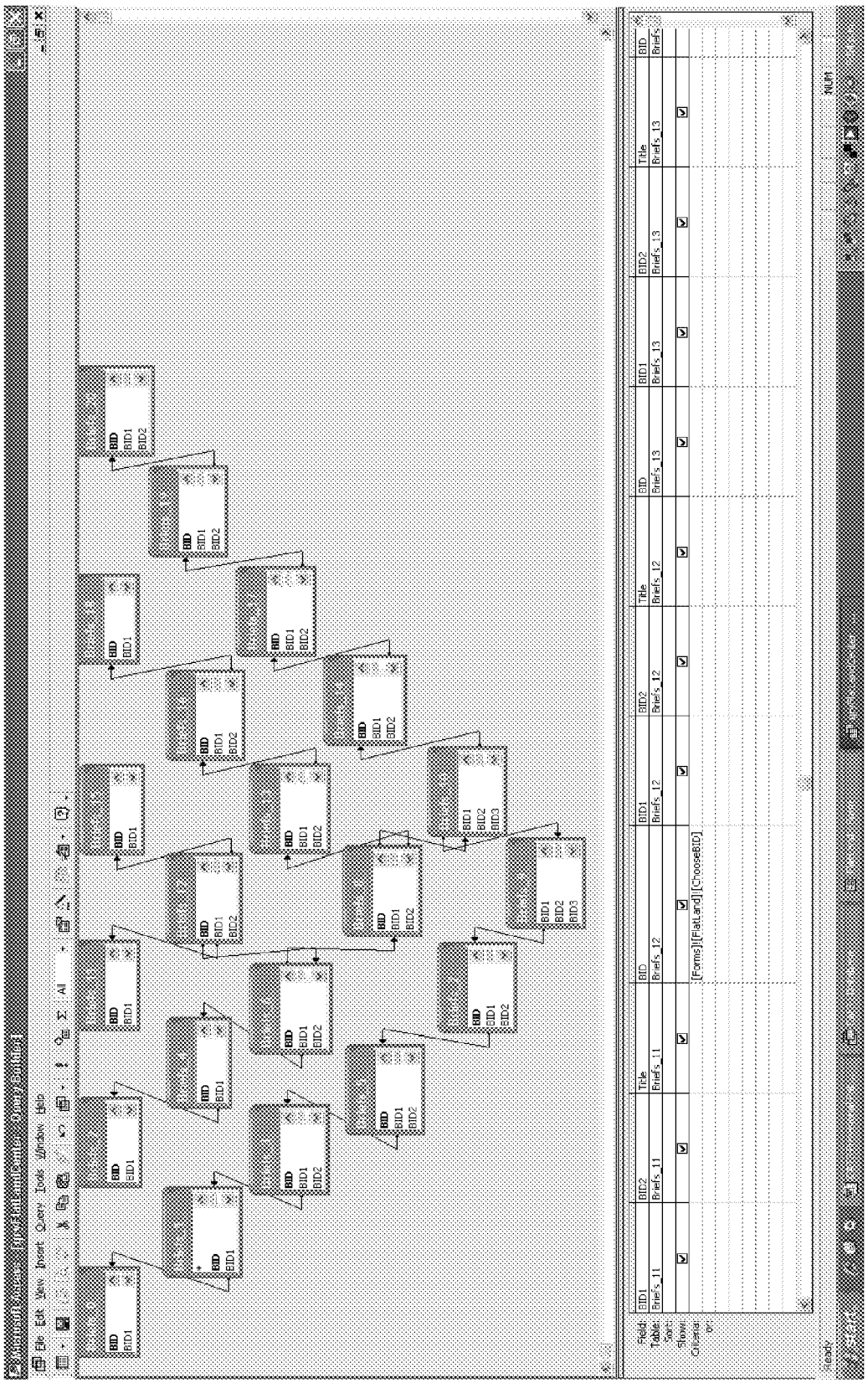
FIG. 58 shows the SQL used in the Flatland form in the query builder view in accordance with an embodiment of the present invention.

Flatland Form. The Flatland form shown in FIG. 56 is the main form at the heart of the CAT3 system, showing a view of 'flat central sub-spaces' (with boundaries that may not be 'flat'). This contains tools for operating on the lattice, and controls to open other forms, reports and queries. Every item of information can be viewed through this form, and in principle, every operation on the lattice can be performed in this form using a small number of tools (using 'mode' controls: Filter; Edit; Add Record; Add New; Add Link; Delete; Add Function; Update Function; Switch Parents; Switch Groups). FIG. 57 shows the SQL query underlying the Flatland form and FIG. 58 shows the MS Access query builder view of the query underlying the Flatland form. This is the fundamental type of query design used to render Briefs records as a 'flat lattice sub-space' view. There are obviously many variations on the size and naming conventions, etc. However, the main variations are on the dependencies in the central column. This variation is designed to show child fields through a central 'zig-zag', which starts from the 'center' (Briefs_12_BID), and goes: left, right, right, left.

Figure 59:
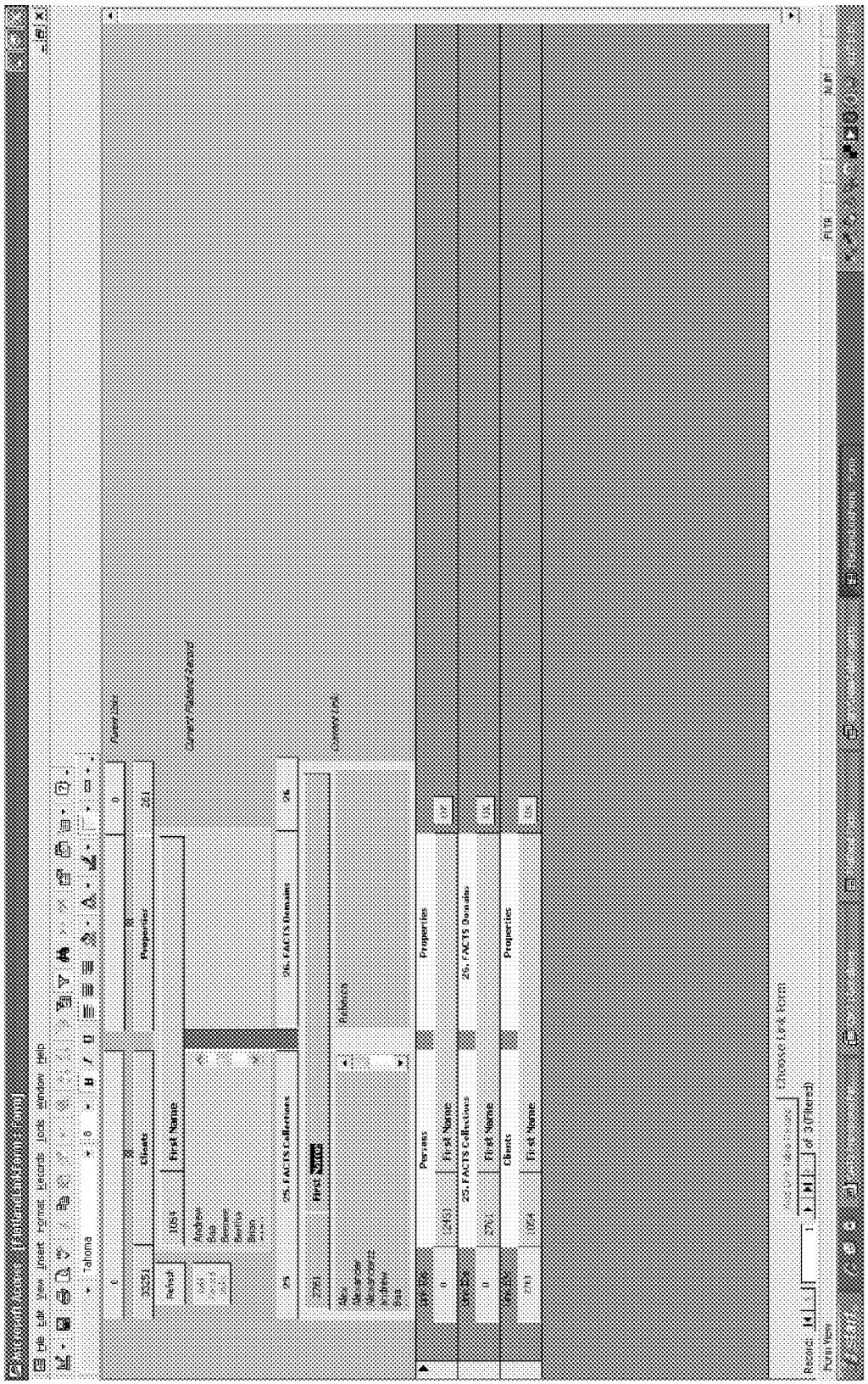
FIG. 59 shows the Flatland Link form in accordance with an embodiment of the present invention.
Figure 60:
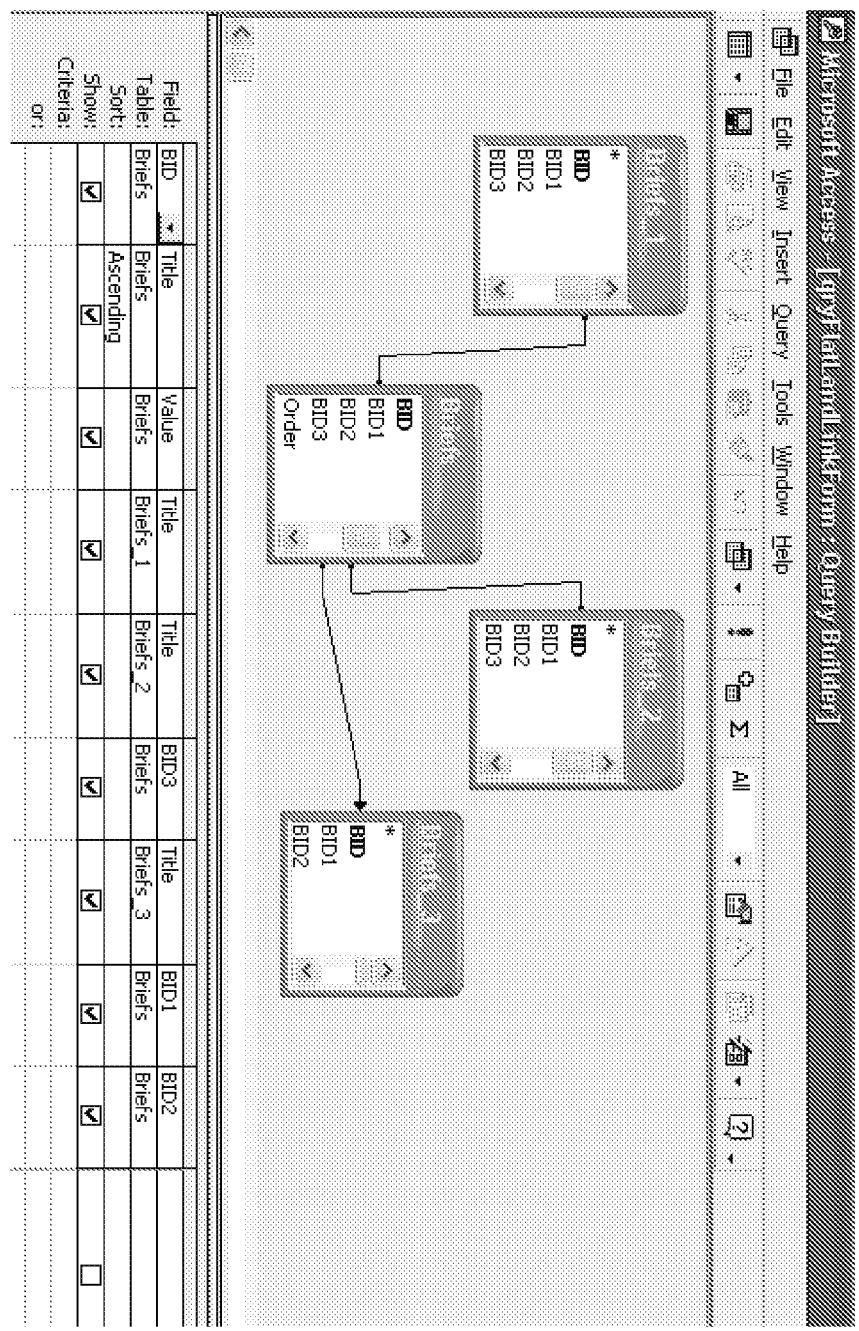
FIG. 60 shows the SQL used in the Flatland Link form and its query builder view in accordance with an embodiment of the present invention.

FlatlandLinkForm The FlatlandLinkForm shown in FIG. 59 shows linking hierarchies ('identity edges'), with tools for creating links. FIG. 60 shows the SQL query used to implement the FlatlandLinkForm and FIG. 61 shows the MS Access query builder view of the same query. This type of query design allows the Cat3 lattice sub-spaces to be displayed in a table-like layout, as shown in FIG. 61, although the 'table' structure is richer than the conventional relational database table, e.g., by allowing multiple-valued fields, and showing table and field 'stems', which do not exist for ordinary tables. FIG. 62 shows the SQL query and the MS Access query builder view of the SQL query used for implementing the table-like layout shown in FIG. 61.

Figure 63:
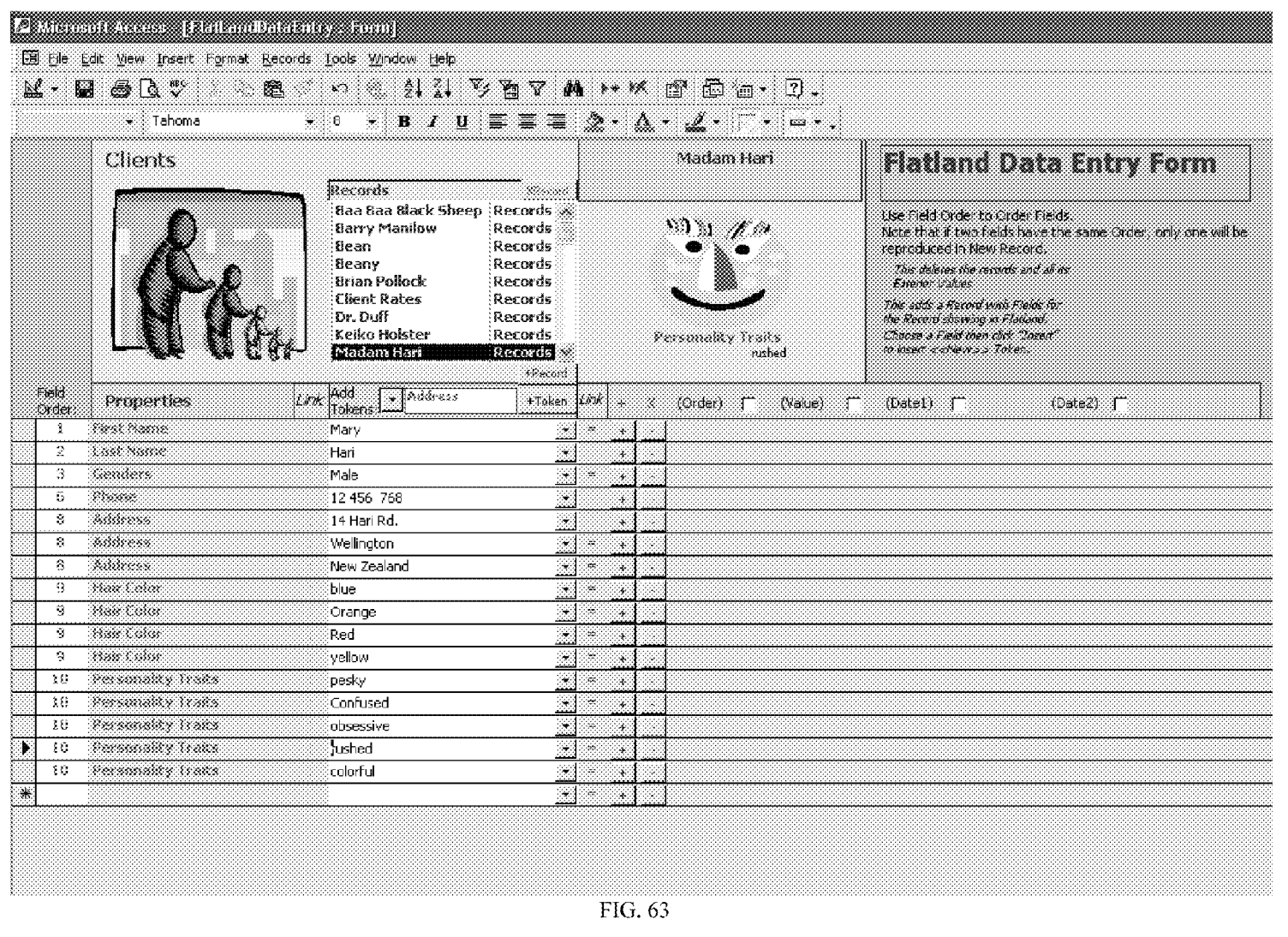

FlatlandDataEntryForm. This form shown in FIG. 63 allows the flat lattice sub-spaces to be viewed in a simple table-like format, with special tools for data entry and editing. This can be used to edit any information in the lattice as if it were in a table format. The SQL query and the MS Access query builder of the query used to implement the FlatlandDataEntryForm is shown in FIG. 64.

Figure 65:
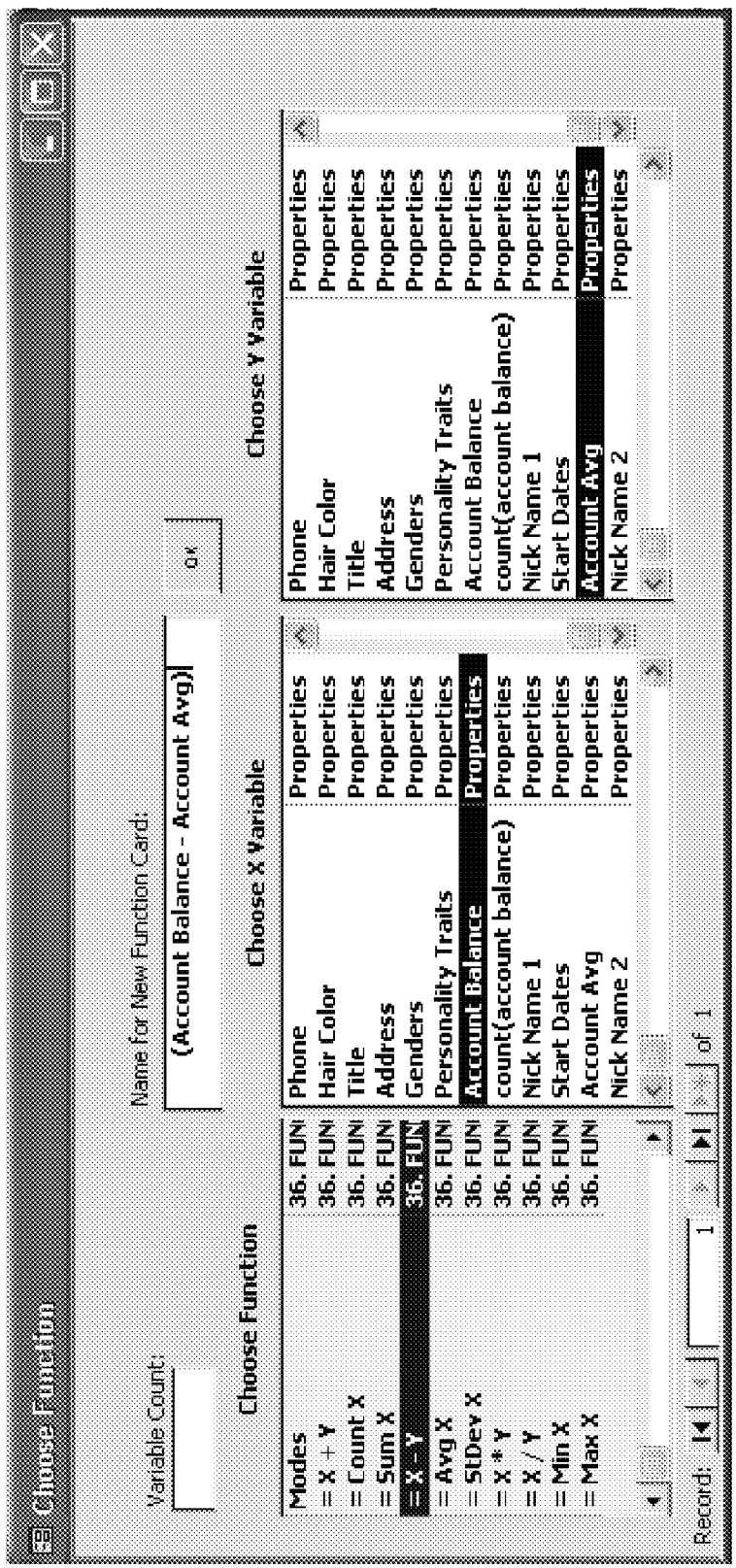
FIG. 65 shows the Choose Function form in accordance with an embodiment of the present invention.
Figure 66:
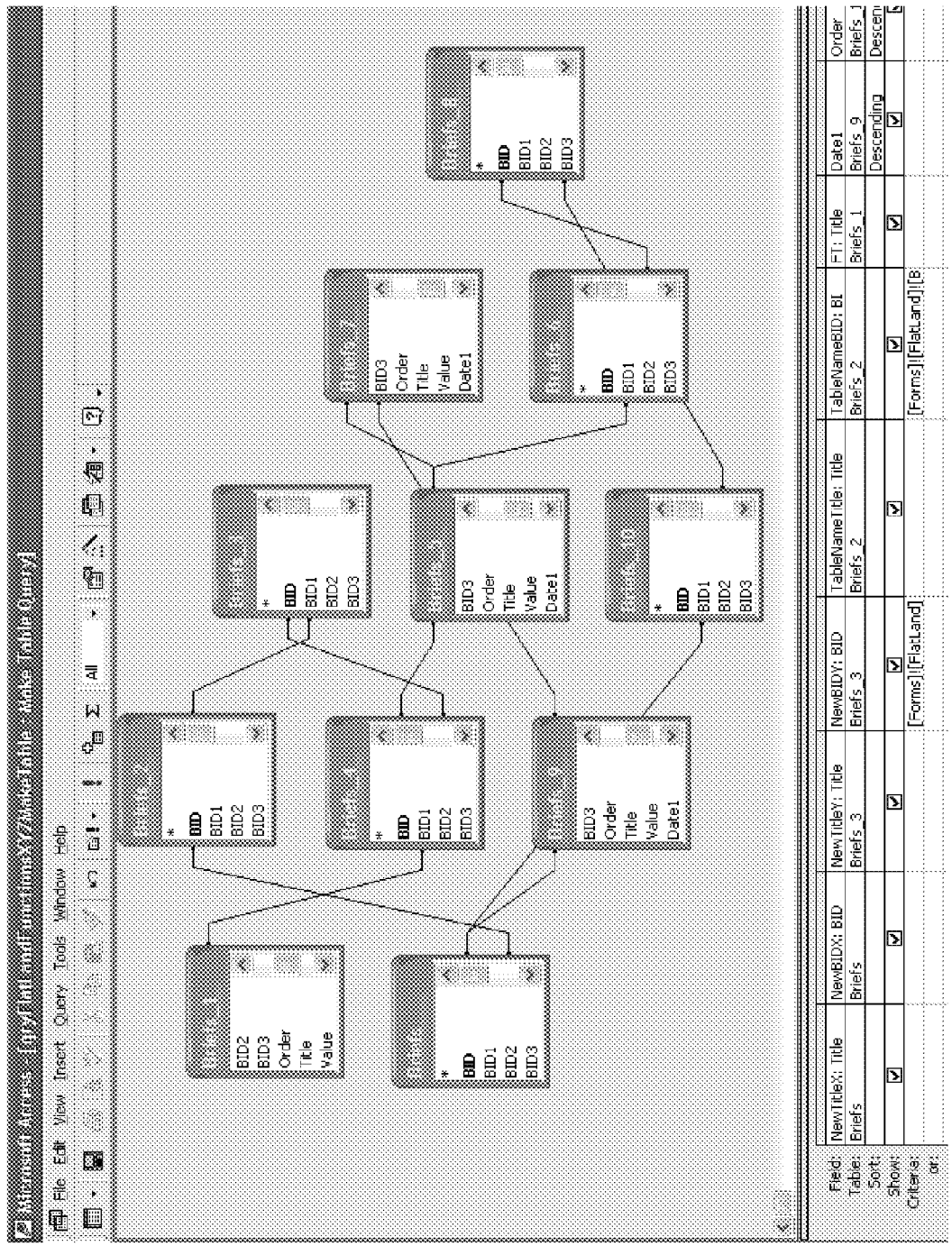
FIG. 66 shows the query builder view of a query used for inserting a 2-place function in accordance with an embodiment of the present invention.

Choose Function Form. The FIG. 65 shows a tool to insert numerical functions as records in the lattice. The 'OK' button in the Choose Function form runs code to insert the chosen function with the chosen variables, according to a standard schema, whereby all the functional dependencies are represented in the CAT3 lattice itself. The full process can only be represented in code, but the following query illustrates the 'wiring diagram' used to represent functions in the lattice. It creates a (temporary) table for calculating and inserting 2-place function values, which are then appended or updated in the lattice (i.e., in the Briefs table). This design is generalized to a more comprehensive version in code, where a fully recursive 'functional engine' is built. FIG. 66 shows the query used to implement the Choose Function form.

Figure 67:
FIG. 67 shows a page from the 'Table Report', which renders the lattice records in a 'table-like' format in accordance with an embodiment of the present invention.

Table Report. FIG. 67 shows an example of a Report designed to show a number of hierarchical lines in a lattice sub-space, corresponding in structure to a conventional 'table hierarchy' (3 tables deep). For example, In this example, is shown a record stem from primary 'table' called "Clients", records and fields from an 'embedded table' called "Jobs for Clients", and records from a further 'embedded table' called "Tasks for Clients Jobs". However it should be emphasized that data from conventional 'tables' is not shown at all: the data shown is directly from the CAT3 Lattice, extracted from the Briefs table by an SQL select statement. This report can be used to present or view any information in the lattice having the same formal structure.

Alternative Applications

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure. Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Embodiments of the invention may also relate to a computer data signal embodied in a carrier wave, where the computer data signal includes any embodiment of a computer program product or other data combination described herein. The computer data signal is a product that is presented in a tangible medium or carrier wave and modulated or otherwise encoded in the carrier wave, which is tangible, and transmitted according to any suitable transmission method.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A first data structure stored in a memory, the first data structure being used for representing information, the first data structure comprising:
a first set of points and a first set of edges wherein each edge in the first set of edges has an edge type comprising one of a first edge type, a second edge type, or an identity edge type, and each edge in the first set of edges has a unique start point wherein said start point is in said first set of points, and each edge in the first set of edges of the first edge type has a unique end point, and each edge in the first set of edges of the second edge type has a unique end point, and each edge in the first set of edges of the identity edge type either has a unique end point or has no end point (null identity edge);
each point in the first set of points is the start point of a first edge in the first set of edges, wherein the first edge is of the first edge type, wherein said start point of the first edge differs for each first edge in the first set of edges;
each point in the first set of points is the start point of a second edge in the first set of edges, wherein the second edge is of the second edge type, wherein said start point of the second edge differs for each second edge in the first set of edges;
each point in the first set of points is the start-point of an identity edge in the first set of edges, wherein the identity edge is of the identity edge type, wherein said start point of the identity edge differs for each identity edge in the first set of edges;
a first unique maximal point in the first data structure wherein the first unique maximal point can be reached from every other point in the first set of points by following edges of the first edge type from the first set of edges and the first unique maximal point can be reached from every point in the first set of points by following edges of the second edge type in the first set of edges;
wherein the end-points of all edges of all types that do not have the first unique maximal point as the start point are either null or are points within the first set;

wherein any edge of the first type having the first unique maximal point as the first point has an end point outside the first set of points;

wherein any edge of the second type having the first unique maximal point as the first point has an end point outside the first set of points;

wherein there are no cyclical paths in paths defined by said first edges in said first set of edges; and wherein there are no cyclical paths in paths defined by said second edges in said first set of edges.

* * * * *